United States Patent
Matsuda et al.

[11] Patent Number: 6,154,260
[45] Date of Patent: Nov. 28, 2000

[54] APPARATUS FOR DEFLECTING LIGHT DEVICE FOR SCANNING LIGHT DEVICE FOR READING INFORMATION AND DEVICE FOR STEREOSCOPIC DISPLAY

[75] Inventors: Takahiro Matsuda; Shin Eguchi; Yoshihiro Mizuno; Masato Nakashima; Manabu Ishimoto; Hirokazu Aritake; Noriko Sato, all of Kawasaki, Japan

[73] Assignee: Fujitsu Limited, Kawasaki, Japan

[21] Appl. No.: 09/098,713

[22] Filed: Jun. 17, 1998

Related U.S. Application Data

[62] Division of application No. 08/405,602, Mar. 17, 1995, Pat. No. 5,815,222.

[30] Foreign Application Priority Data

Mar. 18, 1994 [JP] Japan .................................. 6-049566
Mar. 18, 1994 [JP] Japan .................................. 6-087124
Mar. 29, 1994 [JP] Japan .................................. 6-059597

[51] Int. Cl.$^7$ .............................. G02F 1/139; G06K 7/10
[52] U.S. Cl. ........................................ 349/1; 235/462.35
[58] Field of Search .................................... 349/1, 57, 61, 349/96, 201, 202; 359/573, 618, 196; 235/462, 462.32, 462.33, 462.35; 358/474

[56] References Cited

U.S. PATENT DOCUMENTS

| | | |
|---|---|---|
| 3,813,145 | 5/1974 | Hedman . |
| 4,945,407 | 7/1990 | Winnek .................................. 358/88 |
| 4,957,351 | 9/1990 | Shioji . |
| 5,210,627 | 5/1993 | Toide et al. ............................. 349/2 |
| 5,258,833 | 11/1993 | Schenk ................................... 358/88 |

FOREIGN PATENT DOCUMENTS

| | | |
|---|---|---|
| 0 560 180 A2 | 9/1993 | European Pat. Off. . |
| 0 560 180 A3 | 9/1993 | European Pat. Off. . |
| 0 570 179 A2 | 11/1993 | European Pat. Off. . |
| 0 580 353 A2 | 1/1994 | European Pat. Off. . |
| 3-189778 | 8/1991 | Japan . |
| 5-299749 | 11/1993 | Japan . |

OTHER PUBLICATIONS

A.R. Tanguay, Jr., et al., Physical characterization of the variable grating mode liquid crystal device, *Optical Engineering*, Nov.–Dec. 1983, vol. 22, No. 6, pp. 687–694.

Primary Examiner—William L. Sikes
Assistant Examiner—Tai V. Duong
Attorney, Agent, or Firm—Armstrong, Westerman, Hattori, McLeland & Naughton

[57] ABSTRACT

An apparatus for deflecting light of the present invention comprises: (a) at least one pair of transference electrodes arranged facing one another; (b) a drive circuit which applies a voltage among the transference electrodes; and (c) a liquid crystal which is inserted among the transference electrodes, and whose parallel stripes that function as a diffraction grating when the voltage is applied among the transference electrodes are produced at a pitch corresponding to the applied voltage. The light can be scanned if a diffracted light by the apparatus for deflecting light is converted into a scanning light and a voltage value is changed temporally to apply the voltage among the transference electrodes. In a device for reading information, the scanning light is reflected in a bar code and the reflected light is detected by an apparatus for detecting light. In a device for stereoscopic display of the present invention, the apparatus for deflecting light is used as beam deflection means for deflecting the light beamed from a picture element which organizes the pictures of the picture display means.

6 Claims, 39 Drawing Sheets

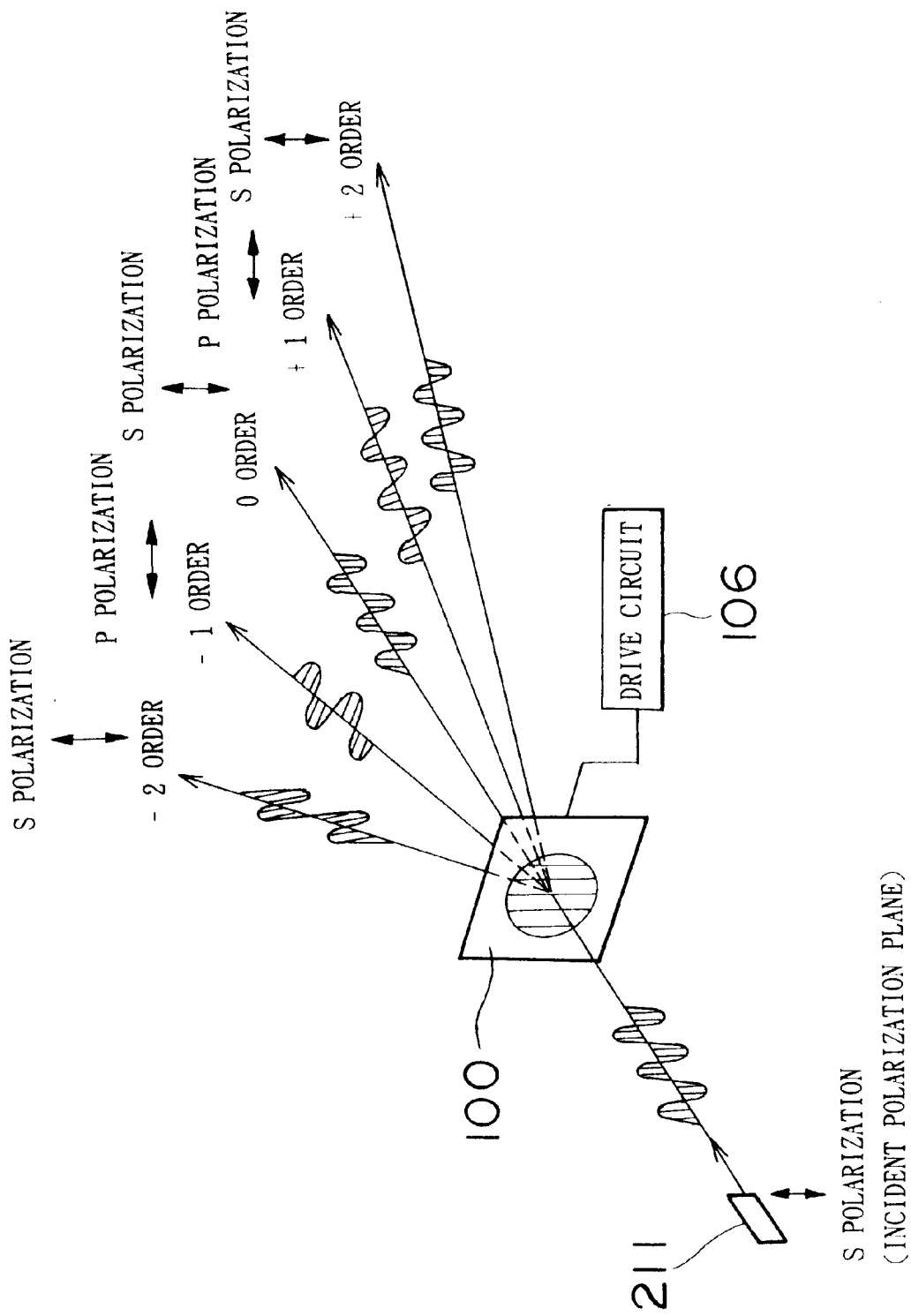

FIG. 21
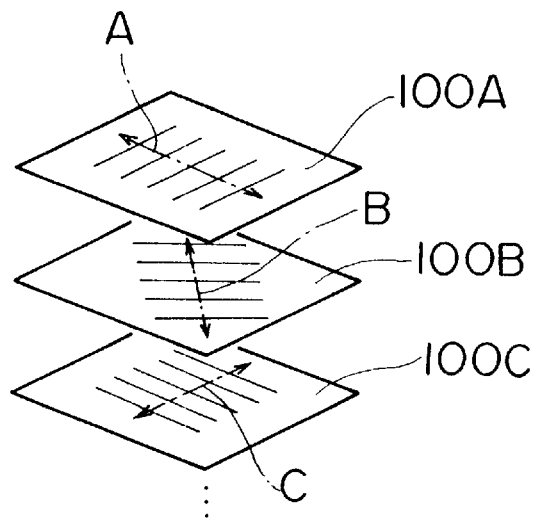
FIG. 22
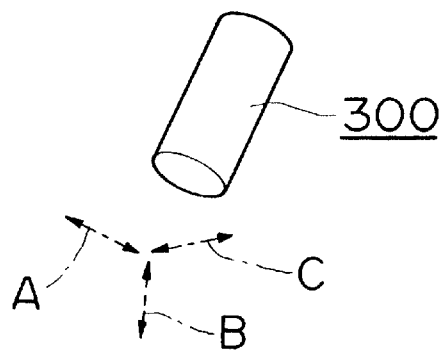
FIG. 23(A)  FIG. 23(B)  FIG. 23(C)
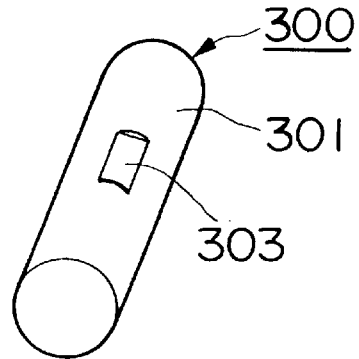 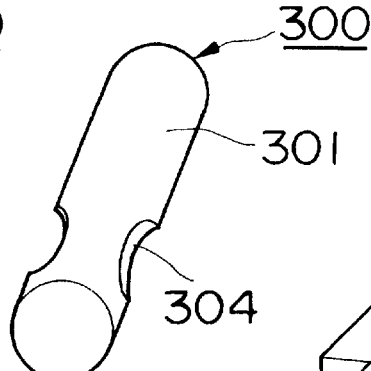 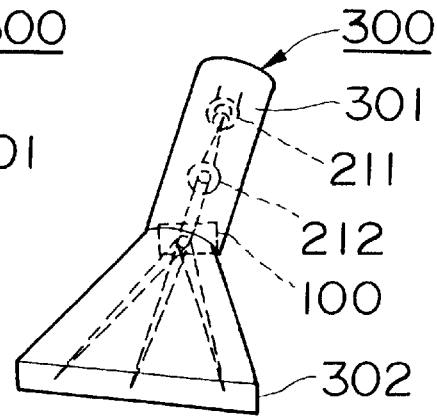

FIG. 24
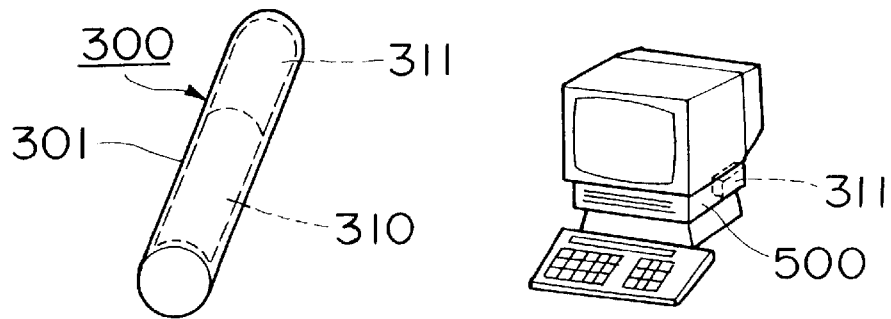
FIG. 25
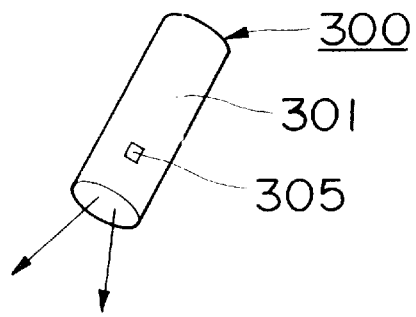
FIG. 26(A)  FIG. 26(B)  FIG. 26(C)
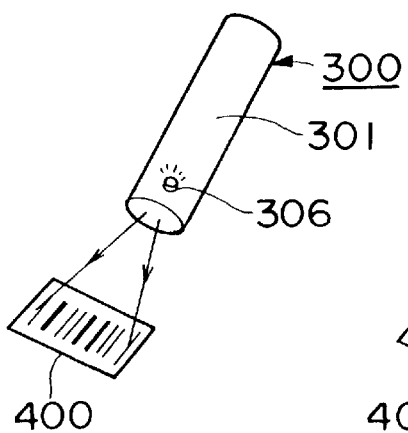 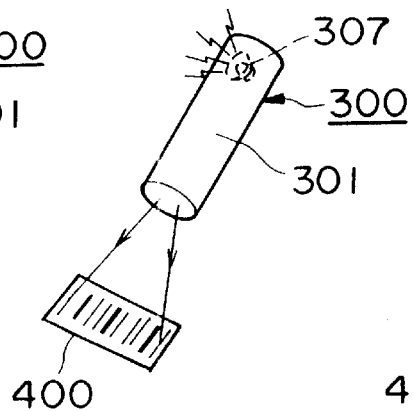 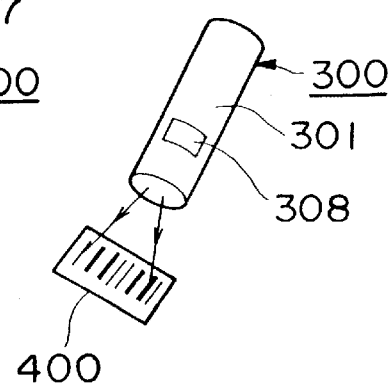

FIG. 28

| O1 | O1L1 | O1L2 | O1L3 | | O1Ln |
|---|---|---|---|---|---|

| O2 | O2L1 | O2L2 | O2L3 | | O2Ln |
|---|---|---|---|---|---|

⋮

| On | OnL1 | OnL2 | OnL3 | | OnLn |
|---|---|---|---|---|---|

FIG. 29

| O'1 | O1L1 | O2L2 | O3L3 | | OnLn |
|---|---|---|---|---|---|
| | | | | | |

| O'2 | OnL1 | O1L2 | O2L3 | | On-1Ln |
|---|---|---|---|---|---|
| | | | | | |

⋮

| O'n | O2L1 | O3L2 | O4L3 | | O1Ln |
|---|---|---|---|---|---|
| | | | | | |

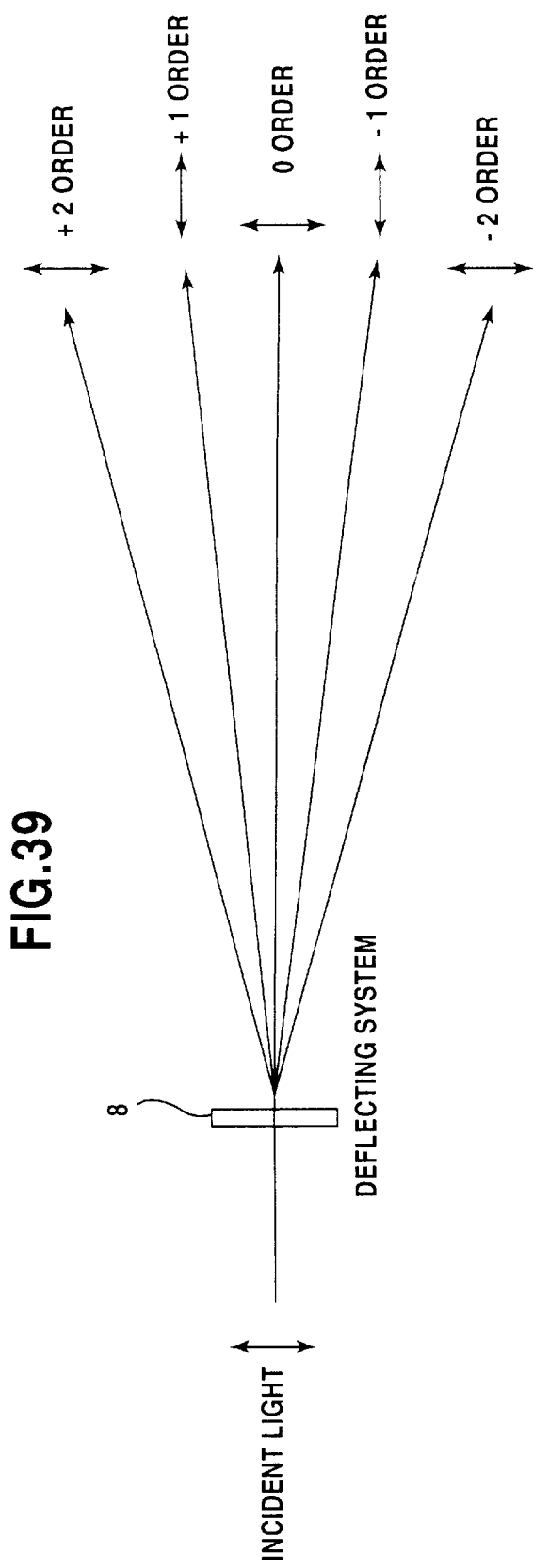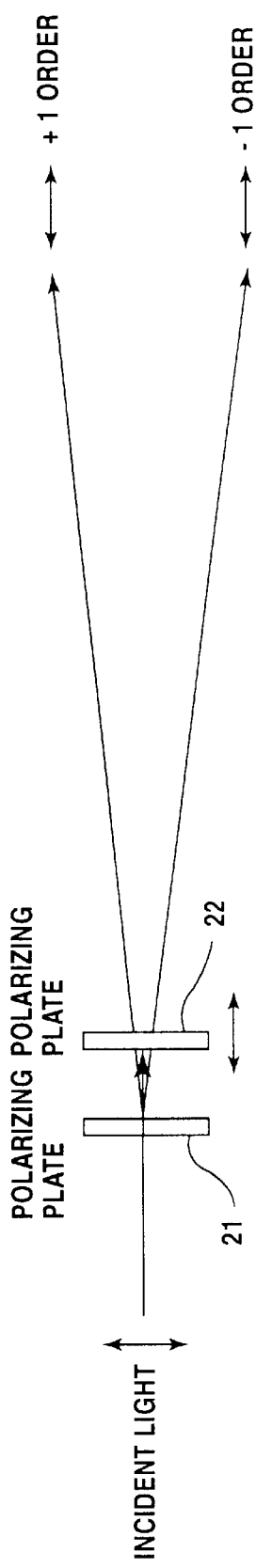

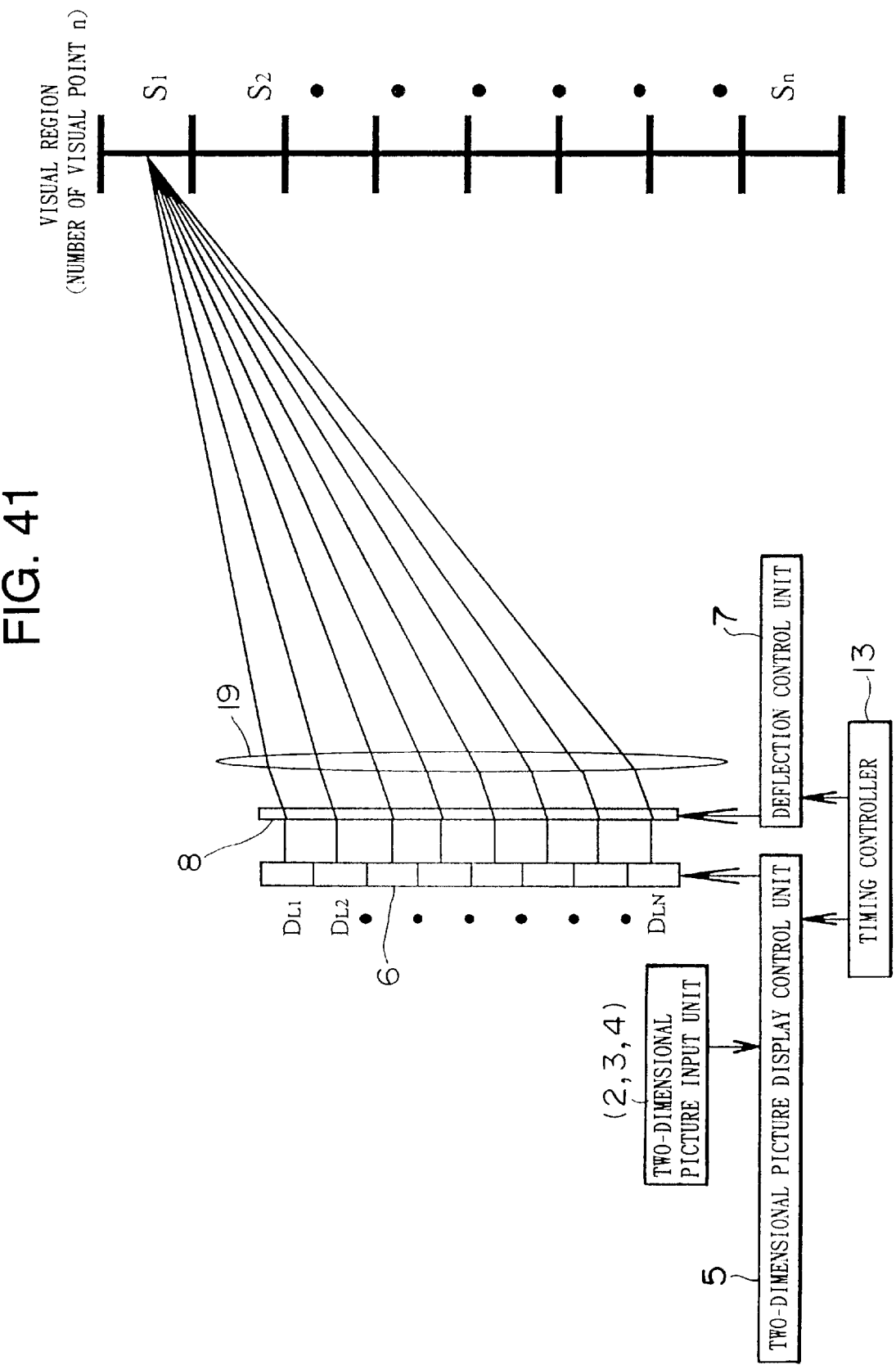

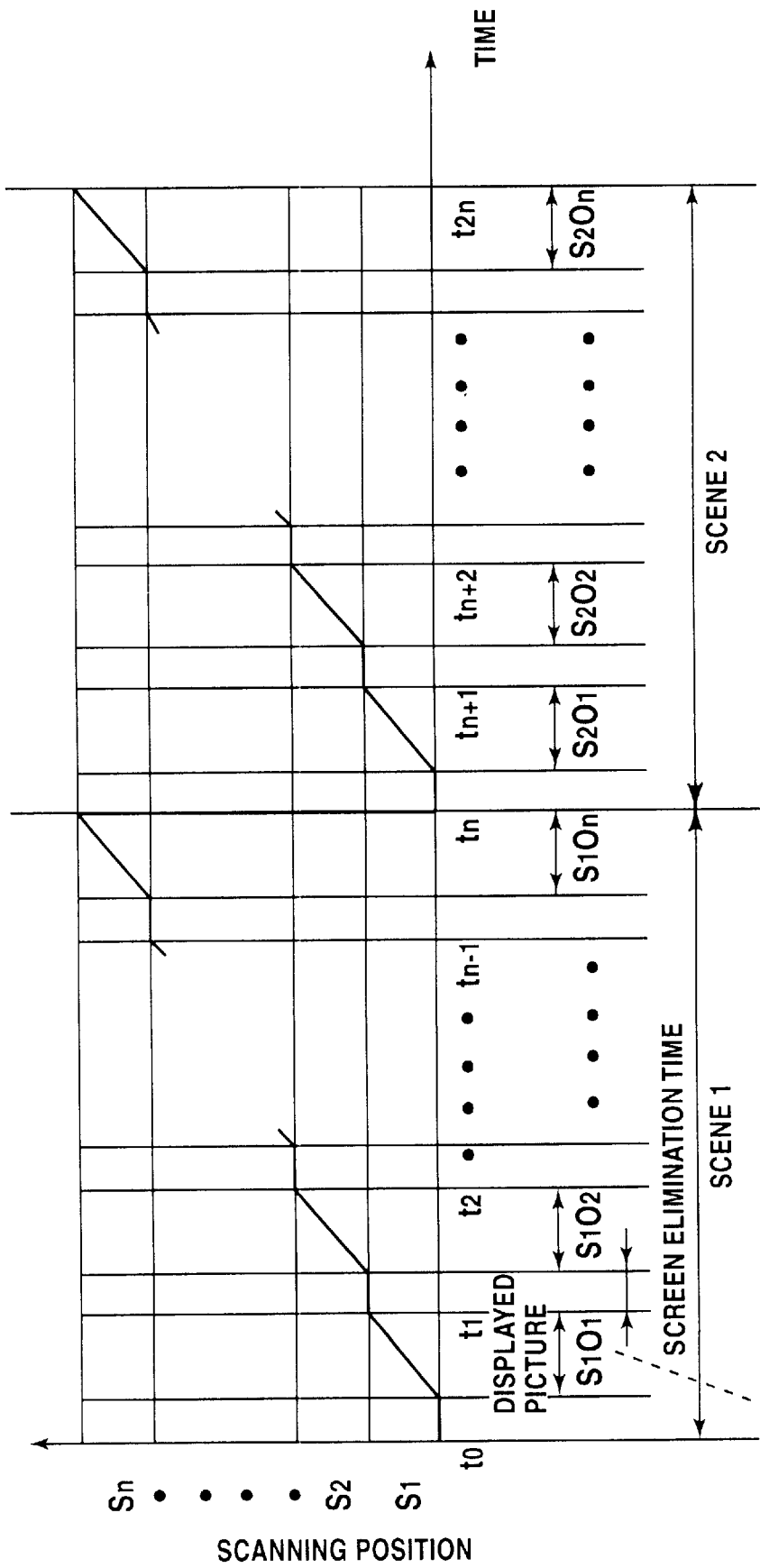

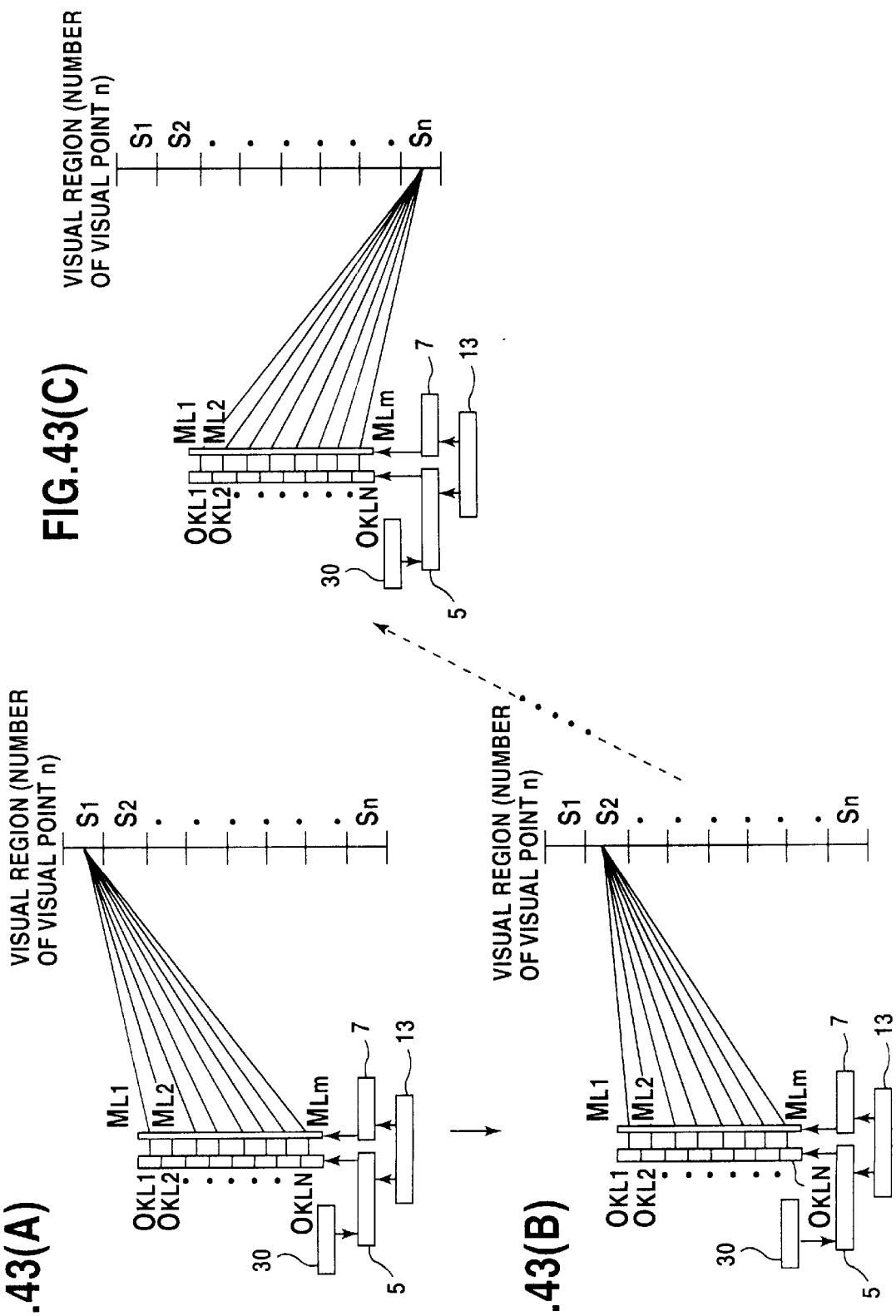

FIG. 48

| CORRESPONDING PICTURE ELEMENT | PHASE DISTRIBUTION DATA | | | |
|---|---|---|---|---|
| P11 | $\Phi 11,11$ | $\Phi 11,12$ | ---------- | $\Phi 11,mn$ |
| ⋮ | ⋮ | | | ⋮ |
| Pij | $\Phi ij,11$ | $\Phi ij,12$ | ---------- | $\Phi ij,mn$ |
| ⋮ | ⋮ | | | ⋮ |
| PMN | $\Phi MN,11$ | $\Phi MN,12$ | ---------- | $\Phi MN,mn$ |

$$\Phi ij, mn$$
↑    ↑
CORRESPONDING PICTURE ELEMENT    VIRTUAL APERTURE REGION

FIG. 49

| VIRTUAL APERTURE REGION | TWO-DIMENSIONAL PICTURE DATA |
|---|---|
| S11 | G11 |
| ⋮ | ⋮ |
| Skℓ | Gkℓ |
| ⋮ | ⋮ |
| Smn | Gmn |

FIG. 52

| CORRESPONDING PICTURE ELEMENT | PHASE DISTRIBUTION DATA | | |
|---|---|---|---|
| P11 | $\Phi 11,1$ | $\Phi 11,2$ ---------- | $\Phi 11,n$ |
| ⋮ | | | |
| Pij | $\Phi ij,1$ | $\Phi ij,2$ ---------- | $\Phi ij,n$ |
| ⋮ | | | |
| PMN | $\Phi MN,1$ | $\Phi MN,2$ ---------- | $\Phi MN,n$ |

$\Phi ij,1$
↑ ↑
CORRESPONDING PICTURE ELEMENT    VIRTUAL APERTURE REGION

FIG. 53

| VIRTUAL APERTURE REGION | TWO-DIMENSIONAL PICTURE DATA |
|---|---|
| S1 | G1 |
| ⋮ | ⋮ |
| Sℓ | Gℓ |
| ⋮ | ⋮ |
| Sn | Gn |

FIG. 56

| CORRESPONDING PICTURE ELEMENT | PHASE DISTRIBUTION DATA | | | |
|---|---|---|---|---|
| P1 | $\Phi j,1$ | $\Phi j,2$ | ———— | $\Phi 1,n$ |
| ⋮ | | | | |
| Pj | $\Phi j,1$ | $\Phi j,2$ | ———— | $\Phi j,n$ |
| ⋮ | | | | |
| PN | $\Phi N,1$ | $\Phi N,2$ | ———— | $\Phi N,n$ |

$\Phi j, \ell$
↑ ↑
CORRESPONDING PICTURE ELEMENT  VIRTUAL APERTURE REGION

FIG. 57
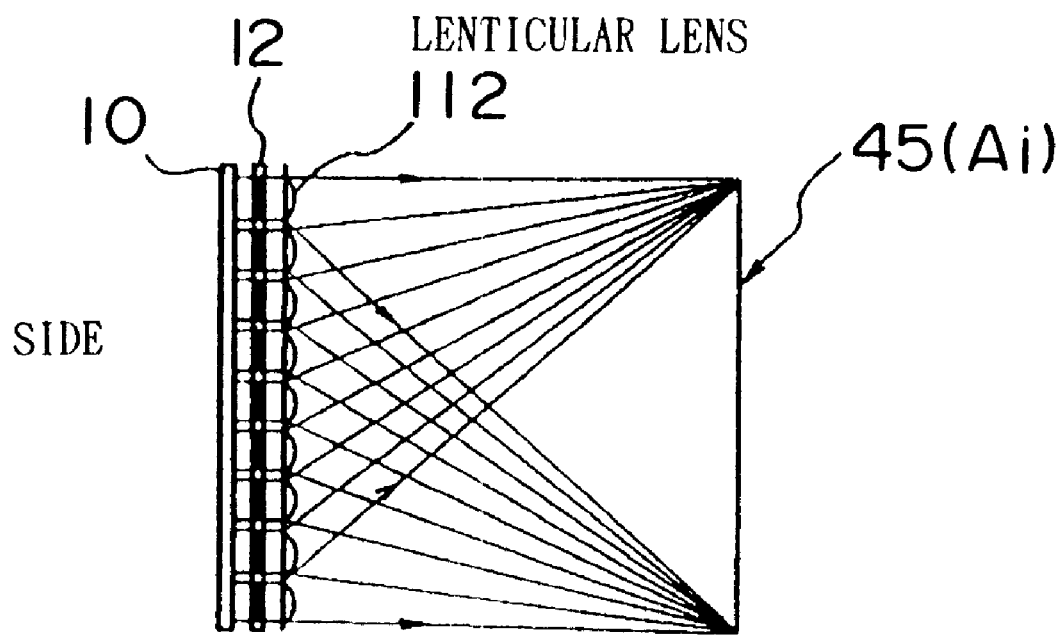
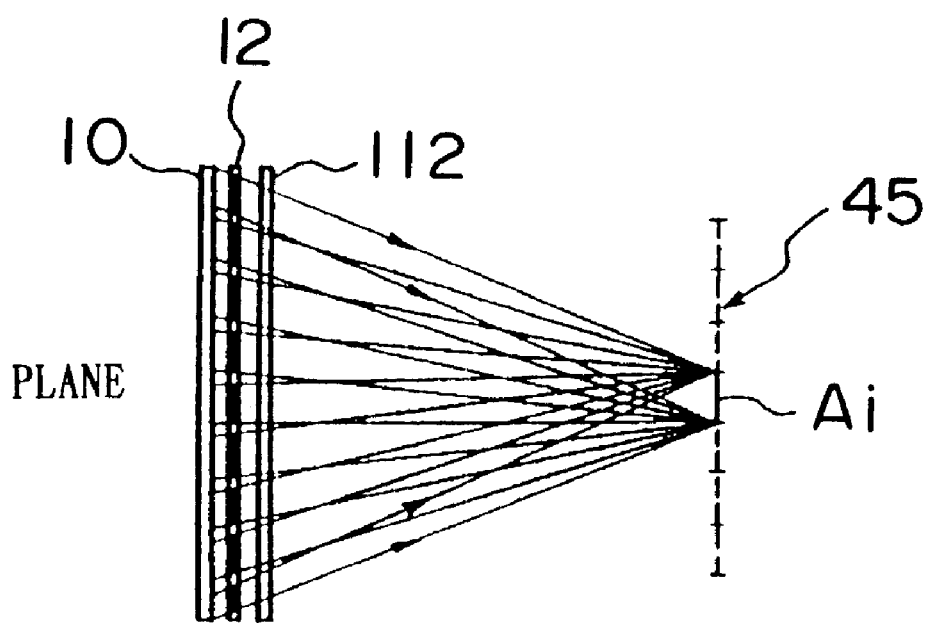

APPARATUS FOR DEFLECTING LIGHT DEVICE FOR SCANNING LIGHT DEVICE FOR READING INFORMATION AND DEVICE FOR STEREOSCOPIC DISPLAY

This application is a divisional of U.S. application Ser. No. 08/405,602 filed Mar. 17, 1995, now U.S. Pat. No. 5,815,222.

BACKGROUND OF THE INVENTION

In recent years, a commodity management by POS system (point of sales system) has been executed very actively. The optical device for reading information like a bar code reader has been used for the POS system.

Namely, such data processing as an inventory management has been executed by displaying the information about the commodities (a kind of commodities and cost of commodities and so on)in a bar code as an information medium, reading the bar code with the bar code reader, and processing the information in a host computer.

Recently, also in a physical distribution field, such work as an assortment is often executed by displaying a bar code as an information medium on the commodity and the box, and reading the bar code with a bar code reader.

Some of the devices for reading information like the bar code reader are provided with a device for scanning light. Generally, a method in which the light scanning is executed by revolving a polygon mirror and a galvano mirror mechanically has been adopted for the traditional device for scanning light.

Accordingly, the device for scanning light provided with mechanically movable parts has caused some problems that a controllability is deteriorated and a response delay occurs and so on, and has caused some deficiencies that the optical axis is slipped off by the mechanical vibration and so on.

On the other hand, various methods have been suggested for a display device which displays a stereoscopic picture up to the present. One example is a binocular method represented by a spectacle method in which a cubic effect is obtained by binocular convergence and binocular parallax, letting the left and right eyes look at the different pictures. Besides, a lenticular method of multiple-lens method exists as an extension of the binocular method. A principle of the stereoscopic vision in the lenticular method is the same as the binocular method.

Only unnatural stereoscopic pictures can be seen in such method for stereoscopic display, since no difference (kinetic parallax) occurs in the stereoscopic pictures even if the observer moves his head from left to right.

Holographic stereogram is cited as a method to solve these problems. In holographic stereogram, the natural cubic effect can be obtained even if the observer moves his head from left to right, since the two-dimensional pictures including the parallax are registered in a segment hologram of vertically slender slit form, and a large number of these pictures are arranged horizontally. Besides, holographic stereogram including vertical parallax also exists.

First of all, an object will be photographed moving the camera position vertically if the holographic stereogram which has a vertical parallax is given as an example.

Then, a laser light is applied to the film to which the object was photographed, an object light is beamed by projecting the film against the diffusion board with lens, a slit of a slit board is arranged in front of the hologram dry plate corresponding to the projection position, and the interference fringes are exposure-registered by interfering with the reference light.

Further, a method for preparing an imaged hologram also exists. Namely, the imaged holographic diagram (image type holographic stereogram) is prepared by applying the laser light to the hologram which was prepared as mentioned above so that the light will be converged into the replay light source indicated as a virtual image, installing another hologram dry board in a display position of the image according to the object light wave-front converted by the hologram and exposing the dry board in irradiation of the reference light.

The image type holographic stereogram is capable of displaying the stereoscopic image by applying the replay light to it, reviewing it from the visual region in the wave-front conversion.

It is desirable that the stereoscopic image exists near the holograph surface so as to reduce the fatigue of the observer's eyes, when the stereoscopic display is executed. In the above-mentioned holographic stereogram, it is necessary to image the picture photographed by camera, since the stereoscopic images are replayed so that they will be piled up on the hologram surface.

On the other hand, in the image type holographic stereogram, the hologram surface and the stereoscopic image can be piled up without converting the pictures, since the two-dimensional pictures are on the hologram. Besides, there are some advantages that the image surface will be on the hologram surface and the chromatic aberration will not occur, even if the wavelength of the light which refers to the holograph changes and so on. Accordingly, it can be said that the stereoscopic display by the image type holographic stereogram is easier to see.

Besides, an Audio Optical Deflecting system (AOD) consisting of tellurium dioxide crystal is used as another device for stereoscopic display, and a display device provided with a galvano mirror scanner, polygon mirror and a lens is also known. In the device, the interference fringes formed on the hologram dry board are calculated by the computer from the three-dimensional data of the object which is displayed as a hologram. The data of the interference fringes are written into a frame buffer of the computer, and a picture signal and a synchronization signal are transmitted to the display unit.

In the display unit, the picture signal and the synchronization signal are separated into an optical scanning partial synchronization signal and a hologram signal which activates the audio optical deflecting system from the compound hologram signal for CRT display of the computer. At this moment, the hologram signal should be intermingled with the 100 MHz carrier wave, since the frequency band necessary for activating the audio optical deflecting system is from 50 MHz to 100 MHz. The refractive index variation which is modulated resiliently occurs, when its transmission signal is converted into an ultrasonic wave by the ultrasonic transducer of the audio optical deflecting system (AOD) and the crystal within the audio optical deflecting system (AOD) is transmitted by the ultrasonic wave. The diffracted light can be obtained if the laser light is injected into there. Although a hologram is formed within the audio optical deflecting system (AOD) by these actions, the hologram should be stopped by synchronizing the polygon mirror in sound speed and revolving it, since the hologram is moving in sound speed (slow shear wave of the tellurium dioxide crystal, 617 per second). At this moment, the polygon mirror is also used for scanning the small element holograms horizontally at the same time. The horizontal line hologram formed like this should be scanned vertically by the galvano mirror scanner to replay the three-dimensional image.

Accordingly, the three-dimensional image can be seen floating in the space in front of outgoing radiation lens installed behind the polygon mirror.

By the way, the high control accuracy can not be desired and the mechanical control delay can not be avoided, if the device for stereoscopic display owns such mechanically movable parts as the polygon mirror and the galvano mirror scanner. Besides, such problems as the slippage of the light axle due to the occurrence of noises by the mechanical resonance might result in obtaining a stereoscopic picture of poor quality. Further, such maintenance as a mechanical adjustment can not be easily executed.

For this reason, the electronic display of the hologram using, for instance, the spatial light modulation element in which the liquid crystal is used as a deflecting part was also considered. However, although the picture element pitch of the liquid crystal display must be around 1 μm so as to obtain an enough deflection angle (around 30 degrees) when the liquid crystal is used as the deflecting part, it was impossible to do so in reality. Besides, in traditional LCD (Liquid Crystal Display), the spatial frequency of only the integral number twofold of the picture element can be represented, but the deflection of the non-stage using the LCD was inexecutable.

By the way, generally, it is necessary to obtain a phase distribution of the light by the calculation of the computer from the three-dimensional object to be displayed, and it is necessary to calculate the phase distribution from the two-dimensional picture in connection with the image type holographic stereogram, in order to display the hologram electronically by using the spatial light modulation element in which the liquid crystal is used.

The calculation of the phase distribution divides the hologram surface into the microscopic hologram regions, calculates the phase distribution per inaccurate region from the position coordinates and the intensity of all sample points of the object and executes the calculation in connection with all of the microscopic hologram regions. For this reason, the calculation volume is increased considerably also in the image type holographic stereogram in which the phase calculation is executed for the two-dimensional pictures.

Besides, it is necessary to calculate a phase distribution and the load of the computer calculation becomes heavy, whenever the contents of the two-dimensional pictures to be displayed are changed, so the improvement of these points has been desired.

Accordingly, it is desirable that the stereoscopic display can be executed for the image type holographic stereogram without calculating the phase distribution even if the two-dimensional pictures are changed.

SUMMARY OF THE INVENTION

The object of the present invention is to realize an apparatus for deflecting light which does not have a mechanically movable part, and in which the deflection of the non-stage is executable and the control is easily executed.

The object of the present invention is to realize a device for scanning light which does not have a mechanically movable part, and in which the light scanning can be executed continuously, the control is easily executed and the miniaturization is executable.

The object of the present invention is to realize a device for reading information whose controllability is good and reliability is high.

The object of the present invention is to realize a device for stereoscopic display provided with a beam deflection means which does not have a mechanically movable part.

Another object of the present invention is to realize a device for stereoscopic display provided with an apparatus for deflecting light which owns an enough deflecting angle without a minute processing of the picture element, and in which the deflection of the non-stage is executable.

Another object of the present invention is to realize a device for stereoscopic display which executes a stereoscopic display without calculating a phase distribution. The following means were adopted for the present invention so as to attain at least one of the above-mentioned objects.

An apparatus for deflecting light of the present invention comprises: (a) at least one pair of transference electrodes arranged facing one another; (b) a drive circuit which applies a voltage among the transference electrodes; and (c) a liquid crystal which is inserted among the transference electrodes, and whose parallel stripes which function as a diffraction grating when the voltage is applied among the transference electrodes are produced at a pitch corresponding to the applied voltage.

In the apparatus for deflecting light of the present invention, the liquid crystal whose anisotropy of a permittivity is less than 0 is ideal. Hereupon, the anisotropy of the permittivity means a value in which the permittivity of minor axis direction is subtracted from the permittivity of the major axis direction in the liquid crystal. It is also referred to as a permittivity difference.

Besides, it is understood that the pitch of the parallel stripes which occurs in the liquid crystal becomes narrower and the angle of diffraction gets bigger in proportion to the enlargement of the applied voltage. In the apparatus for deflecting light of the present invention, it is also possible to apply a voltage whose voltage value changes temporally among the transference electrodes by the drive circuit. By these actions, the angle of diffraction can be changed temporally, and it will be possible to control the angle of diffraction electrically.

Both dc voltage and alternating voltage can be used as the applied voltage.

A device for scanning light of the present invention comprises: (a) an apparatus for deflecting light whose liquid crystal is inserted among the transference electrodes arranged facing one another, and whose parallel stripes which function as a diffraction grating when the voltage is applied to the transference electrodes are produced at a pitch corresponding to the applied voltage in the liquid crystal; (b) a drive circuit which applies a voltage whose voltage value changes temporally among the transference electrodes of the apparatus for deflecting light; and (c) a light source which beams the light which will be injected into the apparatus for deflecting light.

The light can be scanned b)y using the diffracted light which is an outgoing light of the apparatus for deflecting light as a scanning light, since the angle of diffraction will change temporally if the size of the applied voltage of the apparatus for deflecting light is changed temporally.

In the device for scanning light of the present invention, an optical element for converging light can be installed on the incident light side or the outgoing light side of the apparatus for deflecting light. The convex lens can be exemplified as the optical element for converging light.

The optical element for converging light can bring the image formation point of the light closer to the apparatus for deflecting light, compared with the case that the apparatus for deflecting light does not have an optical element for converging light, when the light beamed from the light source is a focusing ray. The optical element for converging light can converge the light beamed from the light source and make it form as a image, when the light beamed from the light source is a divergent ray or a parallel ray.

In the device for scanning light of the present invention, an incident light angle of the incident light against the apparatus for deflecting light can be set almost equally to a Bragg angle of the diffracted light used for the scanning light. By these actions, the diffraction efficiency can be maximized, and the intensity of the diffracted light used as a scanning light can be bigger than the intensity of other diffracted light.

In the device for scanning light of the present invention, an optical element which enlarges a deflection angle of the scanning light substantially can be installed on the outgoing light side of the apparatus for deflecting light. The scanning width of the scanning light can be enlarged and the device for scanning light can be miniaturized, if the deflection angle of the scanning light can be enlarged.

A convex lens, a concave lens, a convex mirror and a hologram and so on can be exemplified as the optical element which enlarges the deflection angle of the scanning light substantially.

In the device for scanning light of the present invention, an aperture can be installed between the light source and the apparatus for deflecting light, Besides, the beam diameter can be reduced and the wished-for beam shape can be set by the aperture.

Especially, the reflected light intensity contrast of the reflected light which reflects in the information medium can be improved, when the device for scanning light provided with the aperture is included in the device for reading information.

The device for scanning light of the present invention can be provided with a variable mechanism which makes a clearance along an optical axis direction from the light source to the optical element for converging light variable. Namely, either the light source or the optical element for converging light is fixed so that the other side will be moved by the variable mechanism along the optical axis direction. Either the light source or the optical element for converging light can be moved by the variable mechanism. By these actions, the position of the image formation point of the scanning light can be made variable.

The device for scanning light of the present invention can be provided with: (a) a half mirror which reflects an outgoing light of the optical element for converging light towards the direction alienated from the apparatus for deflecting light; (b) a second optical element for converging light which converges the reflected light beamed from the half mirror; (c) a reflecting member which reflects the outgoing light of the second optical element for converging light and lets the reflected light permeate through the second optical element for converging light and the half mirror to inject it into the apparatus for deflecting light; and (d) a variable mechanism which changes a clearance along an optical axis direction from the second optical element for converging light to the reflecting member.

In this case, either the second optical element for converging light or the reflecting member is fixed so that the other side will be moved by the variable mechanism along the optical axis direction. Either the second optical element for converging light or the reflecting member can be moved by the variable mechanism.

In the device for scanning light of the present invention, a plurality of apparatuses for deflecting light can be provided, the apparatuses for deflecting light can be arranged in layers so that the parallel stripes which occurs in each apparatus for deflecting light will be crossed one another, and a voltage can be applied to each of the apparatuses for deflecting light mutually by the drive circuit.

By these actions, the scanning light can be scanned to a plurality of directions changing the scanning directions in order. Hereupon, it is not always necessary to make the apparatuses for deflecting light contact one another so as to pile up the apparatuses for deflecting light, and a crevice can be existed among the apparatuses for deflecting light. The crossed axes angle is not limited in particular.

In the device for scanning light of the present invention, a polarizer can be installed on the outgoing light side of the apparatus for deflecting light. The polarizer shuts down almost all of the unnecessary diffracted lights except the scanning light. As a result, the device for scanning light will be hardly influenced by any diffracted lights except the scanning light, the performance of the device for scanning light can be improved, and the simplification of the device and the extension of the degree-of-freedom of the design can be attained.

In the device for scanning light of the present invention, the polarizers can be installed on the outgoing light side of the apparatus for deflecting light, and the polarizers can be arranged so that the polarizing direction of the polarizer will be almost perpendicular against the polarizing direction of the incident light to the apparatus for deflecting light.

The laser light of the linearly polarized light of S polarization or P polarization is desirable as a light beamed from the light source. The polarizer can be arranged between the light source and the apparatus for deflecting light so that only the linearly polarized light component will be injected into the apparatus for deflecting light, when the light beamed from the light source is not the linearly polarized light. The device for scanning light of the present invention can be used for a device for scanning light included in a bar code reader and a laser printer and so on.

A device for reading information of the present invention comprises: (a) an apparatus for deflecting light whose liquid crystal is inserted among the transference electrodes arranged facing one another, and parallel stripes which function as a diffraction grating when the voltage is applied to the transference electrodes are produced at a pitch corresponding to the applied voltage; (b) a drive circuit which applies a voltage whose voltage value changes temporally among the transference electrodes of the apparatus for deflecting light; (c) a light source which beams the light which will be injected into the apparatus for deflecting light; and (d) an apparatus for detecting light which detects a reflected light when the scanning light diffracted by the apparatus for deflecting light is reflected in an information medium.

The scanning light beamed from the device for scanning light is irradiated to the information medium, and is reflected in the information medium, then its reflected light is injected into the device for detecting light. The light signal inputted into the device for detecting light is converted into an electric signal by appropriate means to be read.

In the device for reading information of the present invention, the bar code can be substituted for the information medium.

In the device for reading information of the present invention, shading means for cutting off a zero-order diffracted light of the device for deflecting light can be installed on the outgoing light side of the apparatus for deflecting light.

By these actions, the reflected light of the transmitted light can not be injected into the device for detecting light, since the transmitted light of the apparatus for deflecting light is cut off by the shading means. Accordingly, the reading accuracy will be improved.

A device for stereoscopic display of the present invention comprises: (a) two-dimensional-picture-display means for displaying two-dimensional pictures which vary in visual directions; and (b) beam deflection means for deflecting a light beamed from a picture element which organizes the pictures of the picture display means. The apparatus for deflecting light whose liquid crystal is inserted among the transference electrodes, and parallel stripes which function as a diffraction grating when a voltage is applied among the transference electrodes are produced at a pitch corresponding to the applied voltage is used for the beam deflection means.

In the device for stereoscopic display of the present invention, the photographed pictures are inputted from a plurality of visual directions. The inputted plural parallax pictures are displayed on the two-dimensional picture display means. Then, inputted pictures are deflected to the corresponding designated visual regions respectively. For instance, the picture inputted from the first visual direction is deflected to the virtual first aperture, the picture inputted from the second visual direction is deflected to the virtual second aperture and the picture inputted from n the visual direction is deflected to the virtual n the aperture. By these actions, the angle relation between the object and the camera when the picture is inputted will be same as the angle relation between the observer and the displayed picture when the picture is replayed, so the stereoscopic picture can be replayed.

Each of the parallax pictures in one time t=t1 should be rearranged in time series to display the two-dimensional pictures in order during $\Delta t$ (for instance, $\Delta t=\frac{1}{30}$ seconds) when an animation is replayed (the picture display of Scene 1). The parallax pictures in t=t1+$\Delta t$ should be arranged in the time series similarly to execute the displays, after executing the displays on the basis of the number of visual points (the picture display of Scene 2). The animation should be displayed by repeating these actions.

In the device for stereoscopic display of the present invention, a device for stereoscopic picture display without mechanically movable parts can be realized, since the apparatus for deflecting light into which the liquid crystal is inserted is used as the beam deflection means.

The device for stereoscopic display of the present invention comprises: (a) a line division unit for dividing a picture photographed by a camera into a number of visual points; (b) a time series rearrangement unit for rearranging the two-dimensional pictures divided by the line division unit in the time series; (c) a two-dimensional picture display unit for replaying and controlling the two-dimensional pictures rearranged by the time series rearrangement unit in a time series order. The beam deflection means can deflect the two-dimensional pictures displayed by the two-dimensional picture display means to a virtual aperture corresponding to an camera visual point of the plural cameras.

In the device for stereoscopic display of the present invention, the pictures can be deflected to a horizontal direction by the beam deflection means.

In the device for stereoscopic display of the present invention, the pictures can be deflected to a vertical direction by the beam deflection means.

The device for stereoscopic display of the present invention can be provided with first beam deflection means for deflecting the pictures to the horizontal direction and second beam deflection means for deflecting the pictures to the vertical direction.

In the device for stereoscopic display of the present invention, the two-dimensional picture display means has a picture element for displaying the pictures, and the beam deflection means can be provided independently per picture element which organizes the pictures.

In the device for stereoscopic display of the present invention, the two-dimensional picture display means has a picture element for displaying the pictures and the beam deflection means can be provided extending over a plurality of picture elements which organize the pictures.

In the device for stereoscopic display of the present invention, the beam deflection means executes the deflection only to the horizontal direction, and light diffusion means for diffusing the light to the vertical direction can be provided.

In the device for stereoscopic display of the present invention, the beam deflection means is controlled by the deflection control unit and the deflection control unit can refer to a phase-distribution table in which a phase-distribution data are stored to determine a deflection angle of the beam deflection means. By these actions, it is not necessary to calculate the phase distribution whenever the picture is switched.

In the device for stereoscopic display of the present invention, a pair of polarizing plates which are arranged before and behind the beam deflection means and whose deflecting directions are crossed in an angle of 90 degrees ±10 can be provided.

In the device for stereoscopic display of the present invention, an elimination time of the display screen can be prepared in the deflection control unit in which the beam deflection means is controlled before rewriting the screen, when the deflection is moved from one virtual aperture to the next virtual aperture by the beam deflection means, and the deflection can be stopped during the time.

In the device for stereoscopic display of the present invention, an elimination time of the display screen can be prepared in the deflection control unit in which the beam deflection means is controlled before rewriting the screen, when the deflection is moved from one visual aperture to the next virtual aperture by the beam deflection means, and the deflection can be stopped during the time and the intensity of the image display by the two-dimensional picture display means can be darkened at the same time.

The device for stereoscopic display of the present invention can be provided with a record/replay unit for recording and replaying a photographed picture.

A system for stereoscopic picture communication of the present invention comprises a transmission side that transmits a plurality of two-dimensional pictures which vary in visual directions through a communication network and a receiving side that receives the transmitted two-dimensional pictures, and displays them by the two-dimensional picture display means which displays the received two-dimensional pictures, and displays a stereoscopic picture in a remote location by deflecting the light beamed from the picture element which organizes the pictures of the picture display means corresponding to the different visual directions in the beam deflection means. An apparatus for deflecting light whose liquid crystal is inserted among the transference electrodes arranged facing one another, and parallel stripes which function as a diffraction grating when the voltage is applied among the transference electrodes are produced at a pitch corresponding to the applied voltage in the liquid crystal is used for the beam deflection means.

BRIEF DESCRIPTION OF THE DRAWINGS

FIG. 3 and FIG. 4 are principle diagrams of an apparatus for deflecting light according to the embodiment 1 of the present invention.

FIG. 21 is a diagram indicating a method for arranging three apparatuses for deflecting light in a device for reading information of the embodiment 14 of the present invention.

FIG. 22 is a diagram indicating a scanning state of a scanning light in a device for reading information of the embodiment 14 of the present invention.

FIG. 23 is a strabismus diagram indicating a visual shape of a device for reading information according to the embodiment 15 of the present invention.

FIG. 24 is a strabismus diagram of a device for reading information and a host computer according to the embodiment 16 of the present invention.

FIG. 25 is a strabismus diagram of a device for reading information according to the embodiment 17 of the present invention.

FIG. 26 is a strabismus diagram of a device for reading information according to the embodiment 18 of the present invention.

FIG. 28 is a diagram indicating a state in which an original picture captured by a camera is divided into a visual point number of lines in a device for stereoscopic display of the embodiment 19 of the present invention.

FIG. 29 is a diagram indicating a state in which a line picture is rearranged after the division in a device for stereoscopic display of the present invention.

FIG. 39 is a diagram indicating a state of a transmitted light of an apparatus for deflecting light when no polarizing plate exists.

FIG. 40 is a diagram indicating a state of a zero-order light switching by a polarizing plate.

FIG. 41 is a diagram indicating a method for deflecting light when an apparatus for deflecting light is a single picture element in a device for stereoscopic display of the embodiment 19 of the present invention.

FIG. 42 is a timing chart diagram when an elimination of screen is executed among picture displays in a device for stereoscopic display of the embodiment 19 of the present invention.

FIG. 43 is a diagram indicating an example of a second method for deflecting light in an apparatus for deflecting light in a device for stereoscopic display of the embodiment 19 of the present invention.

FIG. 48 is a descriptive diagram of a phase distribution storage table when it has a horizontal parallax and a vertical parallax in a device for stereoscopic display of the embodiment 21 of the present invention.

FIG. 49 is a descriptive diagram of a two-dimensional picture storage table when it has a horizontal parallax and a vertical parallax in a device for stereoscopic display of the embodiment 21 of the present invention.

FIG. 52 is a descriptive diagram of a phase distribution storage table when it only has a horizontal parallax in a device for stereoscopic display of the embodiment 21 of the present invention.

FIG. 53 is a descriptive diagram of a two-dimensional picture storage table when it only has a horizontal parallax in a device for stereoscopic display of the embodiment 21 of the present invention.

FIG. 56 is a descriptive diagram of a phase distribution storage table when the picture is divided in a device for stereoscopic display of the embodiment 21 of the present invention.

FIG. 57 is a descriptive diagram of a deflecting state when a lenticular lens is installed on FIG. 54 to be magnified in a vertical direction optically in a device for stereoscopic display of the embodiment 21 of the present invention.

DETAILED DESCRIPTION OF THE PREFERRED EMBODIMENT

The preferred concrete examples of the present invention will be described on the basis of the drawings as follows.

V. G. M Phenomenon

First of all, V. G. M phenomenon will be described.

It has been reported that the parallel stripes of the number $\mu$m pitch will appear when the voltage exceeds some fixed threshold, if some kind of nematic liquid crystal molecules are caught in among the transference electrodes to apply a dc voltage or an alternating voltage (B. H. Soffer et, al. Opt. Eng. 22, 6, 1983). The phenomenon is referred to as V. G. M (Variable Grating Mode).

The parallel stripes are caused by the distribution of the secondary orientation within the liquid crystal, and the pitch (namely, the spatial frequency) of the parallel stripes changes depending on the size of the applied voltage.

Figure 1:
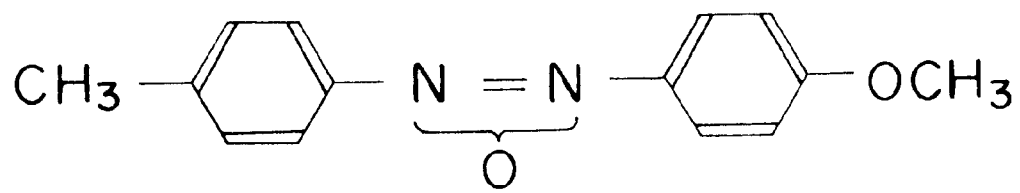
FIG. 1 is a chemical formula of a concrete example of a liquid crystal used for an apparatus for deflecting light of the present invention.

Besides, the permittivity difference of the liquid crystal in which the V. G. M phenomenon occurs is often $\Delta\epsilon<0$. The representative example of the liquid crystal in which V. G. M phenomenon occurs is shown in FIG. 1. The liquid crystal is on the market as N-4 of Merc corporation and is available.

The angle of diffraction can be changed by changing the applied voltage, since the parallel stripes function as a diffraction grating. Besides, it is understood that the pitch of the parallel stripes becomes narrower and the angle of diffraction gets bigger in proportion to the enlargement of the applied voltage.

The apparatus for deflecting light of the present invention makes use of the V. G. M phenomenon.

Apparatus for Deflecting Light

Then, the preferred embodiments of the apparatus for deflecting light of the present invention will be described referring to the drawings.

EMBODIMENT 1

Apparatus for Deflecting Light

Figure 2:
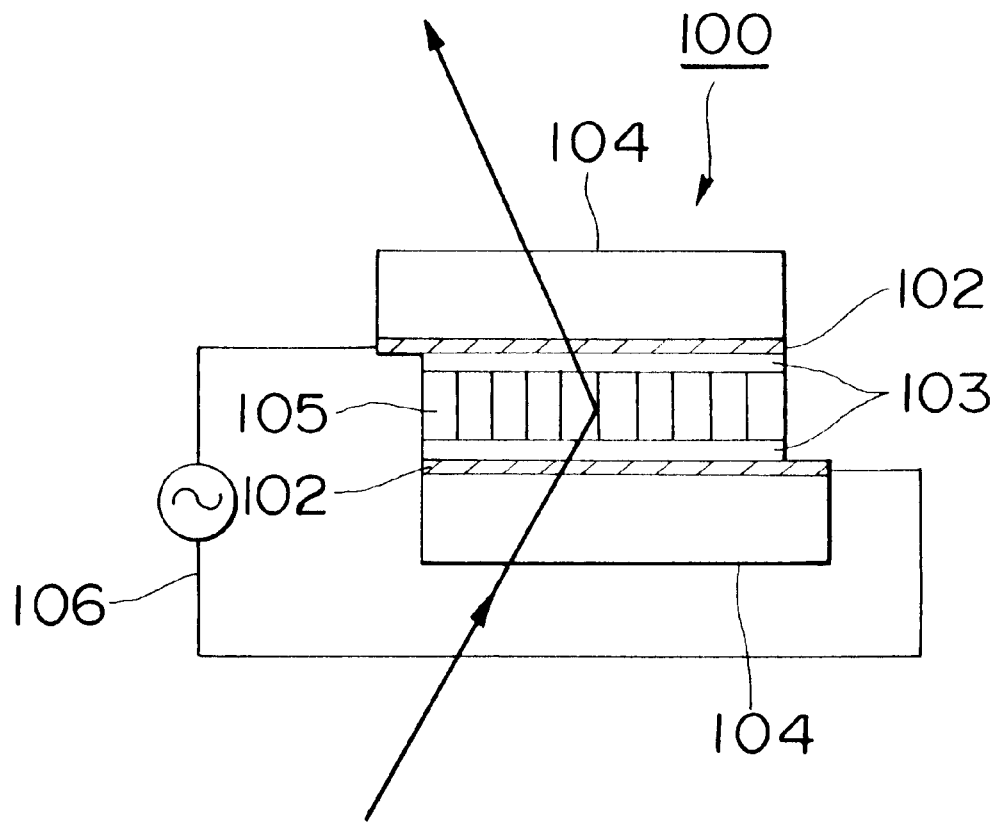
FIG. 2 is a basic construction diagram of an apparatus for deflecting light according to the embodiment 1 of the present invention.

FIG. 2 is a basic construction diagram of the apparatus for deflecting light of the present invention. The apparatus for deflecting light 100 comprises a pair of transparent glass plates 104, 104 provided with a transference electrode 102 and a orientation film 103 on one surface arranged facing one another and a liquid crystal (for instance, the above-mentioned N-4 made by Merck enterprise) 105 in which the V. G. M phenomenon occurs and which is inserted between the glass plate 104 and the glass plate 104. The drive circuit 106 is connected to the transference electrodes 102, 102 so that an alternating voltage or a dc voltage can be applied among the transference electrodes.

Figure 3:
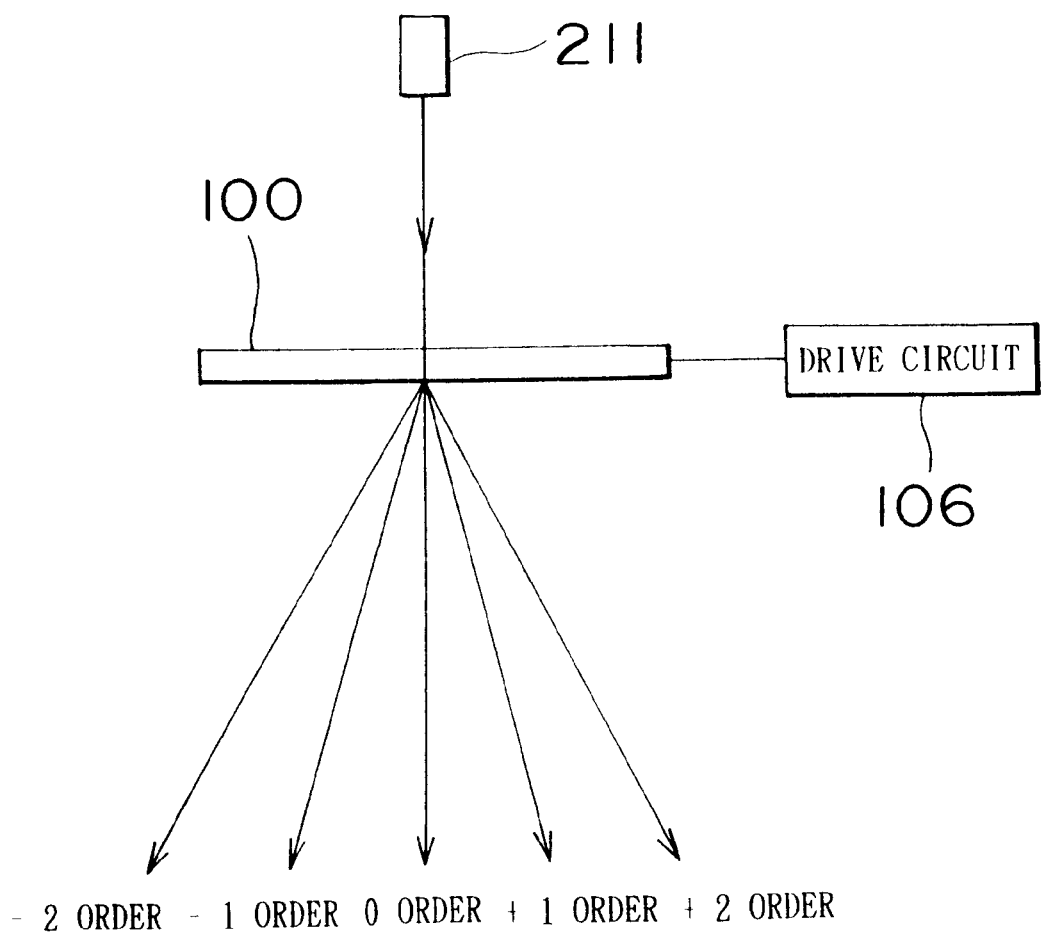

In the apparatus for deflecting light 100, the parallel stripes appear when the voltage is applied between the transference electrode 102 and the transference electrode 102, and the parallel stripe functions as an diffraction grating. Accordingly, as shown in FIG. 3 and FIG. 4, and the transmitted light (the zero-order light) and the ±primary and ± secondary diffracted light appear on the outgoing light side, when the light beamed from the light source 211 is injected into the apparatus for deflecting light 100. Besides, in the drawings, the high-order diffracted light more than the tertiary light is omitted since its intensity is so small.

It has been reported that the polarization direction will be perpendicular in the odd-order diffracted light, the zero-order light and the even-order diffracted light, if the incident light is converted into the linearly polarized light (B. H. Soffer et,al. Opt. Eng 22, 6, 1983). Namely, the zero-order light and the even-order diffracted light will be S polarized light and the odd-order diffracted light will be P polarized light, if the incident light is S polarized light.

The light will be deflected if one of the diffracted lights is used as a outgoing light. Generally, the diffracted light whose intensify is the strongest of the diffracted lights is used as the outgoing light, and it is often + primary diffracted light. Further, as mentioned hereinafter, the zero-order light and the secondary light can be removed by using the polarized as occasion demands.

The pitch of the parallel stripes will change and the angle of diffraction will change, if the size of the voltage applied between the transference electrode 102, and the transference electrode 102 is changed. Accordingly, the angle of diffraction can be fixed if the size of the voltage applied between the transference electrode 102 and the transference electrode 102 is fixed, and the angle of diffraction will be variable if the size of the voltage applied between the transference electrode 102 and the transference electrode 102 is variable. Especially, the angle of diffraction can be changed continuously if the voltage value is changed continuously.

Further, the apparatus for deflecting light can be produced in the same way as the common liquid crystal. For instance, first of all, the rubbing is executed by forming the transference electrode pattern 102 on each back of one pair of transparent glass plate 104 and spreading the orientation film 103 over the back of the each transparent glass plate 104. Then, the transparent glass plates 104, 104 are arranged facing one another by making the transference electrode 102 the inner side so as to vacuum-lock them by spreading and inserting a unillustrated spherical spacer between them. Then, the producing of the apparatus for deflecting light is completed by breaking a vacuum and filling up the transparent glass plates 104, 104 with the liquid crystal.

The transference electrodes patterns 102, 102 do not have to be the same as the liquid crystal display and the transference electrodes 102, 102 only have to be connected to the surface of the inner side of the transparent glass plate 104 wholly.

Device for Scanning Light

Then, the preferred embodiments of a device for scanning light of the present invention will be described referring to the drawings. The device for scanning light of the present invention makes use of the apparatus for deflecting light.

EMBODIMENT 2

Device for Scanning Light

Figure 5A:
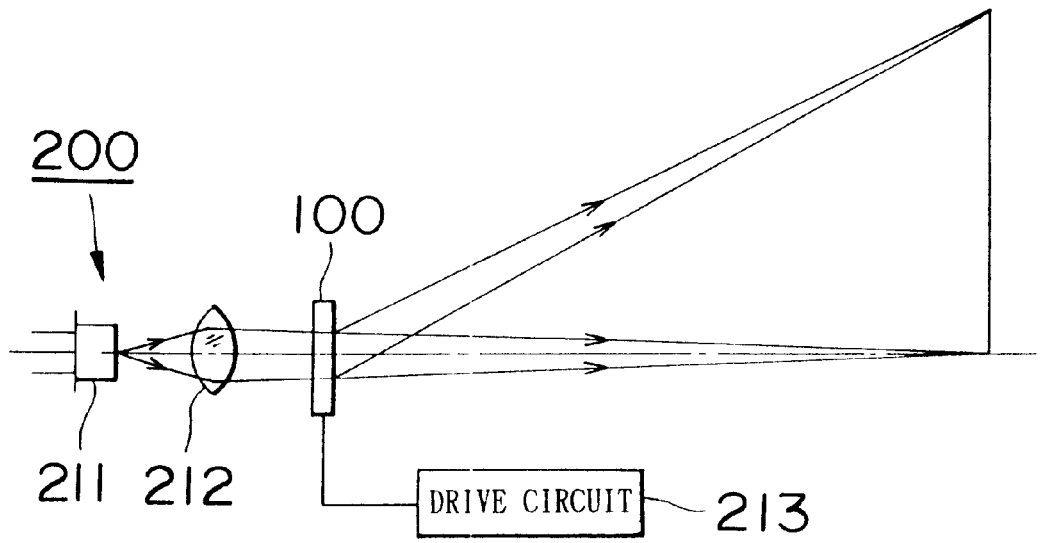
FIG. 5 is a construction diagram of a device for scanning light according to the embodiment 2 of the present invention, and (A) indicates a case that the scanning light scans one side bordering the light axes, (B) indicates a case that the scanning light scans both sides extending over the light axes.

FIGS. 5(A), (B) are the construction diagrams indicating the embodiments of the device for scanning light 200 of the present invention respectively.

The device for scanning light comprises an apparatus for deflecting light 100, a light source 211 arranged on the incident light side of the apparatus for deflecting light 100, a condensing lens (the optical element for converging light) 212 consisting of the convex lens arranged between the apparatus for deflecting light 100 and the light source 211 and a drive circuit 213 which applies a voltage to the apparatus for deflecting light 100. The drive circuit 213 is capable of applying the voltage whose size changes periodically to the apparatus for deflecting light 100.

The light source 211 and the apparatus for deflecting light 100 are arranged on the optical axis of the condensing lens 212. The laser light of S polarized light is beamed from the light source 211, and is converted into the focusing light by the condensing lens 212. The apparatus for deflecting light 100 is arranged closer to the condensing lens 212 than the image formation point by the condensing lens 212. Accordingly, the light which permeated through the condensing lens 212 is deflected by the apparatus for deflecting light 100 before being converged into the image formation point.

Figure 6A:
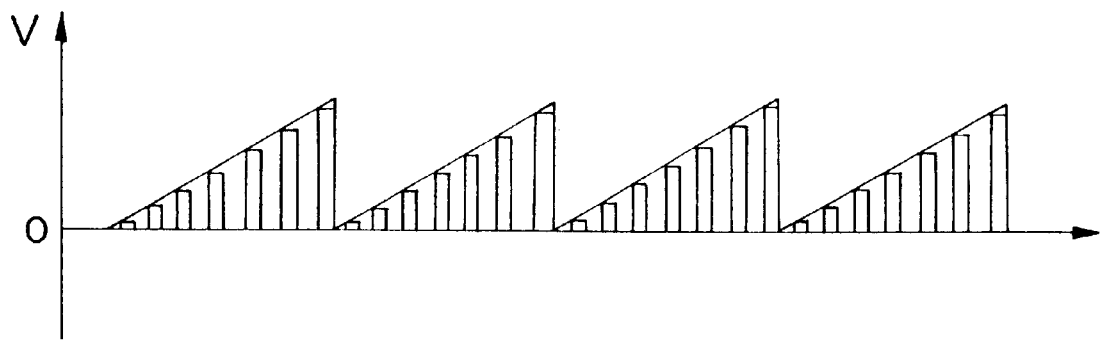
FIG. 6 is a diagram indicating an example of a waveform of a voltage applied to an apparatus for deflecting light of the present invention, and (A) and (C) indicate a case of alternating voltage, (B) indicates a case of dc voltage.
Figure 6B:
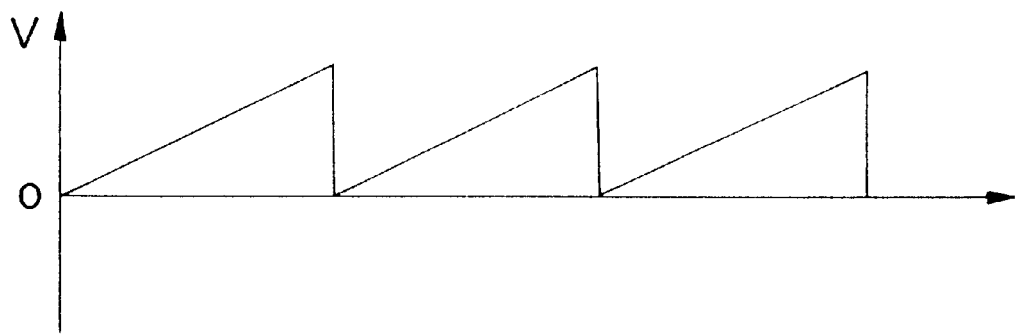

FIG. 6 is a diagram indicating an example of a waveform of a voltage applied between the transference electrode 102 and the transference electrode 102 of the apparatus for deflecting light 100. FIGS. 6(A), (C) indicate a case of alternating voltage, FIG. 6(B) indicates a case of dc voltage.

Although the alternating signal is given by the pulse in FIGS. 6(A), (C), the alternating signal is not limited to this alternating signal, and, for instance, the alternating signal whose voltage value increases and decreases continuously can be substituted.

As mentioned hereinbefore, the angle of diffraction of the apparatus for deflecting light 100 will change temporally, if the size of the voltage applied between the transference electrode 102 and the transference electrode 102 is changed temporally. Accordingly, the scanning light which is a diffracted light will be scanned rectilinearly if the light is injected into the apparatus for deflecting light 100. Further, the scanning cycle of the scanning light will be synchronized with the cycle of the voltage.

Figure 5B:
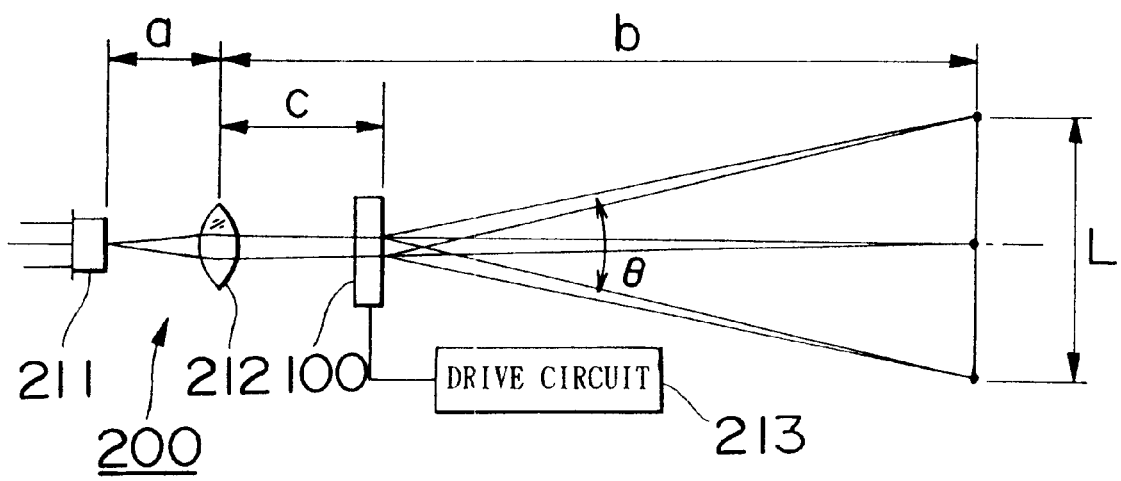

Hereupon, the scanning light should be scanned on one side bordering the optical axis of the condensing lens 212 as shown in FIG. 5(A), when the voltage changes either in a positive region or in a negative region like FIGS. 6(A), (B). The scanning light should be scanned on the both sides extending over the light axes as shown in FIG. 5(B), when the voltage changes both in the positive region and in the negative region like FIG. 6(C). Further, the scanning speed of the scanning light will be determined by the frequency of the voltage applied to the apparatus for deflecting light 100.

Figure 6C:
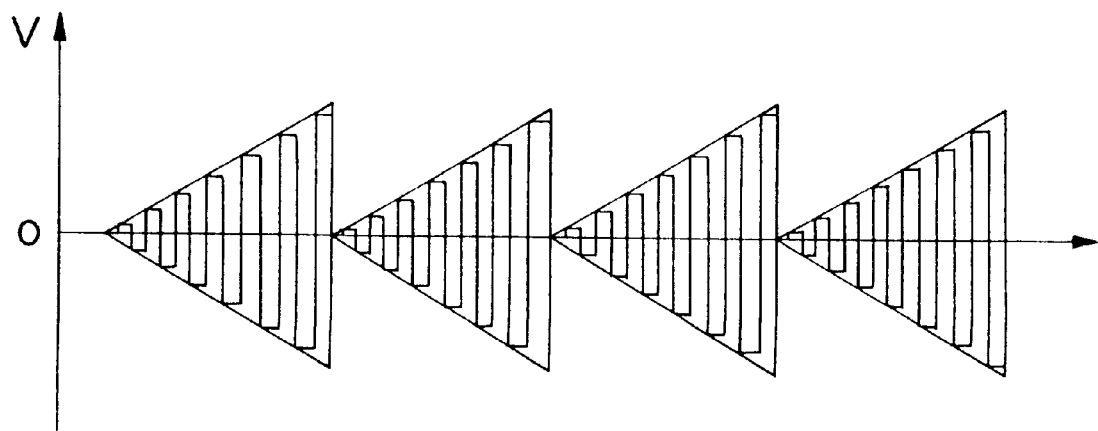

Hereupon, for instance, if the light beamed from the light source 211 is a semiconductor laser light of wavelength 670 nm, the waveform of the voltage applied between the transference electrode 102 and the transference electrode 102 is like FIG. 6(C) and the spatial frequency of the parallel stripes which occur in the apparatus for deflecting light 100 has changed within the limit from 0 to 1000/mm, the maximum value of the deflection angle will be ±21 degrees and the maximum value will be 42 degrees as a scanning angle θ shown in FIG. 5(B).

In FIG. 5(B), if the distance from the light source 211 to the condensing lens 212 is 11.1 mm, and the focal length of the condensing lens 212 is 10 mm, the light which permeated through the condensing lens 212 will be converged into a point where the distance b from the condensing lens 212 is 100 mm to be formed as an image. Then, if the distance c from the condensing lens 211 to the apparatus for deflecting light 100 is 9 mm, the scanning width L of the scanning light will be 70 mm.

According to the device for scanning light 200, the vibration will not occur and the reply delay will not occur, since it does not have a mechanically movable part. Besides, the optical axis will not be slipped off, since the vibration does not occur.

In the case of the device for scanning light 200, the scanning width and the scanning speed of the scanning light can be controlled electrically, so the controllability is very excellent. Especially, the scanning light can be scanned continuously by changing the voltage value applied to the transference electrodes 102 continuously.

Besides, the image formation point of the light can be closer to the apparatus for deflecting light 100 compared with the case that the condensing lens is not installed, and the device can be miniaturized, when the light beamed from the light source 211 is a focusing beam, if the condensing lens 212 as an optical element for converging light is installed on the incident light side of the apparatus for deflecting light 100 like the embodiment 2. The light beamed from the light source 211 can be converged to be formed as an image, if the light beamed from the light source 211 is a divergent beam or a parallel beam.

EMBODIMENT 3

Device for Scanning Light

Figure 7:
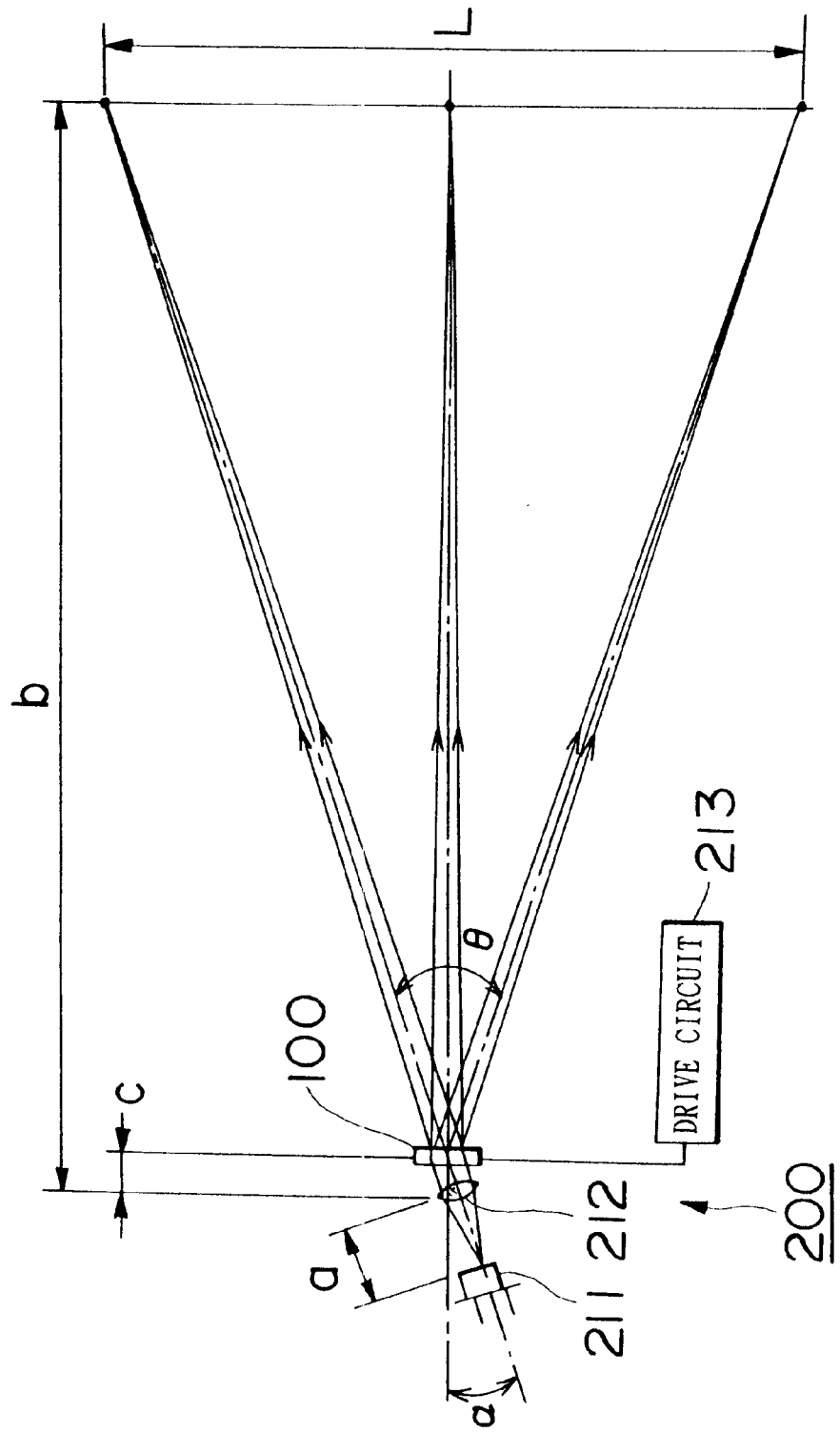
FIG. 7 is a construction diagram of a device for scanning light according to the embodiment 3 of the present invention.

FIG. 7 is a construction diagram indicating another embodiment of a device for scanning light 200 of the present invention.

The device for scanning light 200 of the embodiment 3 is the same as the above-mentioned device for scanning light 200 of the embodiment 2 by reason that it comprises an apparatus for deflecting light 100, a light source 211, a condensing lens 212 and a drive circuit 213.

The difference between the device for scanning light 200 of the embodiment 3 and the device for scanning light 200 of the embodiment 2 is the fact that Bragg condition will be met when the parallel stripes of the apparatus for deflecting light of the embodiment 3 become the predetermined spatial frequency, namely, the incident angle of the light injected into the apparatus for deflecting light 100 will be equal to the angle of diffraction of the diffracted light used as a scanning light.

The diffraction efficiency will be maximized and the intensity of the diffracted light used as a scanning light will be maximized, so the intensity of other diffracted light can be kept small sufficiently, when Bradd condition is met.

In the embodiment 3, for instance, if the light beamed from the light source 211 is a semiconductor laser light of the wavelength 670 nm, the waveform of the voltage applied between the transference electrode 102 and the transference electrode 102 is like FIG. 6(A) or (B), the spatial frequency of the parallel stripes that occur in the apparatus for deflecting light 1 has changed within the limit from 0 to 1000/mm and Bradd condition is met by the spatial frequency of 1000/mm, the incident light angle α will be 19.6 degrees, and the scanning angle θ will be 39.2 degrees.

If the distance from the light source 211 to the condensing lens 212 is 11.1 mm, and the focal length of the condensing lens 212 is 10 mm, the light which has permeated through the condensing lens 212 will be converged into a point where the distance b from the condensing lens 212 is 100 mm to be formed as an image. In this case, the scanning width L of the scanning light can be 70 mm like the embodiment 2 if the distance C from the condensing lens 211 to the apparatus for deflecting light 100 is 2 mm.

EMBODIMENT 4

Device for Scanning Light

Figure 8A:
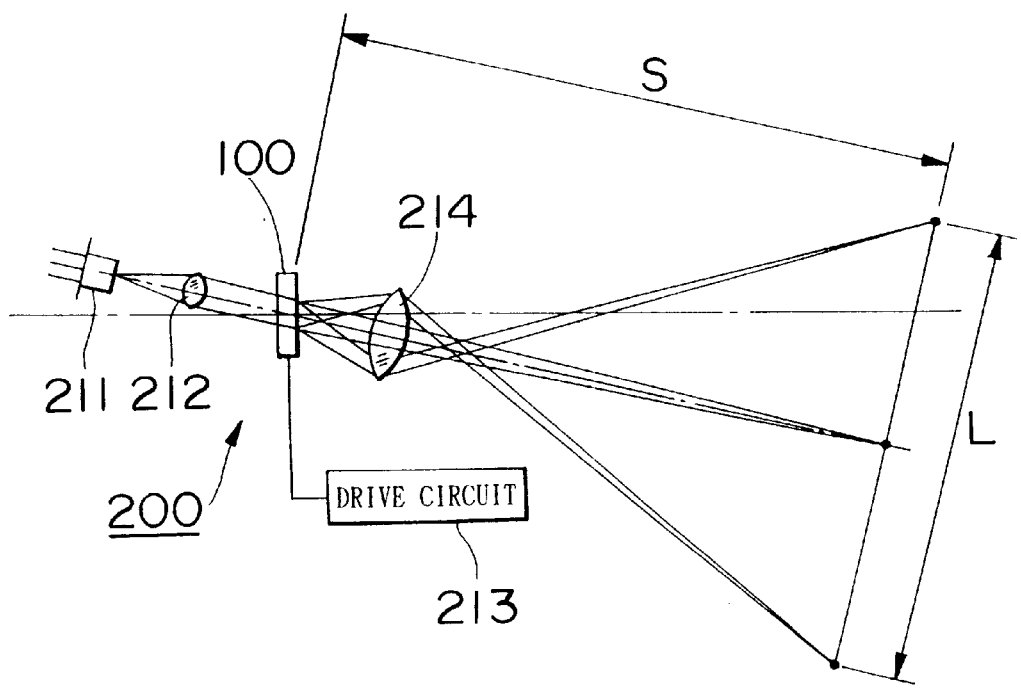
FIG. 8 is a construction diagram of a device for scanning light according to the embodiment 4 of the present invention, and (A) indicates a case that a convex lens is used as an optical element which enlarges a deflection angle, (B) indicates a case that a concave lens is used as an optical element which enlarges a deflection angle.

FIGS. 8(A), (B) are the construction diagrams indicating another embodiment of a device for scanning light of the present invention.

The device for scanning light 200 of the embodiment 4 is installed on the outgoing light side of the apparatus for deflecting light 100 and is provided with a convex lens 214 or a concave lens 215 closer to the condensing lens 212 than the image formation point by the condensing lens 212, in addition to the components of the device for scanning light 200 of the above-mentioned embodiment 3. The convex lens 214 or the concave lens 215 functions to enlarge the deflection angle substantially.

First of all, the case that the convex lens and the concave lens do not exist will be considered as a comparison example. In this case, for instance, if the light beamed from the light source 211 is a semiconductor laser light of the wavelength 670 mm, the waveform of the voltage applied between the transference electrode 102 and the transference electrode 102 is like FIG. 6(C), the spatial frequency of the parallel stripes which occurs in the apparatus for deflecting light 100 has changed within the limit from 0 to 500/mm, the Bradd condition is met by the spatial frequency of 400/mm, the incident light angle α will be 7.7 degrees and the scanning angle θ will be 15.4 degrees.

In this case, the distance S from the apparatus for deflecting light 100 to the image formation point must be 259 mm so that the scanning width L of the scanning light will be 70 mm like the embodiment 2.

Hereupon, as shown in FIG. 8(A), the light deflected by the apparatus for deflecting light 100 will be crossed with the optical axis in a position which is about 7.5 mm to the outgoing light side from the convex lens 214 after being injected into the convex lens 214, and it will be widened again to be formed as a image, if the convex lens 214 of the focal distance 5 mm is installed on the optical axis which is common to the condensing lens 214 in a position which is 15 mm to the outgoing light side from the apparatus for deflecting light 100. The scanning width L of the scanning light will be 70 mm in a position which is about 138.5 mm from the convex lens 214, since the displacement width of the light in the convex lens 214 is about 4 mm.

Accordingly, the distance S from the apparatus for deflecting light 100 to the image formation point will be about 153.3 mm, and it can be shortened only 105.5 mm compared with the distance S of 259 mm when the convex lens is not installed.

Figure 8B:
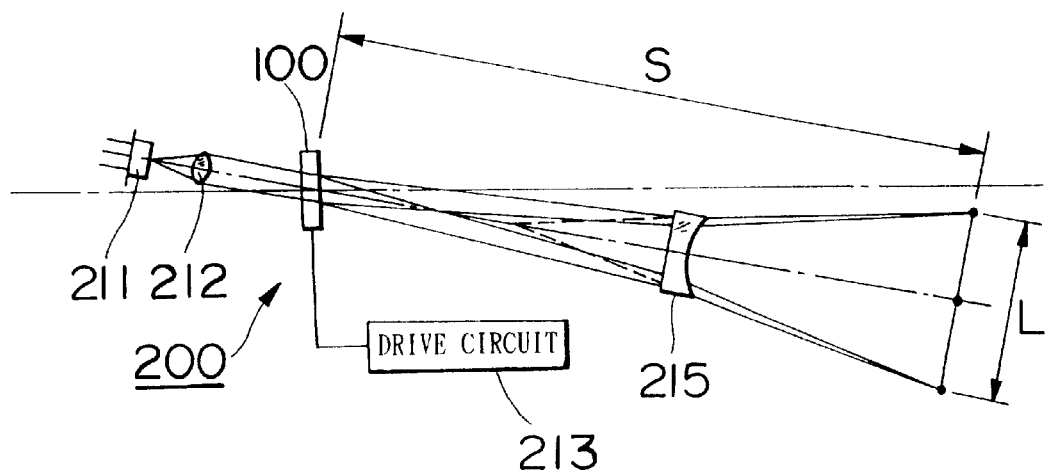
Figure 9:
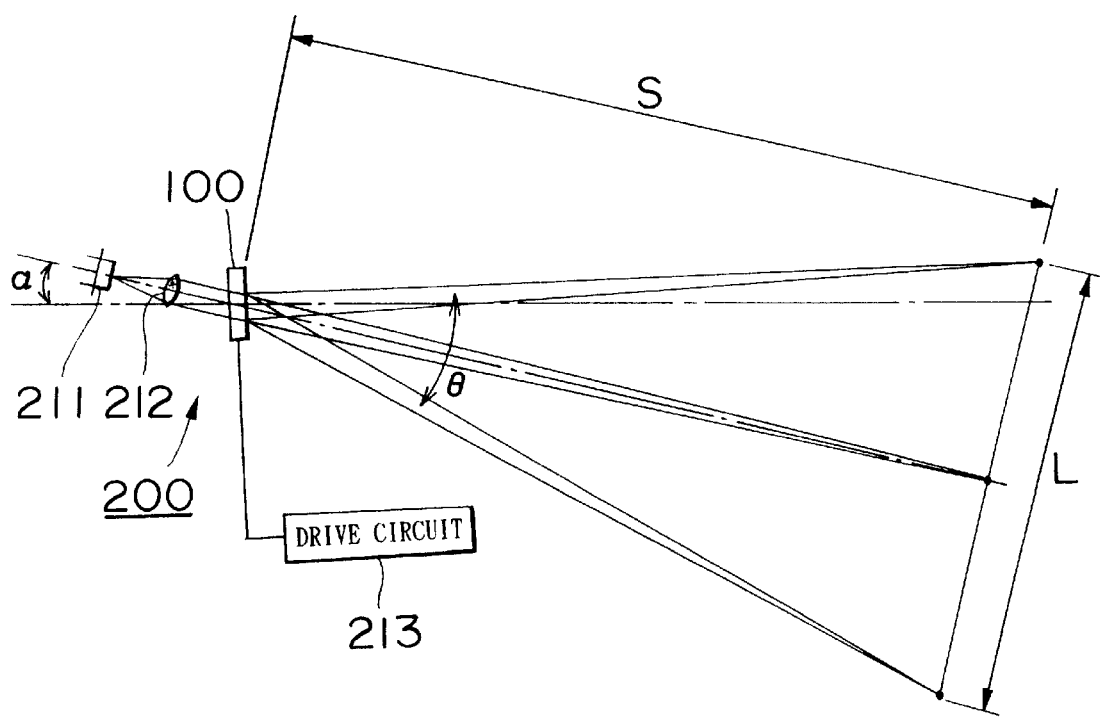
FIG. 9 is a construction diagram of a relative example of a device for scanning light of the embodiment 4 of the present invention.

As shown in FIG. 8(B), the light deflected by the apparatus for deflecting light 100 will be diverged as though the focus existed in a position which is 75 mm to the incident light side of the concave lens 215 and will be formed as a image, if the concave lens 215 whose focal distance is 50 mm is installed on the optical axis which is common to the condensing lens 212 in a position which is 150 mm to the outgoing light side from the apparatus for deflecting light 100. The scanning width L of the scanning light will be 70 mm in a position which is about 56 mm from the concave lens 215, since the displacement width of the light in the concave lens 215 is about 40 mm.

Accordingly, the distance S from the apparatus for deflecting light 100 to the image formation part of the scanning light will be 206 mm, and it can be shortened only 53 mm compared with the distance S of 259 mm when the concave lens is not installed.

EMBODIMENT 5

Device for Scanning Light

Figure 10:
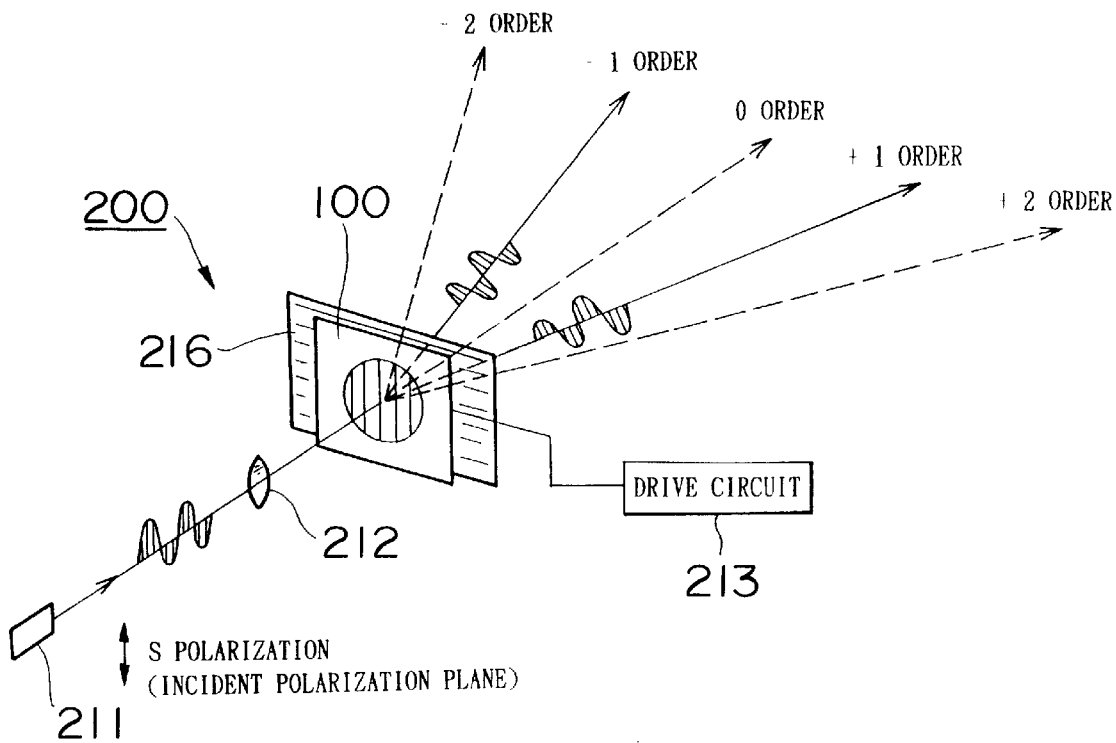
FIG. 10 is a construction diagram of a device for scanning light according to the embodiment 5 of the present invention.

FIG. 10 is a construction diagram indicating another embodiment of a device for scanning light of the present invention.

In the device for scanning light of the embodiment 5, a polarizer 216 is installed on the outgoing light side of the apparatus for deflecting light 100, in addition to the components of the device for scanning light of the above-mentioned embodiment 2. The functions of the polarizer 216 will be described as follows.

As mentioned hereinbefore, the diffracted lights other than the diffracted light used as a scanning light also exist on the outgoing light side of the apparatus for deflecting light 100. It sometimes happens that a restriction will be added to the construction of the device for scanning light and the efficiency will receive a bad influence, if such diffracted light exists.

For instance, the reading accuracy will be deteriorated, since the lights except the + primary light which is a scanning light will be irradiated to the bar code and its reflected light will be injected into the apparatus for detecting light, if no difference exists in an angle of diffraction of each diffracted light, when the diffracted light is used for the bar code reader. On the other hand, it will be necessary to design a hologram so that an angle difference will occur in an angle of diffraction of each diffracted light, if an attempt to improve the reading accuracy is made.

On the other hand, the extra diffracted lights except the scanning light can be cut off, if the polarizer 216 is installed on the outgoing light side of the device for scanning light 100 of the present invention.

Hereupon, as shown in FIG. 10, it is assumed that the laser light of S polarization is beamed from the light source 211, and the polarizer 216 is arranged so that the polarization direction of the injected light and the polarization direction of the polarizer 216 will be perpendicular.

Then, in the device for scanning light 200, the zero-order light (the transmitted light) in which the polarizer 216 and the polarization direction are perpendicular the even-order diffracted light will be cut off by the polarizer 216, and only + primary diffracted light and − primary diffracted light will permeate through the polarizer 216. The existence of the − primary diffracted light will hardly be at issue practically, since the angle difference between the +primary diffracted light and the −diffracted light is large, even though the − primary diffracted light is unnecessary when the − primary diffracted light is used as a scanning light.

Accordingly, the device for scanning light will hardly be influenced by the diffracted lights except a scanning light, the efficiency of the device for scanning light can be improved, and the simplification of the device and the enlargement of degree of freedom of the design can be attained.

EMBODIMENT 6

Device for Scanning Light

Figure 11:
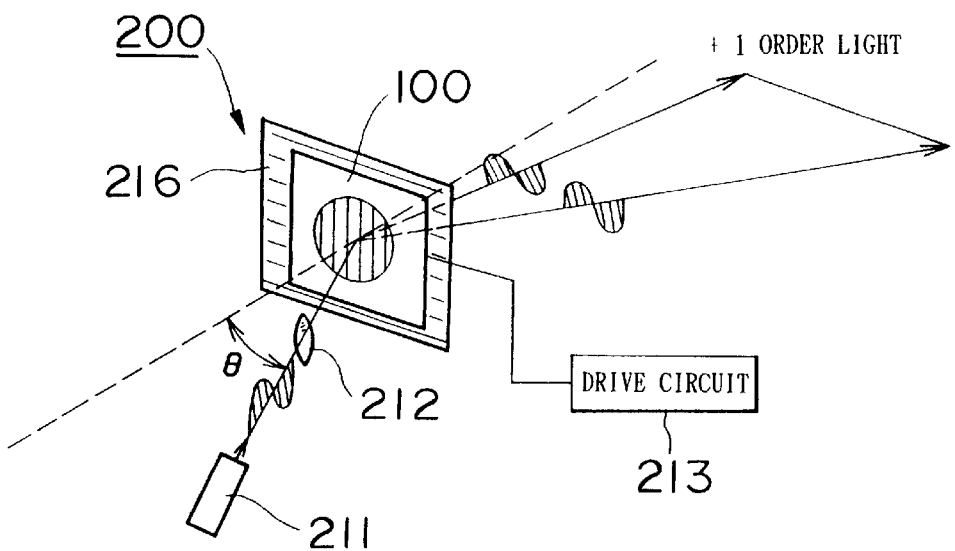
FIG. 11 is a construction diagram of a device for scanning light according to the embodiment 6 of the present invention.

FIG. 11 is a construction diagram indicating another embodiment of a device for scanning light 200 of the present invention.

In the device for scanning light 200 of the embodiment 6, a polarizer 216 is installed on the outgoing light side of the apparatus for deflecting light 100, in addition to the components of the device for scanning light 200 of the above-mentioned embodiment 3.

In the embodiment 6, the device for scanning light is set up so that the incident light angle $\theta$ of the incident light against the apparatus for deflecting light will be the Bragg angle of the + primary diffracted light, when the parallel stripes of the apparatus for deflecting ling becomes the predetermined spatial frequency (for instance, the maximum spatial frequency).

The diffraction efficiency of the + primary diffracted light will be maximized and the intensity of the diffracted lights except the + primary diffracted light can be minimized sufficiently, if the incident light angle $\theta$ is set up as mentioned hereinbefore. Accordingly, the intensity of the − primary diffracted light which is capable of permeating through the polarizer 216 can be minimized to the utmost, and the efficiency can be further improved than the case of the above-mentioned embodiment 5.

Device for Reading Information

Then, the preferred embodiments of a device for reading information of the present invention will be described referring to the drawings. The device for reading information of the present invention makes use of the device for scanning light.

What is called a bar code reader is one example of the device for reading information. The device for reading information will be described taking the bar code reader for instance as follows.

The bar code reader of the present invention scans the light beam on the bar code by deflecting the light beamed from the light source in the apparatus for deflecting light, and controlling the voltage applied to the apparatus for deflecting light in the drive circuit.

Figures 12A, 12B, 12C:
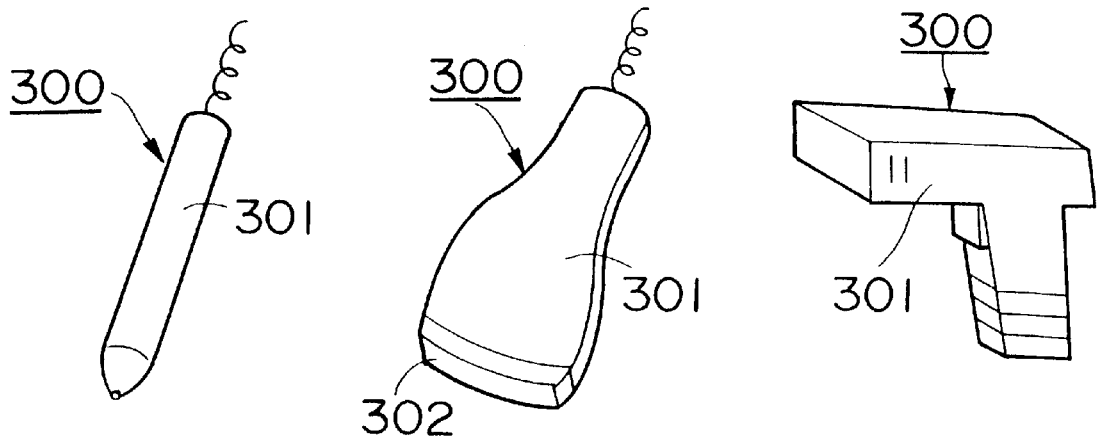
FIG. 12 is an visual strabismus diagram of a bar code reader as a device for reading information of the present invention.

As shown in FIG. 12, there are three types of bar code reader 300. FIG. 12(A) is a pen-type bar code reader 300. In this type, the light does not scan for itself and the operator scans the light by letting the bar code reader slip, bringing the point of the bar code reader into contact with the bar code and reads the information.

FIG. 12(B) is a touch-type bar code reader 300. In this type, the scanning light scans for itself to read the information, even if the operator does not operate the bar code reader 300. Namely, the scanning light will scan for itself on the bar code if the operator puts the point 302 of the frame 301 of the bar code reader 300 on the bar code so that it will be almost contacted.

FIG. 12(C) is a gun-type bar code reader 300. In this type, the bar code reader 300 is operated separating from the bar code. The gun-type bar code reader 300 is suitable for being used in a place where a getting the bar code reader 300 closer to the bar code is difficult. The gun-type bar code reader 300 consists of two types of bar code reader 300. Namely, the bar code reader 300 in which the light scans for itself as mentioned hereinbefore and the bar code reader 300 in which the light does not scan for itself.

Although the device for reading information of the present invention can be applied to the type in which the scanning light does not scan for itself, the device becomes effective in particular when it is applied to the type in which the scanning light scans for itself. The state of the bar code reader 300 of the type in which the scanning light scans for itself will be described in the following embodiment.

EMBODIMENT 7

Device for Reading Information

Figure 13A:
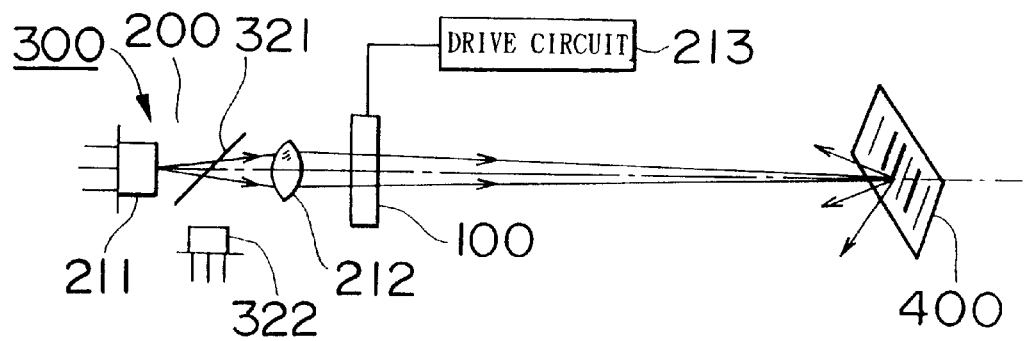
FIG. 13 is a construction diagram of a device for reading information according to the embodiment 7 of the present invention, and (A) is a diagram describing an optical path when the light is scanned, (B) is a diagram describing an optical path when the light is detected.

FIGS. 13(A), (B) are construction diagrams of optical systems of a bar code reader 300 of the present invention. The optical systems are included in the frame 301 of the bar code reader 300.

The bar code reader 300 comprises a device for scanning light 200, a half mirror 321 arranged between the light source 211 of the device for scanning light 200 and the condensing lens 212, and an apparatus for detecting light 322.

As shown in FIG. 13(A), the light beamed from the light source 211 is injected into the condensing lens 212 through the half mirror 321, and is deflected by the apparatus for deflecting light 100. Hereupon, the light beam is scanned on the bar code 400 (the information medium), since the space of the fringes of the apparatus for deflecting light is changed continuously by the drive signal transmitted from the drive circuit 213.

Figure 13B:
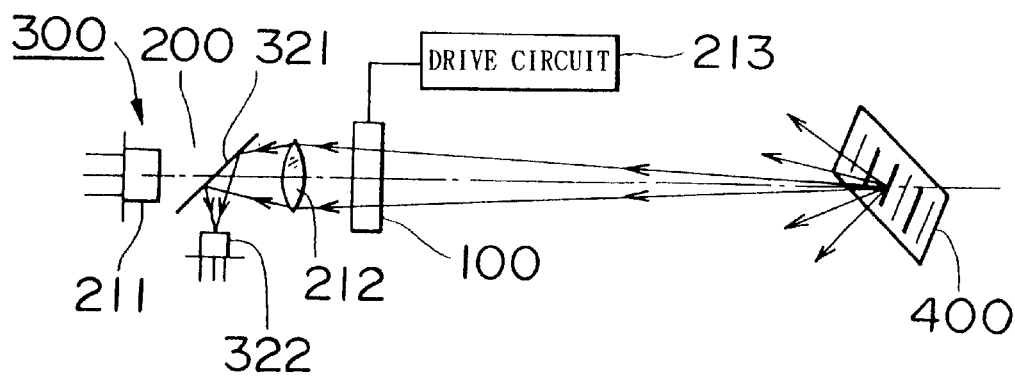

As shown in FIG. 13(B), a part of the lights which reflected in bar code 400 passes through the apparatus for deflecting light 100 moving backward, passes through the condensing lens 212 and reflects in the half mirror 321 to be injected into the apparatus for detecting light 322.

The reflected light can be formed as an image in the apparatus for detecting light 322, if the distance from the light source 211 to the half mirror 321 is equal to the distance from the half mirror 321 to the apparatus for detecting light 322.

EMBODIMENT 8

Device for Reading Information

Figure 14:
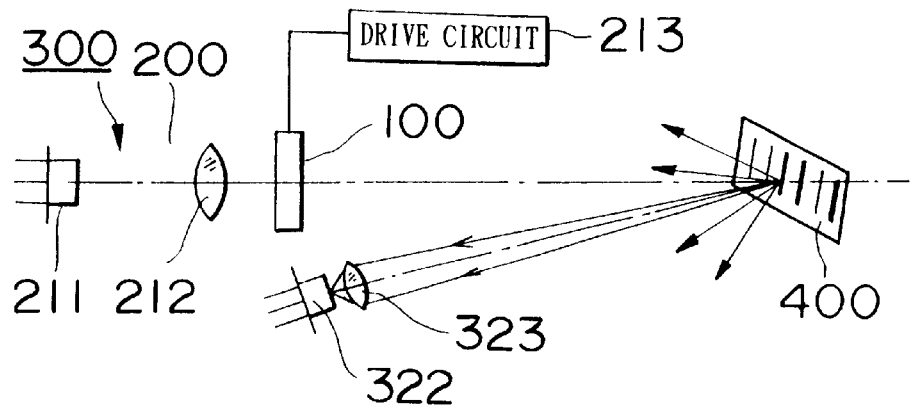
FIG. 14 is a construction diagram of a device for reading information according to the embodiment 8 of the present invention.

FIG. 14 is a construction diagram of an optical system in another embodiment of the bar code reader 300.

The bar code reader of the embodiment 8 is not provided with a half mirror 321, but it is provided with a condensing lens 323 having the light axes which crosses on the image formation point of the scanning light against the light axes of the condensing lens 212, and the apparatus for detecting light 322 is installed in the rear (the outgoing light side) of the condensing lens 323.

The light beam outputted from the device for scanning light 200 reflects and scatters in the bar code 400. Accordingly, a part of the scattered lights can be condensed by the condensing lens 323 to be formed as an image on the apparatus for detecting light 322, even if the optical axes of the condensing lens 212 and the condensing lens 322 are slipped off.

EMBODIMENT 9

Device for Reading Information

Figure 15:
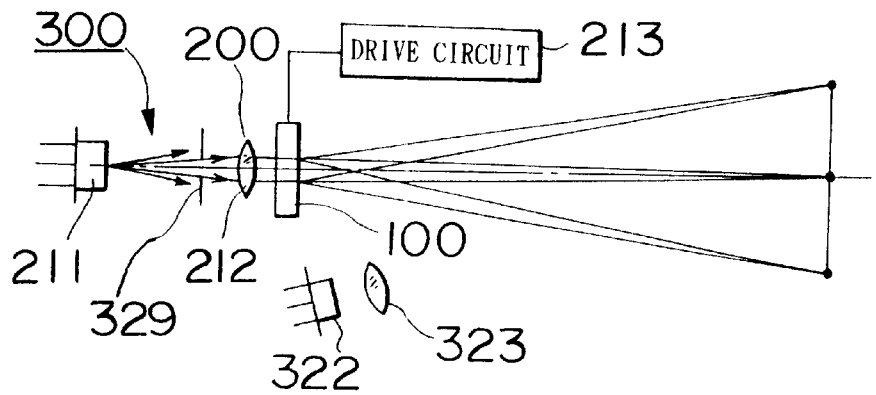
FIG. 15 is a construction diagram of a device for reading information according to the embodiment 9 of the present invention.

FIG. 15 is a construction diagram of an optical system in another embodiment of the bar code reader 300.

The difference between the bar code reader 300 of the embodiment 8 and the bar code reader 300 of embodiment 9 is the fact that an aperture 329 which has a hole is installed between the light source 211 of the device for scanning light 200 and the condensing lens 212 in the bar code reader 300 of the embodiment 9, even though the basic construction of the bar code reader 300 of the embodiment 9 is the same as the basic construction of the bar code reader 300 of the above-mentioned embodiment 8.

The beam diameter can be reduced and the predetermined reflected light intensity contrast which is capable of discriminating the bar code 400 can be adopted, if the aperture 329 is installed.

Further, the shape of the beams irradiated to the bar code 400 is not limited to a circle and the beams of such various shapes as an elliptical can be irradiated to the bar code 400. The beam shape can be set up appropriately depending on the shape of the hole made on the aperture 329, if the aperture 329 is installed.

EMBODIMENT 10

Device for Reading Information

Figure 16:
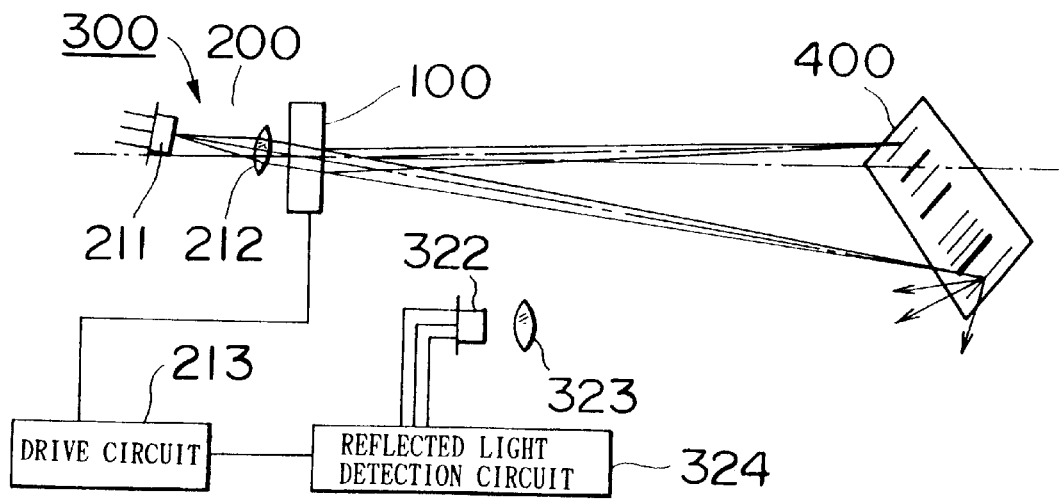
FIG. 16 is a construction diagram of a device for reading information according to the embodiment 10 of the present invention.

FIG. 16 is a construction diagram of an optical system of another embodiment of the bar code reader 300.

The bar code reader 300 comprises a device for scanning light 200 corresponding to FIG. 7, an apparatus for detecting light 322 which detects the light that reflected in the bar code 400 and a condensing lens 323 installed on the incident light side of the apparatus for detecting light 322.

The bar code reader 300 scans the light beam after it is confirmed that the light beam is irradiated to the bar code 400, since the detection result of the apparatus for detecting light 322 for reading bar codes when the scanning light is irradiated to the bar code 400 is different from the detection result of the apparatus for detecting light when the scanning light is irradiated to the bar codes except the bar code 400.

For this reason, in the bar code reader 300, the size of the voltage applied to the apparatus for deflecting light should be set to 0, and the state that the light beam is not scanned at the start should be created before the light is scanned. The light permeates through the apparatus for deflecting light without being deflected when the size of the voltage applied to the apparatus for deflecting light is 0.

It is judged that the light beam is irradiated to the bar code, when the reflected light of the transmitted light in the bar code 400 is detected by the apparatus for detecting light 322 and the intensity of the reflected light reaches the predetermined level.

Then, a trigger occurs in the reflected light detection circuit 324 when the reflected light of the predetermined intensity is detected by the apparatus for detecting light, and the drive circuit 213 which applies the voltage to the apparatus for deflecting light 1 is switched ON by the trigger signal so that the scanning light will be scanned.

It is judged that the light beam is not irradiated to the bar code, and the scanning of the light beam is not executed after that, when the intensity of the reflected light does not reach the predetermined level.

Besides, the drive circuit can be switched ON manually after the operator confirms visually that the transmitted light is positioned on the-bar code 400.

EMBODIMENT 11

Device for Reading Information

Figure 17:
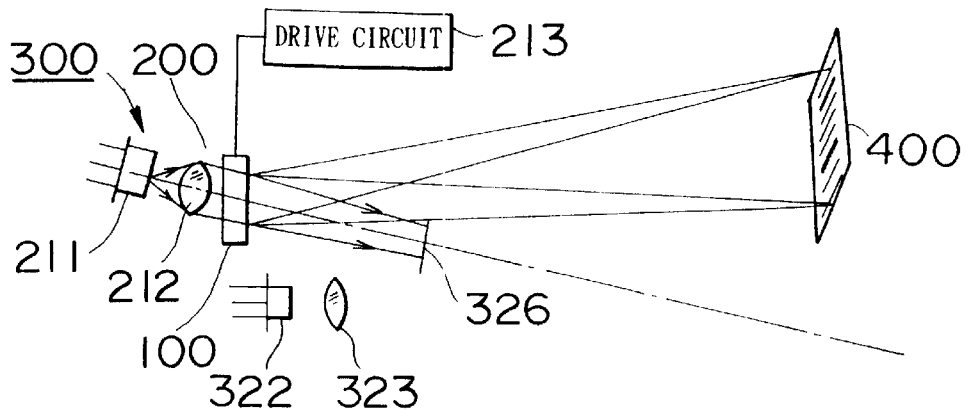
FIG. 17 is a construction diagram of a device for reading information according to the embodiment 11 of the present invention.

FIG. 17 is a construction diagram of an optical system of another embodiment of the bar code reader 300.

The bar code reader 300 comprises a device for scanning light 200 corresponding to FIG. 7, an apparatus for detecting light 323 which detects the light that reflected in the bar code 400, a condensing light 323 installed on the incident light side of the apparatus for detecting light and a shading plate(shading means) 326.

As mentioned hereinbefore, a transmitted light (zero-order light) appears with a diffracted light used as a scanning light on the outgoing light side of the apparatus for deflecting light 100. It will sometimes happen that the reading of the information become incorrect under certain circumstances, if the zero-order light reflects in the bar code 400 or the objects other than the bar code 400, and the reflected light is injected into the apparatus for detecting light 322.

Accordingly, in the bar code reader 300, the shading plate 326 is arranged on the optical path of the transmitted light so that the transmitted light will not come through to the outside of the bar code reader 300, in order to get rid of the influence of the noise upon the apparatus for detecting light 322. Further, the shading plate 326 can be made up of, for instance, the frosted black non-scatterers.

EMBODIMENT 12

Device for Reading Information

Generally, in a bar code reader, the information can not be read correctly due to the shortage of the intensity of the reflected light, and the oversize of the diameter of the light beam for the width of the bar code, if the bar code to be read is not within the predetermined range before and behind the image formation point of the scanning light. And the range in which the bar code can be read is very limited.

However, the range in which the bar code is read can be widened to improve the facility, if the image formation point of the scanning light can be made variable. In the embodiment 12, the image formation point of the scanning light is made variable, and its construction and the action will be described as follows.

Figure 18:
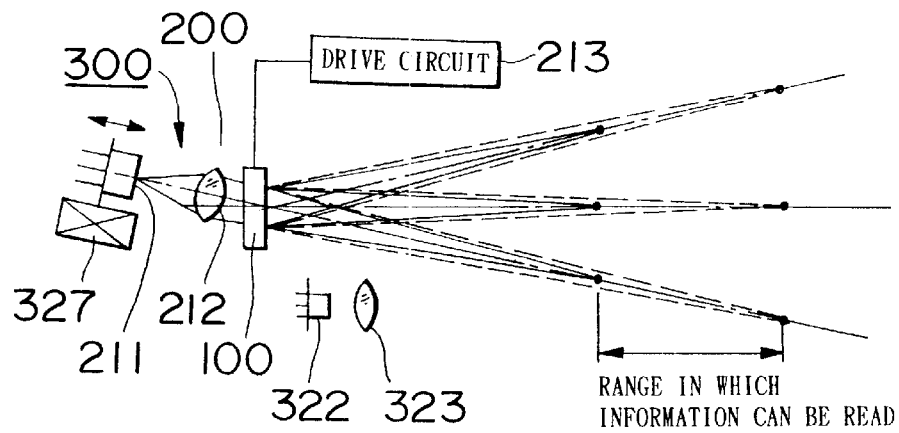
FIG. 18 is a construction diagram of a device for reading information according to the embodiment 12 of the present invention.

FIG. 18 is a construction diagram of an optical system of a bar code reader 300 of the embodiment 12.

As shown in the image formation formula of the convex lens, the distance from the condensing lens 212 to the image formation point varies depending on the distance from the condensing lens 212 to the light source 211, when the light of the light source 211 is formed as an image by the condensing lens 212. Accordingly, the distance from the apparatus for deflecting light 100 to the image formation point can be changed, if the distance from the light source 211 to the condensing lens 212 (the distance along the optical axis of the condensing lens 212) can be changed.

The bar code reader 300 of the embodiment 12 in which the light source 211 is moved directly comprises a device for scanning light 211 corresponding to FIG. 7, an apparatus for detecting light 322 which detects the light that reflected in the bar code 400, a condensing lens installed on the incident light side of the apparatus for detecting light 322 and a moving device (variable mechanism) 327 which moves the light source 211 back and forth following the optical axis direction of the condensing lens 212.

The moving device 327 can be made up of what is called piezo elements using the reverse voltage effect and a mechanical moving device can be used in place of the moving device 327.

Further, for instance, moving the position of the image formation point accordingly after judging whether or not the reading could be executed normally as a result of demodulating the signal of the reflected light obtained by the apparatus for detecting light 322, or moving the position of the image formation point by such instructions as operator's key operation can be considered as the timing when the position of the image formation point of the scanning light is moved back and forth.

EMBODIMENT 13

Device for Reading Information

Figure 19:
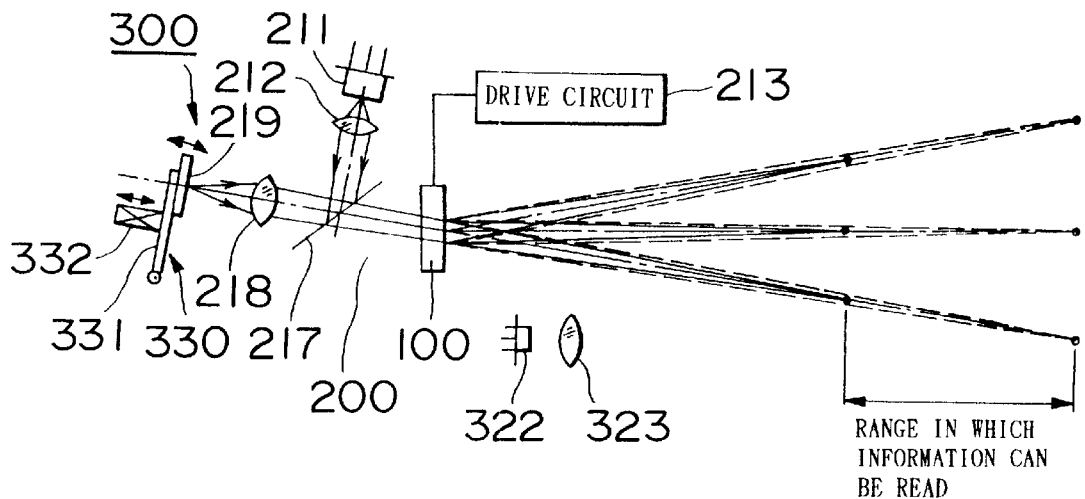
FIG. 19 is a construction diagram of a device for reading information according to the embodiment 13 of the present invention.

Also in the bar code reader 300 shown in FIG. 19, the distance from the apparatus for deflecting light 100 to the image formation point is made variable, the range in which the bar code can be read is widened and the facility is improved.

The bar code reader 300 comprises a device for scanning light 200, an apparatus for detecting light 322 which detects the light that reflected in the bar code and a condensing lens installed on the incident light side of the apparatus for detecting light 322.

The device for scanning light comprises an apparatus for deflecting light 100, a light source 211, a first condensing lens (an optical element for converging light) 212 consisting of the convex lens, a drive circuit 213, a half mirror 217, a second condensing lens (a second optical element for converging light) 218 consisting of the convex lens and a reflected mirror 219.

The reflected mirror 219 is installed on the variable mechanism 330 and can be moved by the variable mechanism 330 back and forth following the optical axis of the second condensing lens 218.

The variable mechanism 330 comprises a reciprocation group 331 and a displacement mechanism 332. The reciprocation group 331 is supported so that it will be rotatable centering around its edge, and the reflected mirror 219 is fixed on the other edge of the reciprocation group 331.

The reciprocation group 331 is reciprocated by the displacement mechanism 332 which was connected on its way. The displacement mechanism can be made up of the piezo elements, and a mechanical moving device can be used in place of the displacement mechanism.

The light beamed from the light source 211 passes through the first condensing lens 212 to be reflected in the half mirror 217, its reflected light passes through the second condensing lens 218 to be formed as an image in the reflected mirror 219, the reflected light which reflected in the reflected mirror 219 goes backward to pass through the second condensing lens 218 for the second time, the reflected light permeates through the half mirror and is deflected in the apparatus for deflecting light 100 to be converted into the scanning light and the scanning light scans on the bar code.

In the bar code reader 300, the reflected mirror is moved back and forth almost following the optical axis when the reciprocation group 331 reciprocates, the distance from the apparatus for deflecting light to the image formation point is changed by changing the distance from the second condensing lens 218 to the reflected mirror 219.

Besides, it is favorable that the displacement volume of the reflected mirror can be enlarged by the principle of "lever", when the reciprocation group 331 is installed as mentioned hereinbefore, even though the reflected mirror can be moved back and forth directly by the displacement mechanism 332 without installing the reciprocation group 331.

Further, various cases can be considered about the timing when the position of the image formation point of the scanning light is moved back and forth, like the cases of the above-mentioned embodiment 12.

EMBODIMENT 14

Device for Reading Information

Figure 20:
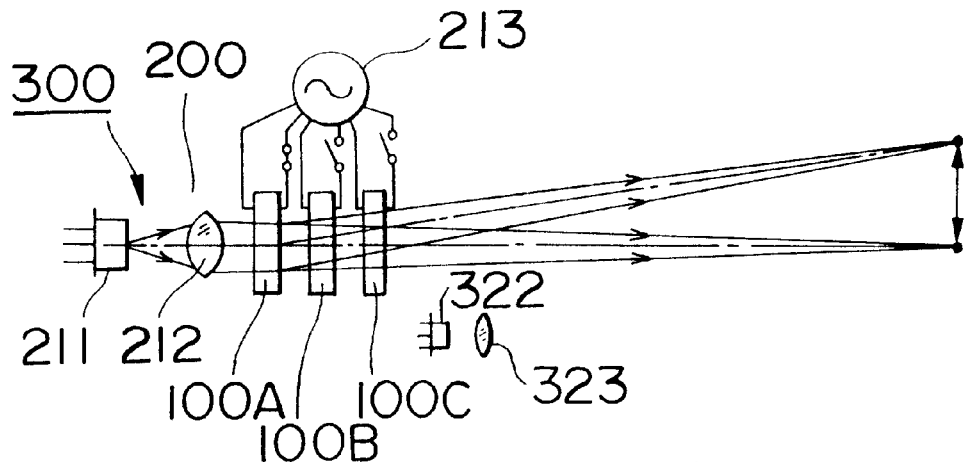
FIG. 20 is a construction diagram of a device for reading information according to the embodiment 14 of the present invention.
Figure 20:
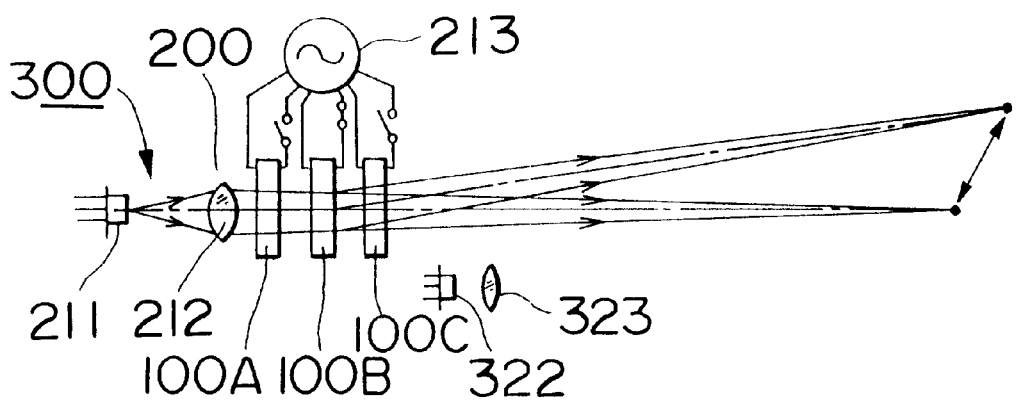
Figure 20C:
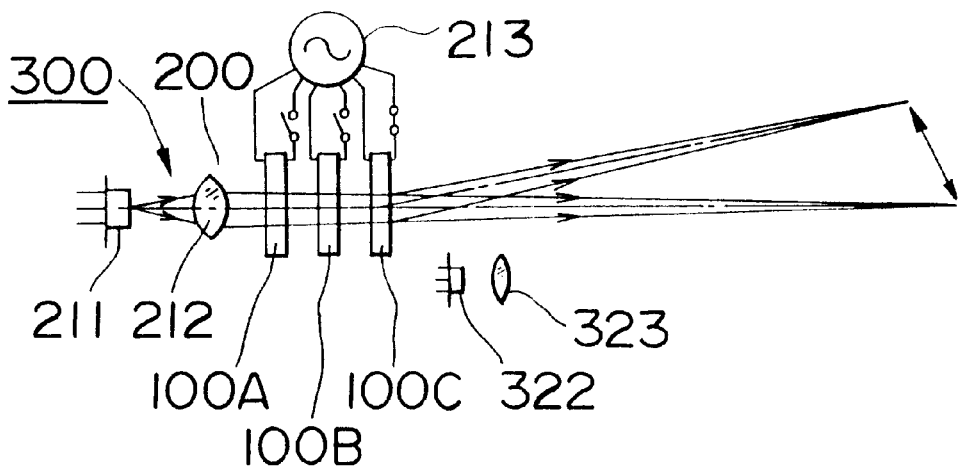

FIG. 20 is a construction diagram of an optical system in another embodiment of the bar code reader 300.

The bar code reader 300 comprises a device for scanning light 200, an apparatus for detecting light 322 which detects the light that reflected in the bar code 400 and a condensing lens 323 installed on the incident light side of the apparatus for detecting light 323.

The device for scanning light 200 comprises three apparatuses for deflecting light 100A, 100B, 100C, a light source 211, a condensing lens 212 consisting of the convex lens and a voltage control unit (a drive circuit) 213.

As shown in FIG. 21, the three apparatuses for deflecting light 100A–100C are arranged in layers so that the directions of diffraction fringes (indicated by parallel lines of full lines in FIG. 21) which occur when the voltage is applied will be slipped off per 120 degrees one another.

As shown in FIGS. 20(A), (B), (C), in the three apparatuses for deflecting light 100A–100C, the voltage controlled by the voltage control unit 213 is applied without duplicating in order through the switching circuit.

Accordingly, the light is not deflected in the other two apparatuses for deflecting light and it merely permeates through the apparatuses for deflecting light, even though the light is deflected in one apparatus for deflecting light when the voltage is applied to one of the apparatuses for deflecting light.

As a result, in the bar code reader 300, the scanning light is scanned as indicated by the one-point chain line A of FIG. 21 and FIG. 22, when the voltage is applied to the apparatus for deflecting light 100A, the scanning line is scanned as indicated by the one-point chain line B when the voltage is applied to the apparatus for deflecting light 100B, and the scanning light is scanned as indicated by the one-point line C when the voltage is applied to the apparatus for deflecting light 100C.

Namely, according to the bar code 300, the scanning light can be scanned in three directions slipped off per 120 degrees, the polarity for the bar code of the bar code reader 300 which is capable of reading the bar code is widened and the facility is improved.

EMBODIMENT 15

Device for Reading Information

The frame 301 of the bar code reader 300 can be transformed into such tubular frames as a cylindrical frame, an elliptic tubular frame and rectangular tubular frame, since the optical system can be arranged almost on the one straight line in the device for reading information of the present invention.

FIG. 23 is a bar code reader 300 whose frame 301 is formed into a cylindrical frame, FIG. 23(A) is a bar code reader 300 in which a notch unit 303 for marking is installed on the way of the frame 301, and FIG. 23(B) is a bar code reader 300 in which a concave unit 304 whose shape is easily gripped is installed on the point unit of the frame 301. The operator can easily decide the scanning direction of the scanning light and the facility will be improved, if the frame 301 is formed as mentioned hereinbefore.

Besides, as shown in FIG. 23(C), the bar code reader 300 will be easily operated, the reading rate of the information will be improved and the facility will be improved, if the point unit 302 of the frame 301 which is the outgoing light side of the scanning light is widened into a spatular shape and clears the spatular shaped point unit 302 so that the scanning light will be formed as an image at the point of the point unit 302 and the scanning light will be scanned in the longitudinal direction of the spatular shaped point unit 302.

EMBODIMENT 16

Device for Reading Information

In POS system, the information of the bar code should be decoded by a decoder and should be converted into the signal which can be computerized, and should be transmitted to the computer, after reading the information of the bar code.

The bar code reader 300 shown in FIG. 24(A) includes a decoder 311 with the optical system 310 consisting of the device for scanning light 200 and so on within the frame 301.

The bar code reader 300 shown in FIG. 24(B) includes the bar code reader 311 within the computer 500. In this case, the bar code reader 300 only has to include the optical system 301, so the bar code reader 300 can be miniaturized.

Further, the method for transmitting/receiving data between the bar code reader 300 and the computer 500 should be either radio transmission or wire transmission.

EMBODIMENT 17

Device for Reading Information

The bar code reader 300 can be provided with a function that switches the scanning light ON-OFF automatically or manually.

In this case, ON-OFF of the scanning light can be executed by switching the light source 211 ON-OFF, or a shutter installed on the optical path can be operated to interrupt or pass the light keeping the light source 211 ON.

In FIG. 25, a switch 305 is installed on the frame 301 so that the trigger will be generated by the switch 305 and the scanning light will be synchronized with the trigger signal to execute ON-OFF of the scanning light.

ON-OFF operation of the scanning light also can be executed automatically, even though it can be executed manually.

For instance, the switch 305 should be composed of touch sensors so that the switch 305 will be to ON when the operator touches the bar code reader 300, in order to execute ON operation of the scanning light automatically.

For instance, the trigger should be generated when the signal is not inputted into the decoder during the predetermined time so that the scanning light will be synchronized with the trigger signal to execute OFF operation of the scanning light, in order to execute OFF operation of the scanning light automatically.

EMBODIMENT 18

Device for Reading Information

The bar code reader 300 can be provided with notification means for notifying the operator the state of the operation (for instance, "INFORMATION OF BAR CODE IS BEING READ", "READING IS COMPLETED", "READING IS NO GOOD", "REOPERATION IS NEEDED" and so on).

The concrete example of the notification means installed on the bar code reader 300 is shown in FIG. 26.

In FIG. 26(A), the frame 301 is provided with an indicating lamp 306 consisting of LED as notification means and so on. In FIG. 26(B), a buzzer 307 as notification means is included within the frame 301. In FIG. 26(C), a liquid crystal display 308 as notification means is installed on the frame 301.

Further, the notification means also can be installed on the computer 500 side instead of being installed on the bar code reader 300.

Device for Stereoscopic Display

Then, the preferred embodiments of a device for stereoscopic display of the present invention will be described referring to the drawings. The device for stereoscopic display of the present invention makes use of the apparatus for deflecting light constructed like the above-mentioned construction as beam deflection means for deflecting light.

EMBODIMENT 19

Device for Stereoscopic Display

The Construction of the Embodiment 19

A system for recording and replaying stereoscopic picture in the embodiment 19 will be described by referring to FIG. 27.

The system for recording and replaying stereoscopic picture comprises a plurality of cameras 1 (O1–On) which photographs an object 10 as a two-dimensional picture, a line division unit 2 which divides the picture photographed by the camera 1 into the number of visual points, a time series rearrangement unit 4 which rearranges the two-dimensional picture divided by the line division unit 2 in the time series, a two-dimensional picture display control unit 5 which replays and controls the two-dimensional pictures rearranged by the time series rearrangement unit 4 in a time series order, an apparatus for display 6 which replays the two-dimensional pictures controlled by the two-dimensional picture display control unit 5 in the time series order, a deflection control unit 7 which deflects and controls the two-dimensional pictures displayed on the apparatus for display 6 corresponding to the camera visual points of the plurality of cameras, an apparatus for deflecting light 8 which deflects the two-dimensional pictures displayed on the apparatus for display 6 into the camera observing points of the plurality of cameras 1 in accordance with the control information of the deflection control unit 7 and a device for record and replay 3 which records and replays the photographed pictures. The details of each construction will be described as follows.

The Camera

The camera 1 is, for instance, a color TV camera which photographs the two-dimensional pictures. A plurality of cameras 1 are arranged against the object at the moderate intervals in horizontal direction or in vertical direction. The plurality of cameras 1 are arranged at the moderate intervals in horizontal direction or in vertical direction so as to obtain a plurality of two-dimensional pictures at the moderate parallaxes. The reason why the plurality of cameras 1 should be arranged in horizontal direction is to generate the parallaxes in horizontal direction. The plurality of cameras 1 should be arranged in vertical direction so as to generate the parallaxes in vertical direction. The cameras 1 should be arranged both in horizontal direction and in vertical direction so as to generate the parallaxes both in horizontal direction and in vertical direction.

Figure 27:
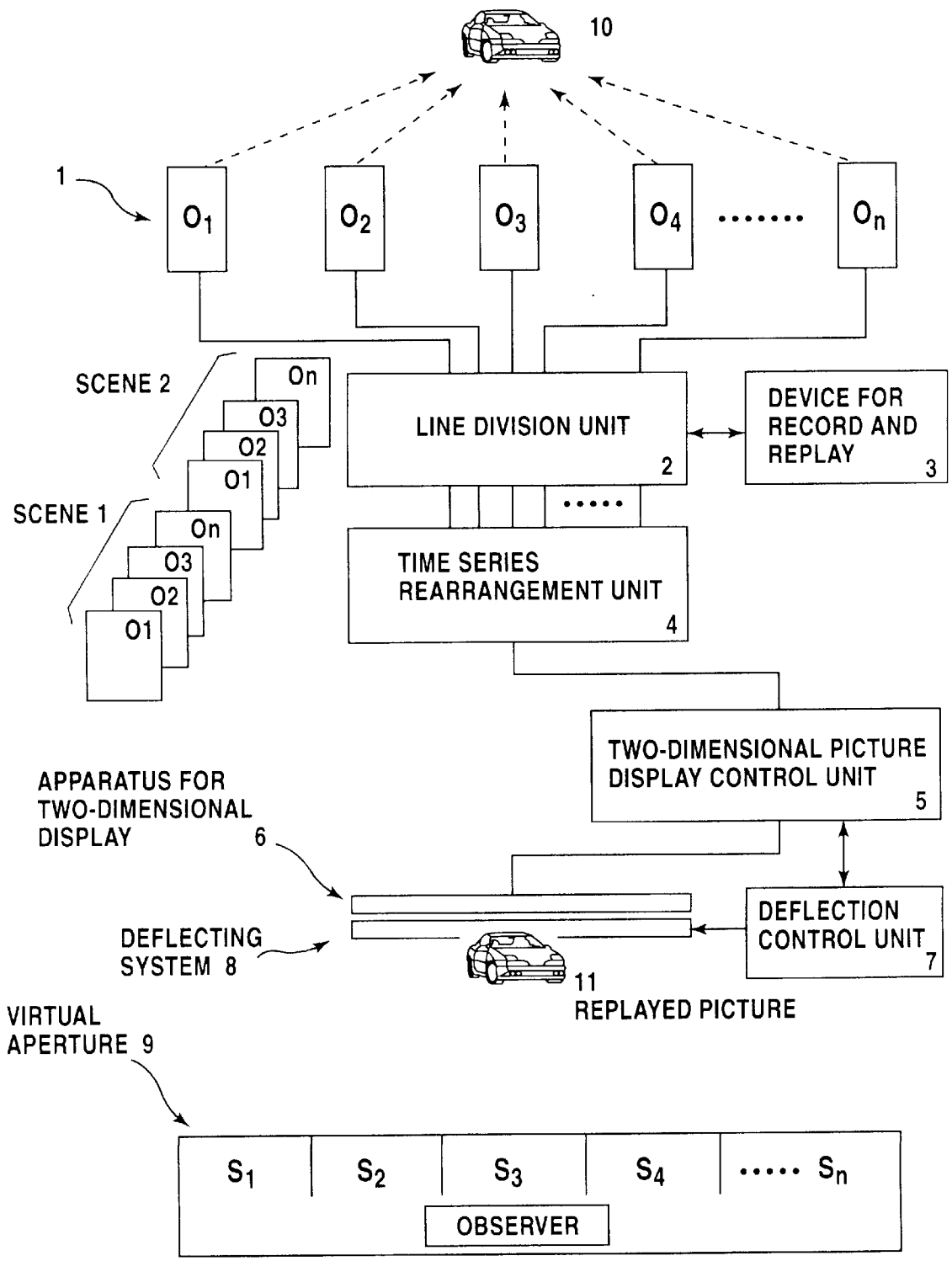
FIG. 27 is a block diagram indicating a construction of a device for stereoscopic display according to the embodiment 19 of the present invention.

In FIG. 27, it is supposed that the plurality of cameras from O1 to On are arranged in horizontal direction. The camera 1 is provided with a camera element which has a predetermined number of picture elements and photographs the object 10 by the resolution corresponding to the number of picture elements and outputs the pictures as a plurality of picture elements.

The Line Division Unit

The line division unit 2 divides the pictures photographed by the camera 1 into the number of visual points. The pictures photographed by the camera 1 are divided into the number of visual points respectively. For instance, the original picture of the camera O1 is divided into the number of lines corresponding to the number n of the cameras in accordance with the following Table 1, as shown in FIG. 28.

TABLE 1

| |
|---|
| O1 → O1L1, O1L2, O1L3 . . . O1Ln |
| O2 → O2L1, O2L2, O2L3 . . . O2Ln |
| O3 → O3L1, O3L2, O3L3 . . . O3Ln |
| . . . . . . |
| . . . . . . |
| . . . . . . |
| On → OnL1, OnL2, OnL3 . . . OnLn |

The Time Series Rearrangement Unit

The time series rearrangement unit 4 rearranges the two-dimensional pictures divided by the line division unit 2 in the time series.

Namely, the original pictures which are divided as mentioned hereinbefore are rearranged and assorted, and the pictures O'1–O'n are formed in accordance with the following Table 2 as shown in FIG. 29. Namely, each of the original pictures O1–On which were obtained from each camera 1 and have parallaxes one another is divided into the lines of the number of visual points respectively and each of the picture pieces which were divided is assorted in accordance with the visual point order and the time series so that the pictures O'1–O'n of the original number of visual points will be formed.

TABLE 2

| |
|---|
| O1L1, O2L2, O3L3 . . . OnLn → O'1 |
| OnL1, O1L2, O2L3 . . . On-1LN → O'2 |
| On-1L1, OnL2, O1L3 . . . On-2Ln → O'3 |
| . . . . . . . |
| . . . . . . . |
| . . . . . . . |
| O2L1, O3L2, O4L3 . . . O1Ln → O'n |

The Two-dimensional Picture Display Control Unit

The two-dimensional picture display control unit 5 replays and controls the pictures rearranged by the time series rearrangement unit in the time series order. Namely, the O'1, O'2, O'3 . . . O'n are replayed in accordance with the order. Generally, the two-dimensional picture control unit 5 is constructed by the CPU of the computer.

The Apparatus for Displaying Two-dimensional Pictures

The apparatus for displaying two-dimensional pictures 6 displays the two-dimensional pictures controlled by the two-dimensional picture display control unit 5 in the time series order. LCD (liquid crystal display) is used as the apparatus for displaying two-dimensional pictures 6.

Figure 30:
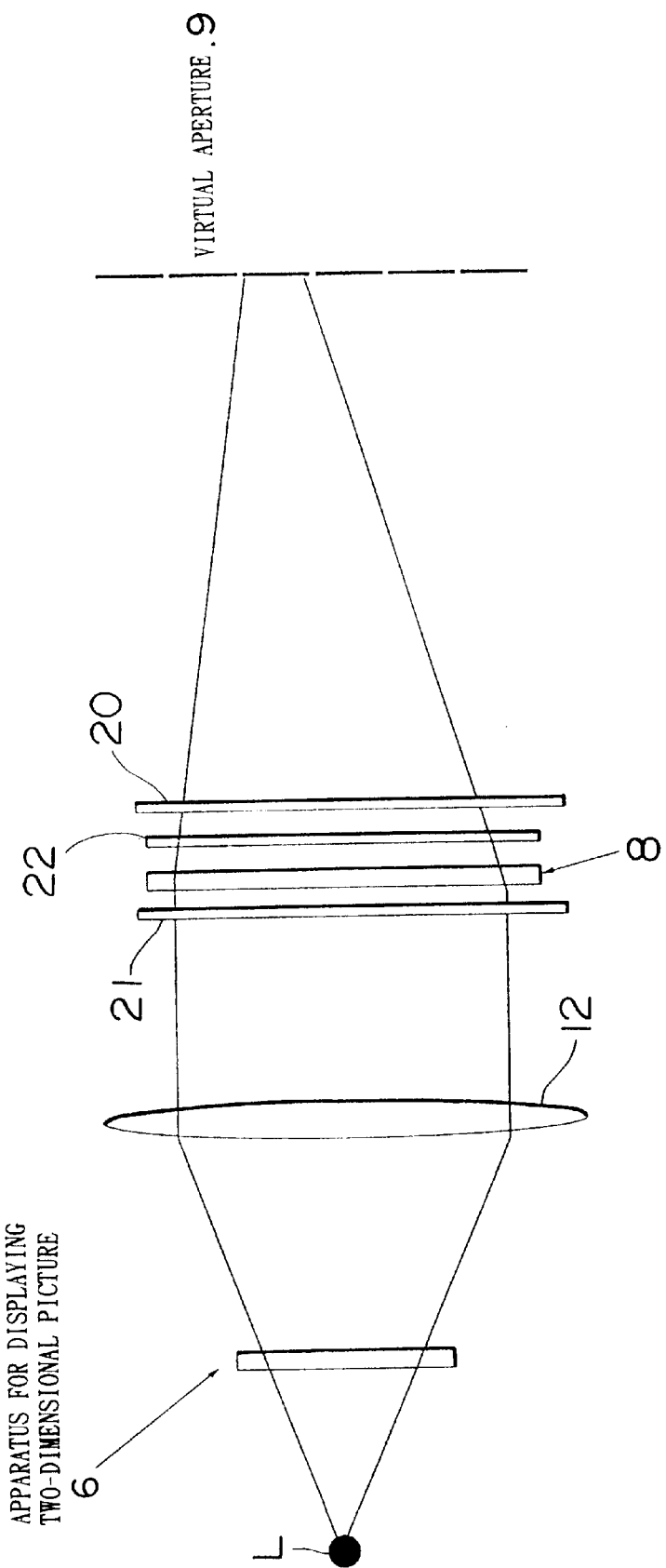
FIG. 30 is a plane construction diagram of an apparatus for stereoscopic display according to a device for stereoscopic display of the embodiment 19 of the present invention.

The LCD has enough number of picture elements to change the light quantity of the injected light. Namely, the LCD is a transmission display for changing the quantity of the passing light per picture element to replay the two-dimensional pictures. As shown in FIG. 30, the two-dimensional picture receives a reference light beamed from the light source (L) to be projected to the apparatus for deflecting light 8 through the projection optical system 12. The LCD shades the even-order diffracted lights including the zero-order light by arranging the polarizing plates 21 and 22 whose polarizing directions are perpendicular one another before and behind the apparatus for deflecting light 8. Namely, the LCD converts the incident light into a linearly polarized light by the first polarizing plate 21, and shades the zero-order light and the even-order diffracted lights which have passed through the apparatus for deflecting light 8 by the second polarizing plate 22.

The diffracted lights which have passed through the polarizing plate 22 is scattered to the vertical direction by the lenticular lens 20.

The Deflection Control Unit

The deflection control unit 7 deflects and controls the two-dimensional pictures displayed on the apparatus for displaying two-dimensional pictures corresponding to the camera visual points of the plural cameras 1. The deflection control unit 7 changes the voltage applied to the apparatus for deflecting light 8 to change the phase distribution, that is, the pitch of the interference fringes.

Figure 31:
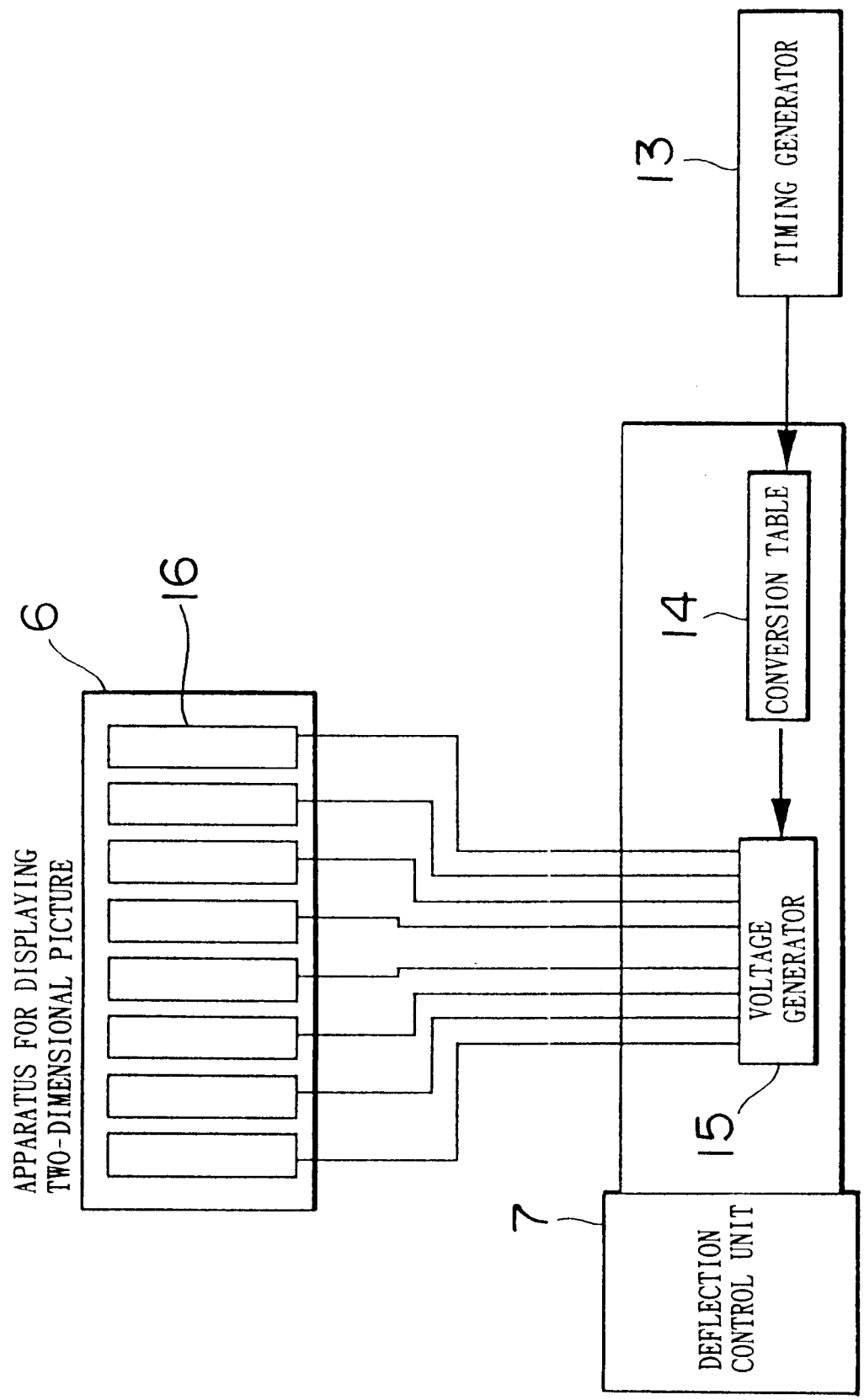
FIG. 31 is a block diagram indicating a control system of a deflecting system in a device for stereoscopic display of the embodiment 19 of the present invention.

FIG. 31 is a drive control diagram of the VGM apparatus for deflecting light. The deflection control unit 7 determines the voltage applied to each picture element by the angle information corresponding to the two-dimensional screen to be displayed. Namely, the deflection control unit 7 refers to the angle-voltage conversion table 14 to lead the voltage corresponding to the angle information, and generates the voltage in the apparatus for generating voltage to apply the voltage to each electrode 16 of the apparatus for deflecting light, after receiving the synchronizing signal transmitted from the timing generator (timing controller) synchronized with the picture display in the apparatus for displaying two-dimensional pictures and receiving the angle information corresponding to the displayed pictures.

The Apparatus for Deflecting Light

Figure 32:
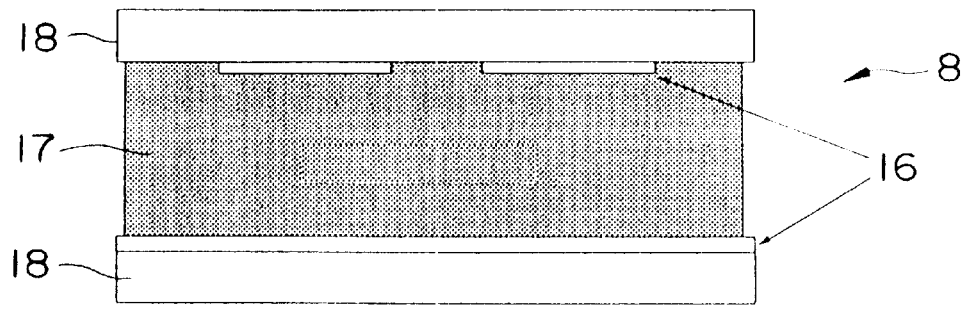
FIG. 32 is a diagram indicating a VGM apparatus for deflecting light in a device for stereoscopic display of the embodiment 19 of the present invention.
Figure 33:
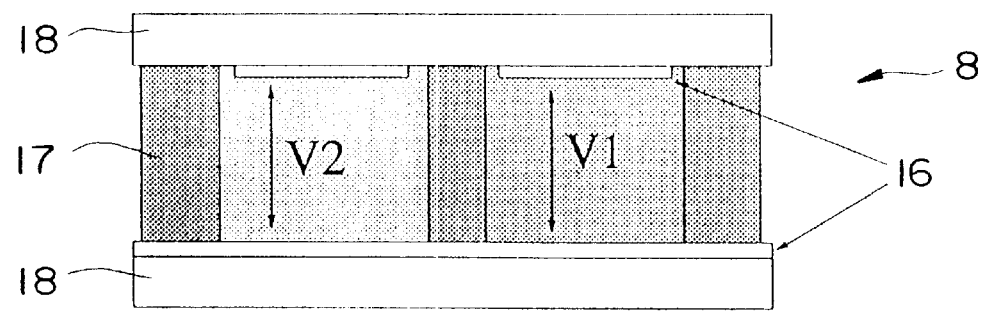
FIG. 33 is a diagram indicating a state in which a voltage is applied to a VGM apparatus for deflecting light in a device for stereoscopic display of the embodiment 19 of the present invention.
Figure 34:
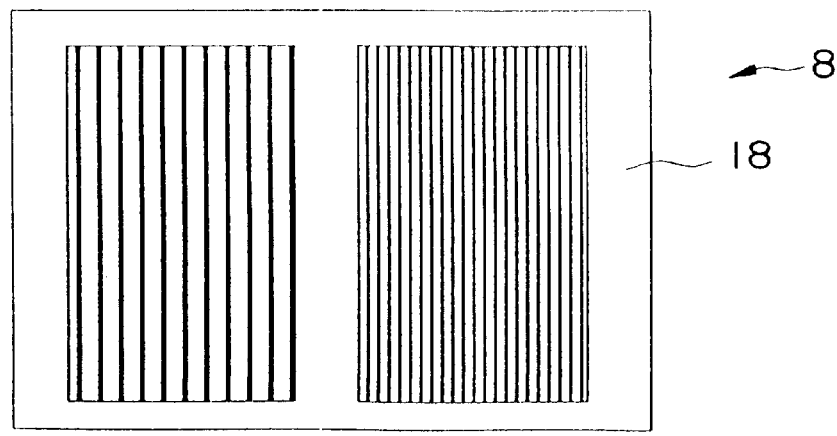
FIG. 34 is a diagram indicating a state of a phase distribution (interference fringe) when a voltage is applied to a VGM apparatus for deflecting light in a device for stereoscopic display of the embodiment 19 of the present invention.

The apparatus for deflecting light 8 deflects the two-dimensional pictures displayed on the apparatus for display 6 to the virtual aperture 9 corresponding to the camera visual points of the plural cameras 1 in accordance with the control information of the deflection control unit. The VGM apparatus for deflecting light is used as the apparatus for deflecting light 8. As shown in FIG. 32 to FIG. 34, the VGM apparatus for deflecting light comprises a liquid crystal 17 whose anisotropy ($\Delta\epsilon$) of the permittivity is less than 0, two glass substrates 18 into which the liquid crystals 17 is inserted and a transference electrode plate 16 which is arranged among the liquid crystals 17 arranged within the two glass substrates 18.

As mentioned hereinbefore, the apparatus for deflecting light 8 makes use of a phenomenon called Variable Grating Mode (V. G. M.). The permittivity difference of the liquid crystal in which the V. G. M. phenomenon occurs is often $\Delta\epsilon<0$. The representative example of the liquid crystal in which the V. G. M. phenomenon occurs is shown in FIG. 1. The liquid crystal is on the market as N-4 of Merc corporation and is available.

Figure 35:
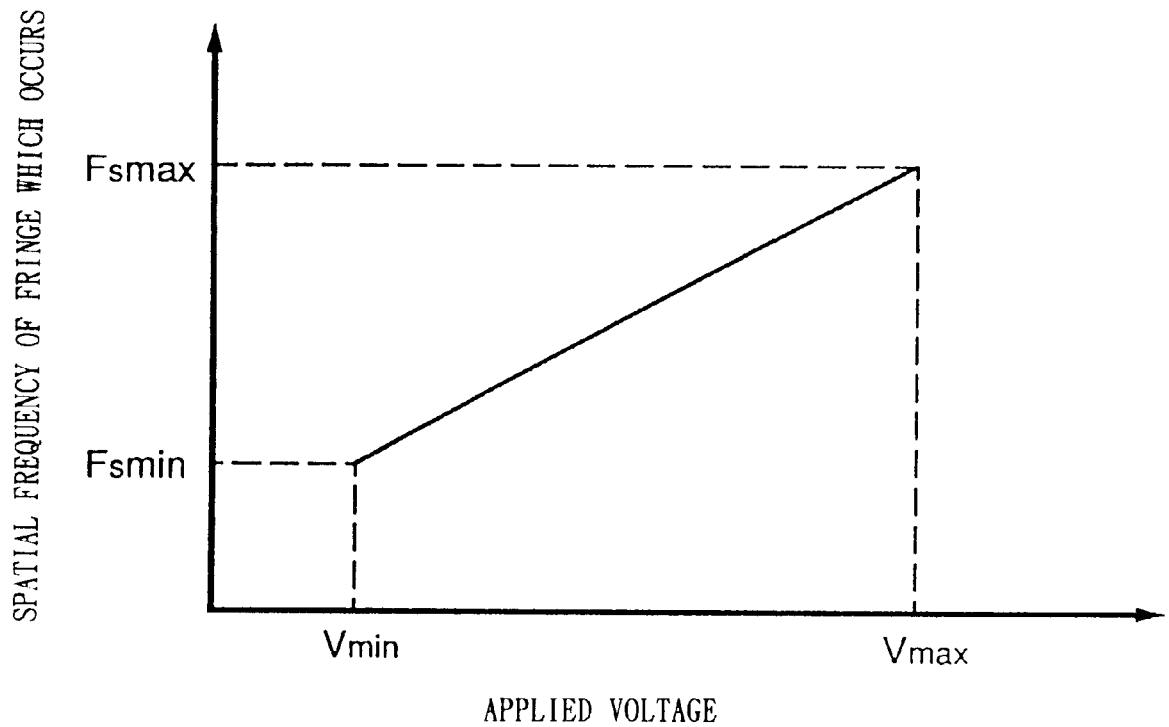
FIG. 35 is a graph diagram indicating a relation between an applied voltage and a spatial frequency of a liquid crystal used for a VGM apparatus for deflecting light in a device for stereoscopic display of the embodiment 19 of the present invention.

Besides, the plural pairs of transference electrodes 16 are installed plurally on the apparatus for deflecting light 8 in accordance with the number of visual points. The interference fringes occur in the liquid crystal when the voltage is applied to the transference electrodes. In FIG. 32 to FIG. 34, two pairs of electrodes are illustrated, the voltage of V1 is applied among the electrodes of the one side and the voltage of V2 is applied among the electrodes of the other side, and the relation of V1>V2 is being kept. The spatial frequency of the interference fringes gets bigger and the space of the fringes gets smaller when the size of the voltage applied to the electrode is big, and the spatial frequency of the interference fringes gets smaller and the space of the fringes gets bigger when the size of the voltage applied to the electrodes is small, like the applied voltage-spatial frequency character diagram shown in FIG. 35. Accordingly, as shown in FIG. 34, the space of the interference fringes of the parts corresponding to the applied voltage of V2 is bigger than the space of the interference fringes of the parts corresponding to the applied voltage of V1.

The picture per line is projected into the virtual aperture 9 by the varied deflections respectively, since each line of the divided pictures is displayed respectively on the picture element of the apparatus for display 6 corresponding to each pair of electrodes 16. The apparatus for deflecting light is controlled in synchronization state by the timing controller 13 so that the apparatus for deflecting light will be directed to the corresponding deflecting directions, when the picture O1' is displayed on the apparatus for display 6.

Figure 36:
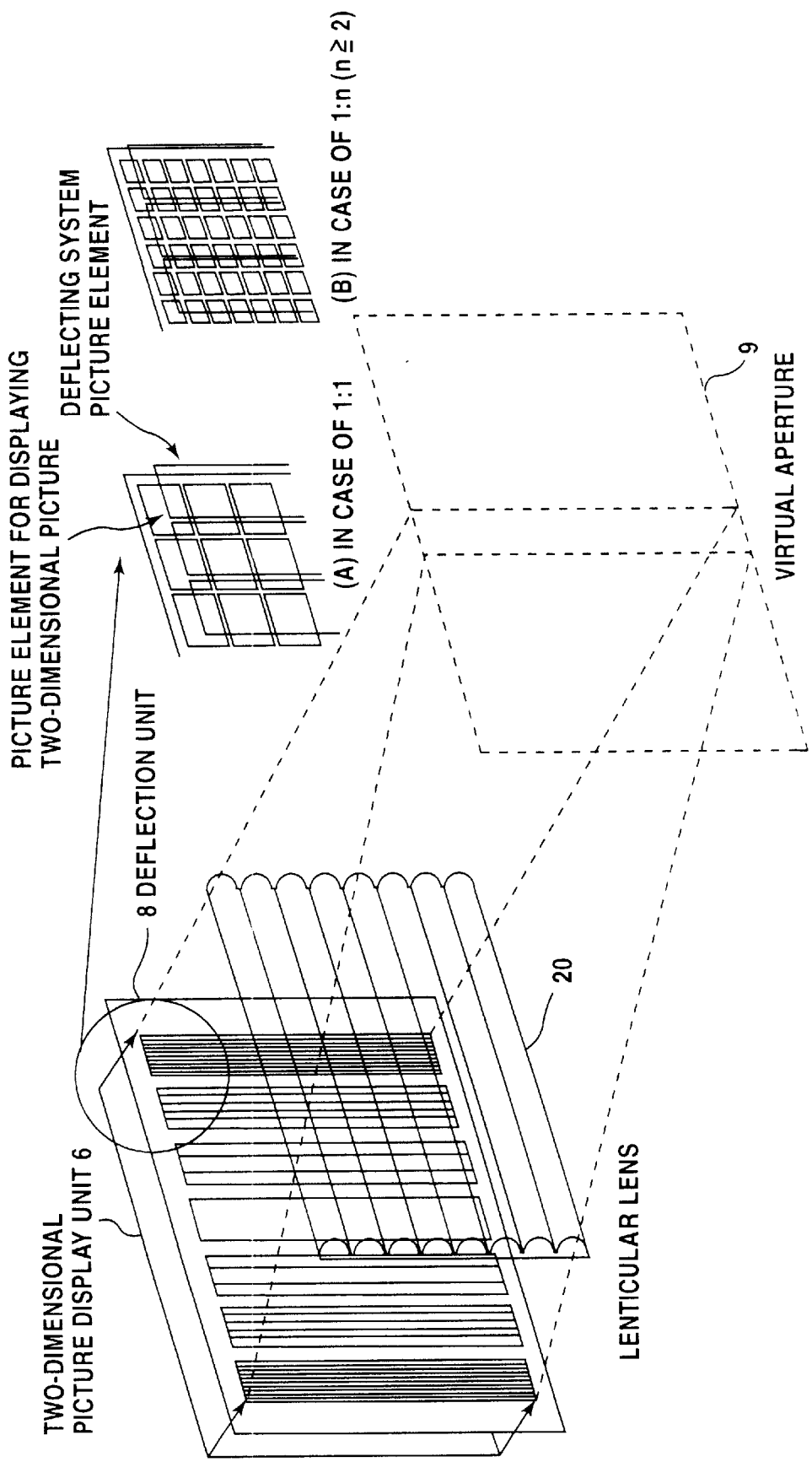
FIG. 36 is a construction diagram of an apparatus for stereoscopic display which only has a horizontal parallax error in a device for stereoscopic display of the embodiment 19 of the present invention.
Figure 37A:
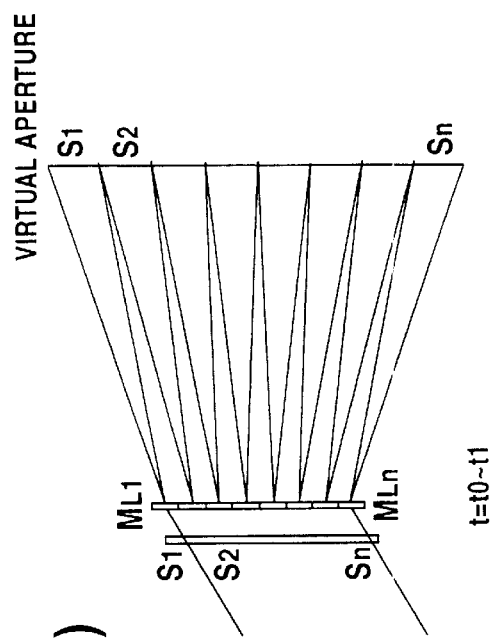
FIG. 37 is a diagram indicating a first method for deflection in an apparatus for deflecting light in a device for stereoscopic display of the embodiment 19 of the present invention.
Figure 37C:
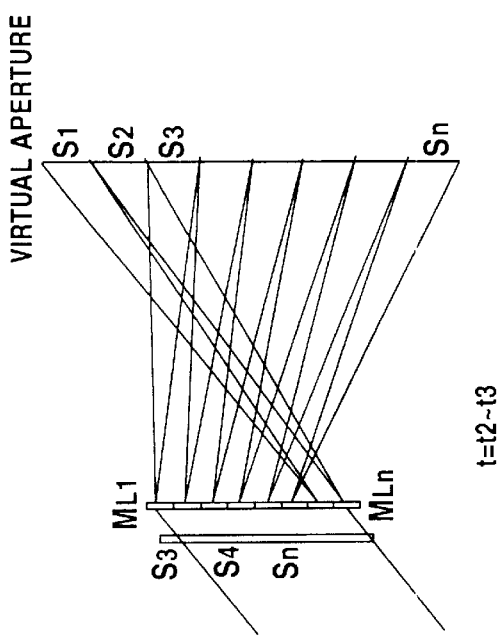
Figure 37B:
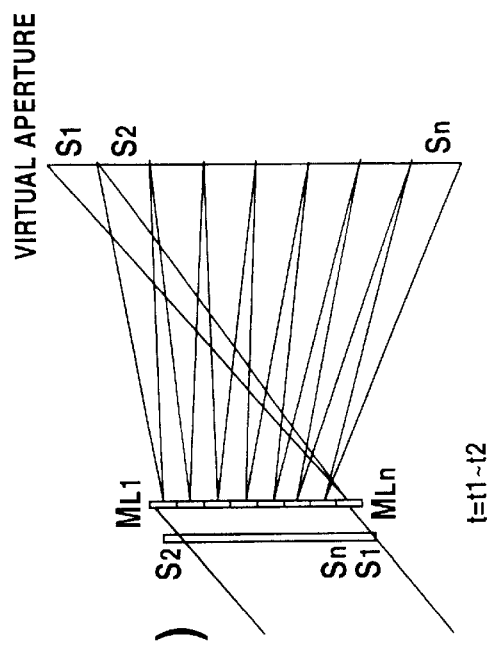
Figure 37D:
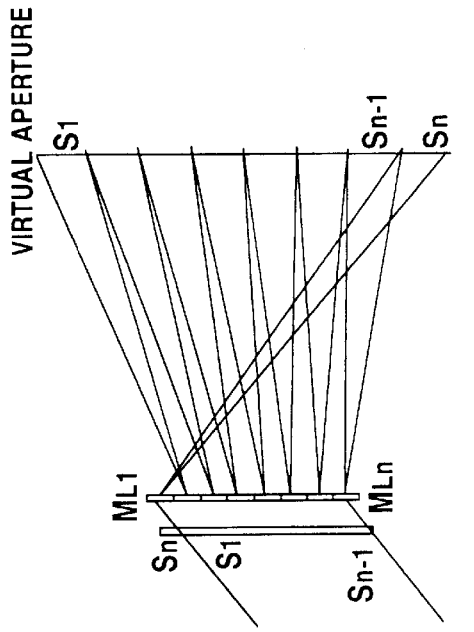

In the embodiment 19, a single unidirectional apparatus for deflecting light is used and the apparatus has a parallax only in the horizontal direction. The VGM apparatus for deflecting light has a vertical picture element and has a single picture element in the vertical direction. The number of picture elements N in the horizontal direction and the number of picture elements M of the two-dimensional image display unit in the vertical direction are N:M=1:1 as shown in (A) of FIG. 36, or N:M=1:n ($n\geq 2$) as shown in (B) of FIG. 36. It is impossible to see all of the vertical pictures at the same time, since the light beamed from the two-dimensional picture display unit is deflected only to the horizontal direction. Accordingly, as shown in FIG. 30 and FIG. 36, the problem is solved by diffusing the light to the horizontal direction with the lenticular lens 20. Namely, the picture will be projected only to the lower part, if the picture displayed on the lower part of the picture element is unchanged. Accordingly, the difference of the picture in the upper and lower directions was eliminated by diffusing the light both over the lower part and over the upper part equally.

Besides, as shown in FIG. 30, a pair of deflecting plates 21, 22 are installed before and behind the apparatus for deflecting light 8. The zero-order light will be shielded, since the deflecting direction of the pair of deflecting plates 21, 22 is slipped off 90 degrees.

Device for Record and Replay

The device for record and replay 3 records and replays the photographed pictures. There are some cases that the device for record and replay 3 executes the following tasks as a device for record:

① To record each picture which was inputted into the line division unit 2 from each of the cameras separately;

② To record the picture which was divided per line in the line division unit; or ③ To record the picture after the picture is rearranged in the time series rearrangement unit.

In the device for replay 3 in which the picture recorded in the device for record 3 is replayed, the picture should be inputted into the line division unit 2 when the picture of the above-mentioned ① is replayed. Besides, the replayed picture should be inputted into the time series rearrangement unit when the picture of the above-mentioned ② is replayed. Further, the replayed picture should be inputted into the two-dimensional picture display control unit when the picture of the above-mentioned ③ is replayed.

The Action of the Embodiment 19

The examples in which the stereoscopic display is executed by the device for stereoscopic display of the embodiment 19 will be described.

The First Example of Display

First of all, the object is photographed as a two-dimensional picture by a plurality of cameras 1 (O1–On). Then, the picture is inputted into the line division unit 2 to line-divide each picture into the number of the cameras like the above-mentioned Table 1. Then, the divided pictures are assorted in the time series to form O'1–O'n as scene 1. The pictures will be continued to scene 2, 3 . . . on following the scene 1, since these pictures are formed per scene.

The two-dimensional pictures O'1–O'n are replayed and controlled in the time series order by the two-dimensional picture display control unit to be displayed on the apparatus for display 6. The picture is deflected to the virtual apertures S1–Sn in the apparatus for deflecting light controlled by the deflection control unit 7, making the two-dimensional picture displayed on the apparatus for display 6 correspond to the camera visual point of the plurality of cameras. Namely, the two-dimensional picture projected into the VGM apparatus for deflecting light from LCD by the optical system is deflected to the wished-for virtual aperture positions, in accordance with the pitch of the refractive index distribution which occurred in the apparatus for deflecting light 8.

FIGS. 37(A)–(D) are the examples of the method for scanning light when the stereoscopic display is executed by using the divided pictures. In FIG. 37, the deflecting system has a plurality of picture elements, and gives the varied phase distributions to each of the picture elements and executes the deflection against the wished-for virtual apertures by varying the voltage applied to the electrode installed on each of the picture elements. In the case of this method, the deflection should be executed per line against all of the virtual apertures. In this case, the deflecting system 8 has a plurality of picture elements, and executes the scanning against the deflecting system picture elements $M_{L1}, M_{L2}, \ldots M_{Ln}$ and the virtual apertures $S_1, S_2, \ldots S_n$ in the following order during the time from $t_1$ to $T_n$.

$t_1$ $M_{L1} \rightarrow S_1$, $M_{L2} \rightarrow S_2$ . . . $M_{Ln} \rightarrow S_n$ FIG. 37(A)
$t_2$ $M_{L1} \rightarrow S_2$, $M_{L2} \rightarrow S_3$ . . . $M_{Ln} \rightarrow S_1$ FIG. 37(B)
$t_3$ $M_{L1} \rightarrow S_3$, $M_{L2} \rightarrow S_4$ . . . $M_{Ln} \rightarrow S_2$ FIG. 37(C)
$t_n$ $M_{L1} \rightarrow S_n$, $M_{L2} \rightarrow S_1$ . . . $M_{Ln} \rightarrow S_{n-1}$ FIG. 37(D)

($M_{L1} \rightarrow S_1$ means that the picture element of $M_{L1}$ executes the deflection against the virtual aperture $S_1$.)

In the case of this method for deflection, the deflection is executed synchronizing with the writing per line.

In this method, the picture is displayed in order by dividing one picture into a plurality of lines. Accordingly, the fatigue of the observer's eyes can be reduced by these actions, compared with the case that the whole picture is always shown to the observer so as to display the picture (the apparatus for display can never be darkened wholly), even though the picture which can be seen from the observer is part of the whole pictures.

Although the picture which was divided in the time series and rearranged in the time series is replayed by the time series in order of O'1–O'n and is projected in the time series to the observing points S1–Sn corresponding to the virtual apertures S1–Sn, the pictures of O'1–O'n will be seen simultaneously to be formed as stereoscopic images, since the after images remain in human's eyes.

Figure 38:
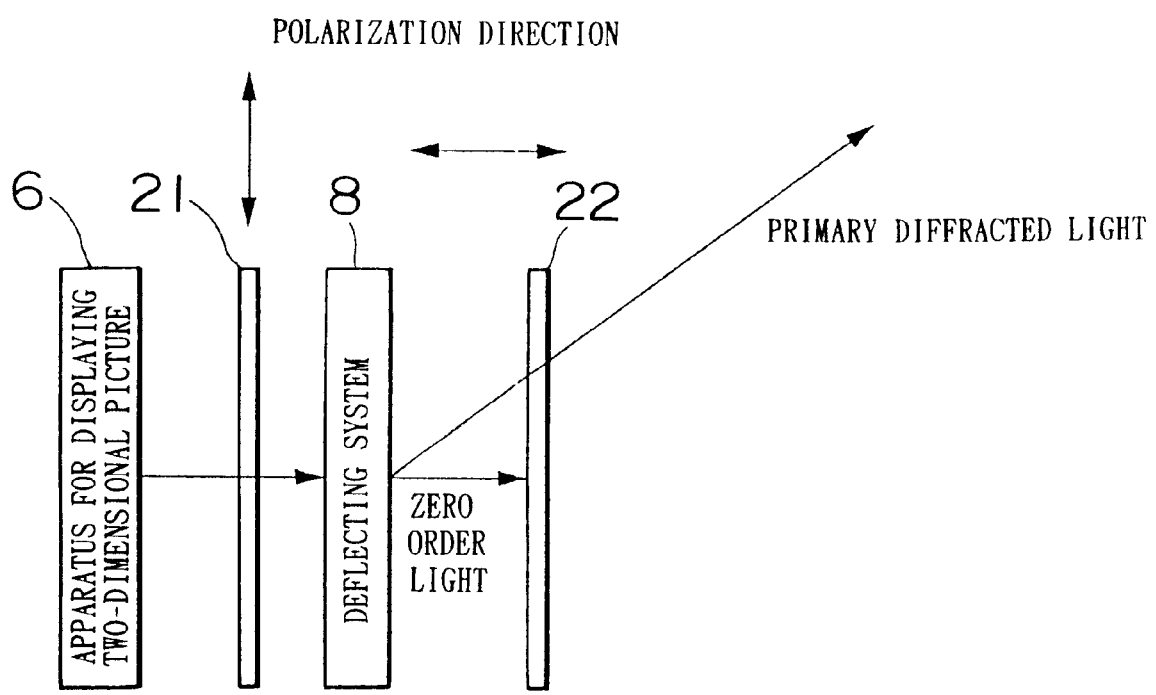
FIG. 38 is an arrangement construction diagram of a polarizing plate in a device for stereoscopic display of the embodiment 19 of the present invention.

By the way, as shown in FIG. 39, the odd-order diffracted light and the even-order diffracted light occur in the outgoing light side, and the plane of polarization is perpendicular in the odd-order diffracted light and the even-order diffracted light, when the linearly polarized light is injected into the VGM apparatus for deflecting light. As shown in FIG. 30 and FIG. 38, the even number order diffracted light can be shaded by placing the VGM apparatus for deflecting light 8 between the two polarizing plates 21, 22 which are perpendicular one another. Namely, the incident light is converted into the linearly polarized light by the first polarizing plate 21 to shade the even-order diffracted light which has passed through the VGM apparatus for deflecting light by the second polarizing plate 22. For this reason, as shown in FIG. 38 and FIG. 40, the transmitted light (zero-order light) can be shield. Further, the two polarizing plates can shade the zero-order light substantially, if it is crossed in the angle of 90 degrees ±10.

The Second Example of Display

FIG. 41 indicates a case that the apparatus for deflecting light 8 has a single picture element. Namely, FIG. 41 indicates a case that only one pair of electrodes are arranged in the apparatus for deflecting light 8 and the whole apparatus for deflecting light is deflected to only the fixed directions equally.

The picture is displayed on the apparatus for displaying two-dimensional picture 6, when the picture is inputted from the two-dimensional picture input unit. The voltage of the apparatus for deflecting light 8 is controlled by the timing controller 13 synchronizing with the picture display on the apparatus for displaying two-dimensional picture 6 so that the degree of deflection will be controlled.

In this case, the deflected pictures are converted into the parallel rays, and they can not be converged in that condition, since each angle of polarization for DL1–DLN of the apparatus for displaying two-dimensional picture 6 is the same in the apparatus for deflecting light 8 which has a single picture element. Accordingly, the deflected pictures are converged into the wished-for virtual aperture by using the lens 19 in front of the apparatus for deflecting light 8.

Elimination and Control of Display

In case of the method for deflection according to the above-mentioned first and second example of display, the deflection is executed synchronizing with the writing of the whole two-dimensional picture. However, the elimination time of the display screen should be provided in the deflection control unit 7 before rewriting the screen and the deflection should be stopped during that time, in order to prevent the after image of the picture which was deflected to $S_k$ from being seen in the position of $S_{k+1}$, when the deflection is moved from one virtual aperture $S_k$ to the next virtual aperture $S_{k+1}$. In this case, in the two-dimensional image display control unit 5, the intensity of the apparatus for display 6 should be darkened extremely so that the observer will not feel the after image.

The writing of the screen-and the deflection should be restarted after eliminating one screen. FIG. 42 is a timing chart of a method for deflection. First of all, the screen should be eliminated after displaying the image of S1O1 on the virtual aperture S1. After that, the picture of S1O2 should be displayed on the virtual aperture S2 and the picture of S1On should be displayed on the virtual aperture Sn to complete the picture display of scene 1. Then, the images S2O1 . . . S2On of scene 2 should be displayed.

The Third Example of Display

It is also possible to execute the stereoscopic display without dividing the pictures by using the device for stereoscopic display of the above-mentioned construction.

However, in this case, the line division unit 2 and the time series rearrangement unit 4 are not needed and only have a two-dimensional picture input unit 30 which inputs the inputted pictures in the time series.

The example is shown in FIGS. 43(A)–(C). In FIGS. 43(A)–(C), the apparatus for deflecting light 8 has a plurality of picture elements, and gives the varied phase distributions to each of the picture elements and executes the deflection against the wished-for virtual aperture by varying the voltage applied to the electrodes installed on each picture element.

The FIGS. 43(A)–(C) is one of the embodiments of the method for deflection of the apparatus for deflecting light 8. In this method, the deflection is executed only to one virtual aperture in one time $t=t_n$, and the deflection is executed in order from the virtual aperture S1 to Sn, namely, in order from FIGS. 43(A) to (C), following from $t=t_{n+1}$ to $t=t_{n+k}$. In this case, the picture (one of O'1, O'2, O'3 . . . O'$_n$) corresponding to the deflecting position is displayed on the two-dimensional picture display unit. Namely, the two-dimensional picture inputted from the camera 1 is arranged in the time series as it is, and is displayed on the apparatus for displaying two-dimensional picture to be deflected to the virtual aperture as it is.

The Effect of the Embodiment 19

As mentioned hereinbefore, the mechanically movable parts are not needed for displaying stereoscopic pictures, since the VGM apparatus for deflecting light is used in the embodiment 19. Besides, the angle of deflection by the VGM apparatus for deflecting light is enough, and it is possible to execute the stereoscopic display sufficiently.

The visual region of 30 degrees or so is desirable as a visual region of the apparatus for stereoscopic display. When the light of wave length $\lambda$ is injected into the diffraction grating of the pitch d, their relation to the angle of diffraction $\theta$ will be as follows, $$d \cdot \sin \theta = n \cdot \lambda$$

and d should be 1.26 $\mu$m when $\lambda=633$ nm, in order to obtain a primary light diffraction angle of 30 degrees. Namely, the picture element whose pitch is 1 $\mu$m (1000 spatial frequencies/mm) or so is needed for obtaining a deflecting system of deflection angle 30 degrees by the conventional LCD. On the other hand, in the VGM apparatus for deflecting light of the present invention, the spatial frequency is determined by the applied voltage, not by the picture element pitch. Accordingly, it is possible to obtain an apparatus for stereoscopic display which has a desirable range of view easily.

EMBODIMENT 20

Device for Stereoscopic Display

Figure 44:
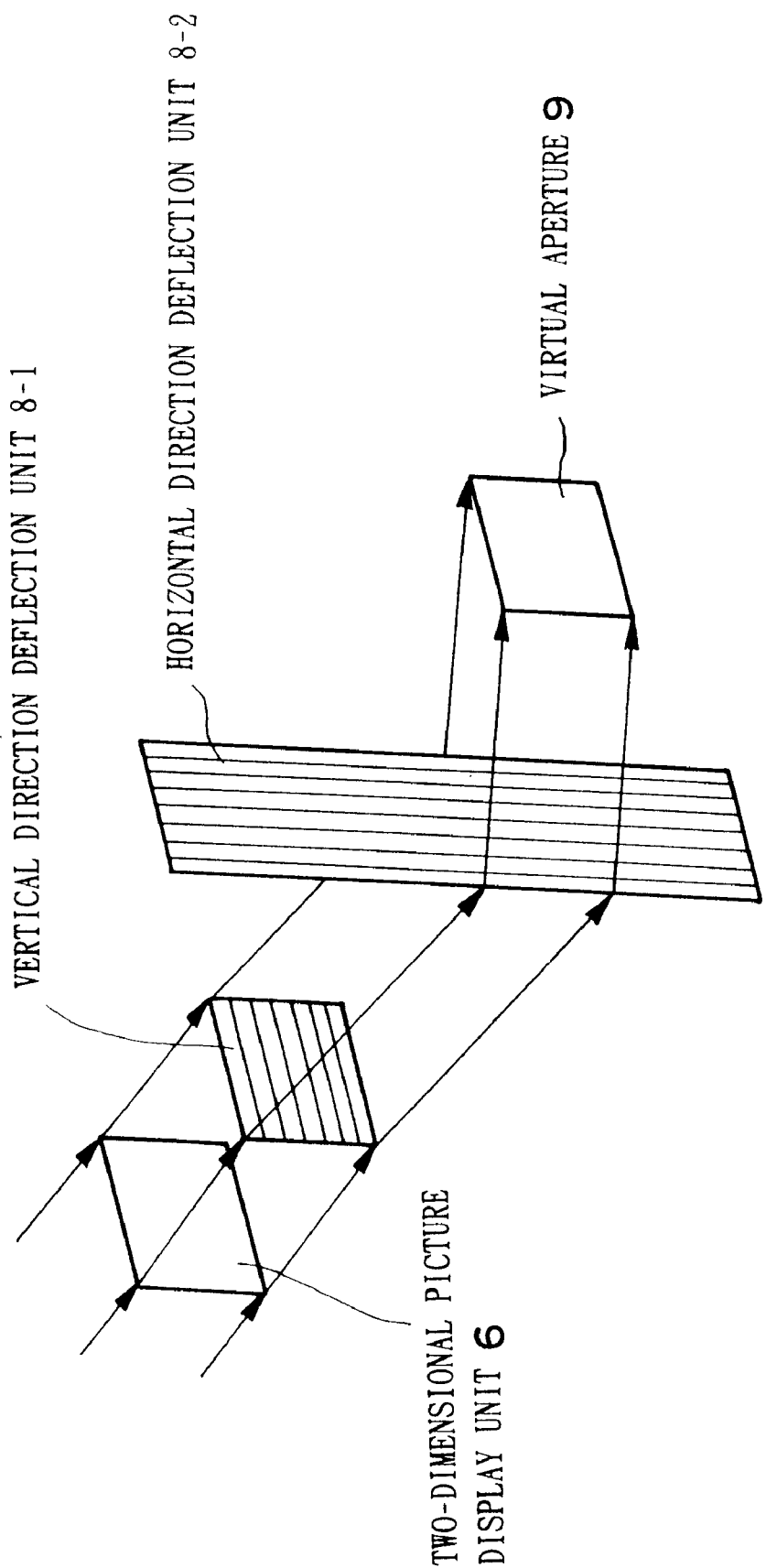
FIG. 44 is a construction diagram when it has a horizontal parallax and a vertical parallax in a device for stereoscopic display of the embodiment 20 of the present invention.

FIG. 44 is an embodiment of the case in which a plurality of one directional apparatuses for deflecting light are used. The two-dimensional picture projected from the apparatus for displaying two-dimensional picture 6 is deflected to the vertical direction by the VGM apparatus for deflecting light for vertical direction 8-1 which has a horizontal picture element, and is deflected to the horizontal direction by the VGM apparatus for deflecting light for horizontal direction 8-2 which has a vertical picture element. By these actions, the stereoscopic picture which has a parallax both in upper direction and in lower direction can be displayed.

EMBODIMENT 21

Device for Stereoscopic Display

In the control of the apparatus for deflecting light of the above-mentioned embodiments 19 and 20, it is necessary to change the phase distribution according to the angle information of the deflection. Namely, it is desirable that the stereoscopic display is executed without calculating the phase distribution as follows, even though it is also possible to calculate the phase distribution in accordance with the angle information and control the apparatus for deflecting light.

Preparation of Phase Distribution Storage Tables

A phase distribution (interference fringes) which brings on a light deflection determined per picture which varies in visual directions is stored as a table data previously in the phase distribution storage table shown in FIG. 48 and FIG. 52. The deflection control unit 7 refers to the data stored in the phase distribution storage table to control the phase distribution of the apparatus for deflecting light.

Further, $\Phi 11,11$, $\Phi 11,12$, . . . $\Phi 11,mn$ correspond to the phase of each interference fringe in FIG. 48. Similarly, $\Phi 11,1$, $\Phi 11,2$, . . . $\Phi 11,n$ correspond to the phase of each interference fringe in FIG. 52.

The preparation of the data stored in the phase distribution storage table will be described as follows.

(A) Calculation of Phase Distribution

First of all, the principle of hologram will be described. The hologram can be obtained by two luminous interference of the laser light (object light) which is scattered from the object dividing one laser light into two laser lights and applying the laser light of one side to the object, and the other laser light (reference light). Hereupon, the exposure intensity $I_H$ of the hologram will be as follows, if the wave front of the reference light is $R \cdot \exp (j\phi_r)$ and the wave front of the object light is $O \cdot \exp (j\phi_o)$.

$$I_H = R^2 + O^2 + 2 \cdot R \cdot O \cdot \cos (\phi_o - \phi_r) \quad (1)$$

The amplitude and the phase which are in proportion to the exposure intensity of the formula (1) changes in the hologram, when the hologram is developed. Such spatial light modulation element as a liquid crystal device which is capable of changing the amplitude and the phase of the light should be used to prepare the hologram electrically.

The hologram can be replayed by injecting the wave front which is the same as the reference light into the hologram prepared in the above-mentioned way. The transmitted light T from the hologram will be as follows when the third term of the right side is considered, since only the third term of the right side out of the exposure intensity $I_H$ of the formula (1) contributes to the replay of the object light.

$$T = I_H \cdot R \cdot \exp (j\phi) \propto 2 \cdot O \cdot \cos (\phi_o - \phi_r) \cdot \exp (\phi_r) = O \cdot \exp (j\phi_o) + O \cdot \exp \{-j (\phi_o - 2 \cdot \phi_r)\} \quad (2)$$

Hereupon, the first term of the right side of the formula (2) indicates that the wave front from the object was replayed. The second term of the right side indicates a conjugated wave of the object light.

As shown in the above-mentioned description of the principle, in the calculation of the phase distribution of the hologram, only the third term of the right side of the formula (1) should be calculated.

Figure 45:
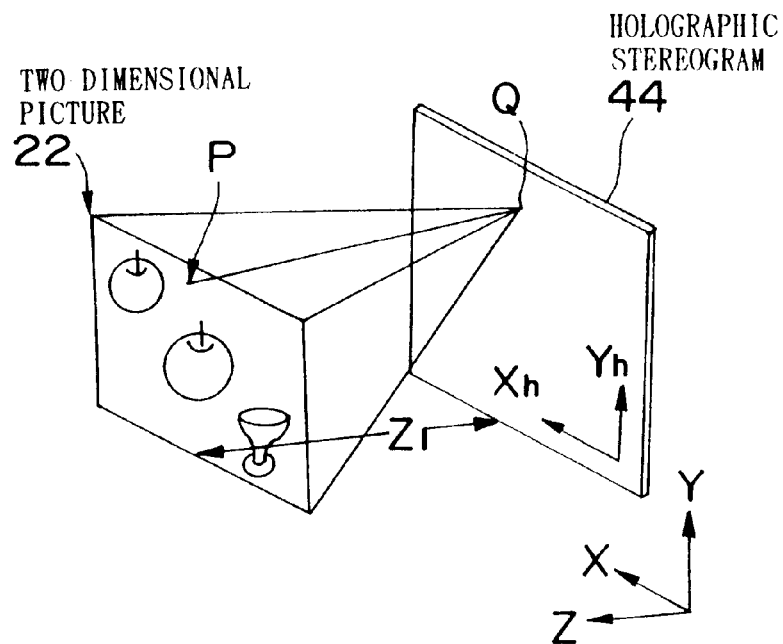
FIG. 45 is a descriptive diagram indicating a calculation principle of a phase distribution aimed at the two-dimensional picture in a device for stereoscopic display of the embodiment 21 of the present invention.

FIG. 45 indicates a calculation principle of the phase distribution in holographic stereogram. The light intensity R can be ignored and can be treated as phase $\phi$ r=0, since the intensity of the plane wave does not change according to the locations, when the reference light is considered as a plane wave. The coordinate value of Z axis direction of the two-dimensional picture is fixed in Zi.

The exposure intensity $I_H$ of Q point which will become the coordinates $(X_{hi}, Y_{hi})$ of the holographic stereogram will be as follows, when the intensity (degree of scatter) of one sampling point P which has coordinates $(X_i, Y_i)$ within the two-dimensional pictures is regarded as $I_i$.

$$I_H = \Sigma\{(I_i/r_i)\cos(k \cdot r_i)\} \quad (3)$$

excepting that k is the wave number of the laser light.

$$r_i = \sqrt{\{(X_i - X_{hi})^2 + (Y_i - Y_{hi})^2 + Z_i^2\}} \quad (4)$$

The calculation of the formula (3) and (4) should be executed extending over the whole region of the holographic stereogram, since the light beamed from each picture element of the two-dimensional pictures reaches the whole hologram.

Figure 46:
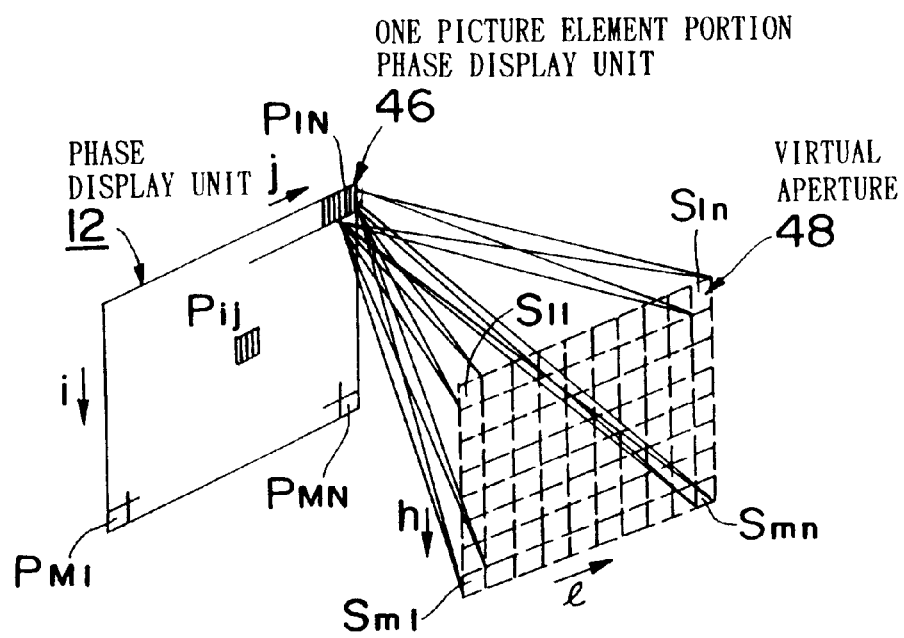
FIG. 46 is a descriptive diagram indicating a deflection function of an apparatus for deflecting light when it has a horizontal parallax and a vertical parallax in a device for stereoscopic display of the embodiment 21 of the present invention.

(B) Phase Calculation of Image Hologram which has a Horizontal Parallax and a Vertical Parallax FIG. 46 is a descriptive diagram indicating a deflecting function of an apparatus for deflecting light for stereoscopic display which has a horizontal parallax and a vertical parallax. The apparatus for deflecting light 8 arranges M×N pieces of one picture element portion phase display unit in total corresponding to one picture element of the two-dimensional pictures, M pieces in vertical direction and N pieces in horizontal direction. Hereupon, the picture element corresponding to optional one picture element portion phase display unit will be represented in $P_{ij}$, if the horizontal direction is represented in j and the vertical direction is represented in i.

The virtual apertures are arranged in a position which will be a visible region to the apparatus for deflecting light 8. The virtual aperture arranges n×m pieces in total, n pieces in horizontal direction and m pieces in vertical direction. Hereupon, the optional virtual aperture region will be represented in $S_{kL}$, if the horizontal direction is represented in L and the vertical direction is represented in k.

Hereupon, the one picture element portion phase display unit on the upper right corner of the apparatus for deflecting light 8 indicates a deflection state of the display light beamed from the corresponding picture element $P_{IN}$, and the light beamed from the corresponding picture element $P_{IN}$ will be deflected to the regions $S_{11}$–$S_{mn}$ of all virtual apertures.

Figure 47:
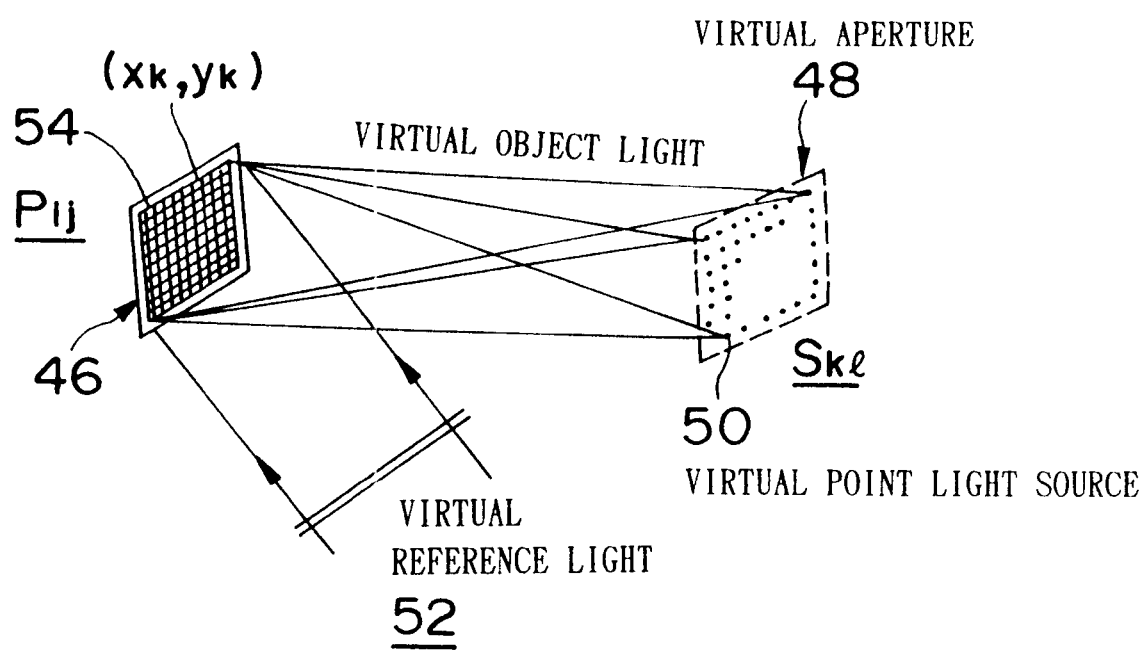
FIG. 47 is a descriptive diagram of a method for calculating a phase distribution which has a deflecting function of FIG. 46 in a device for stereoscopic display of the embodiment 21 of the present invention.

FIG. 47 indicates a method for calculating a phase distribution which realizes the above-mentioned deflection functions. The method for calculating the phase distribution in the one picture element portion phase display unit of the corresponding picture element $P_{ij}$ is indicated by taking the relation between one virtual aperture 48 and the region $S_{kL}$ for instance.

First of all, in FIG. 47, a plurality of virtual point light sources 50 should be arranged on the virtual aperture 48 in the horizontal and vertical direction. The virtual reference light 52 should be set up at the same time. The phase distribution should be calculated per picture element for phase display 54 which organizes the one picture element portion phase display unit 46 by the above-mentioned formula (3)and (4) among the all virtual point light sources 50 in this state.

Hereupon, as shown in FIG. 49, a plurality of two-dimensional data $G_{11}$–$G_{mn}$ which regard the virtual aperture regions $S_{11}$–$S_{mn}$ as visual points are prepared to display the data in order division. For this reason, the virtual aperture shown in FIG. 46 changes temporally following the switching of the two-dimensional picture data $G_{11}$–$G_{mn}$ in the horizontal and the vertical direction. Accordingly, in the calculation of the phase distribution of FIG. 47, the virtual aperture region whose position changes temporally following the two-dimensional pictures $G_{11}$–$G_{mn}$ is calculated.

Accordingly, the phase distribution $\phi_{ij,\,11}$–$\phi_{ij,\,mn}$ will be calculated in connection with the optional corresponding picture element $O_{ij}$, in order to deflect the light beamed from the picture element to the virtual apertures 48 of $S_{11}$–$S_{mn}$ which vary corresponding to the two-dimensional picture display by the time division.

For this reason, the phase distribution data used by the time division display per corresponding picture element will be stored in the phase distribution table of the present invention as shown in FIG. 48.

(C) Phase Calculation of Image Hologram which has a Horizontal Parallax

Figure 50:
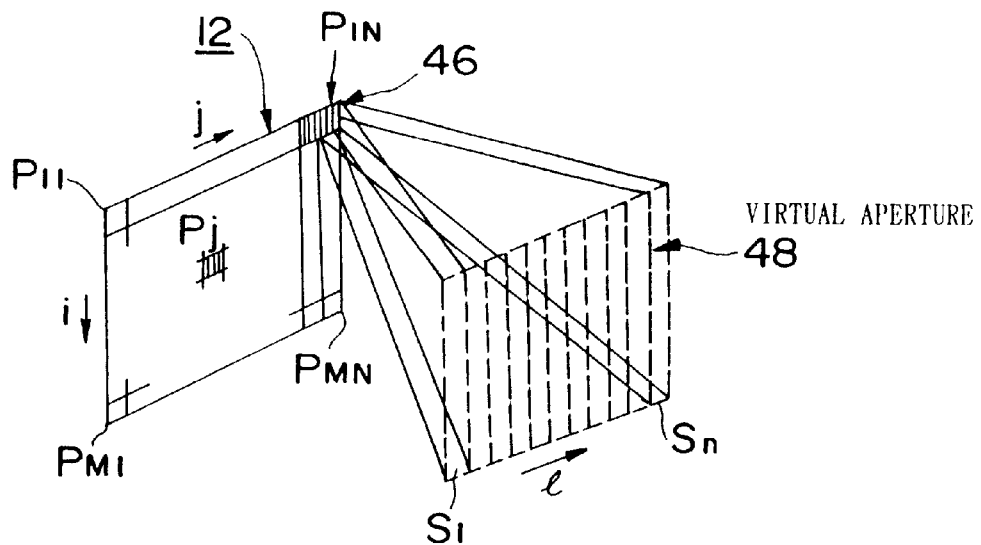
FIG. 50 is a descriptive diagram indicating a deflecting function of an apparatus for deflecting light when it has a horizontal parallax in a device for stereoscopic display of the embodiment 21 of the present invention.

FIG. 50 is a descriptive diagram indicating a deflecting function of the apparatus for deflecting light 8 for stereoscopic display of the present invention which has a horizontal parallax. In FIG. 50, the apparatus for deflecting light 8 arranges the picture elements which are lengthy in the vertical direction. On the other hand, the virtual aperture 48 arranges the n pieces in the horizontal direction as a stripe region which is lengthy in the vertical direction. Hereupon, the optional virtual aperture region will be represented in $S_1$, if the horizontal direction is represented in 1.

Hereupon, the one picture element portion phase display unit 46 on the right upper corner of the apparatus for deflecting light 8 indicates a deflection state of the display light beamed from the corresponding picture element $P_{IN}$, The light beamed from the corresponding picture element $P_{IN}$ will be deflected to the regions $S_1$–$S_n$ of all virtual apertures as shown in FIG. 50.

Figure 51:
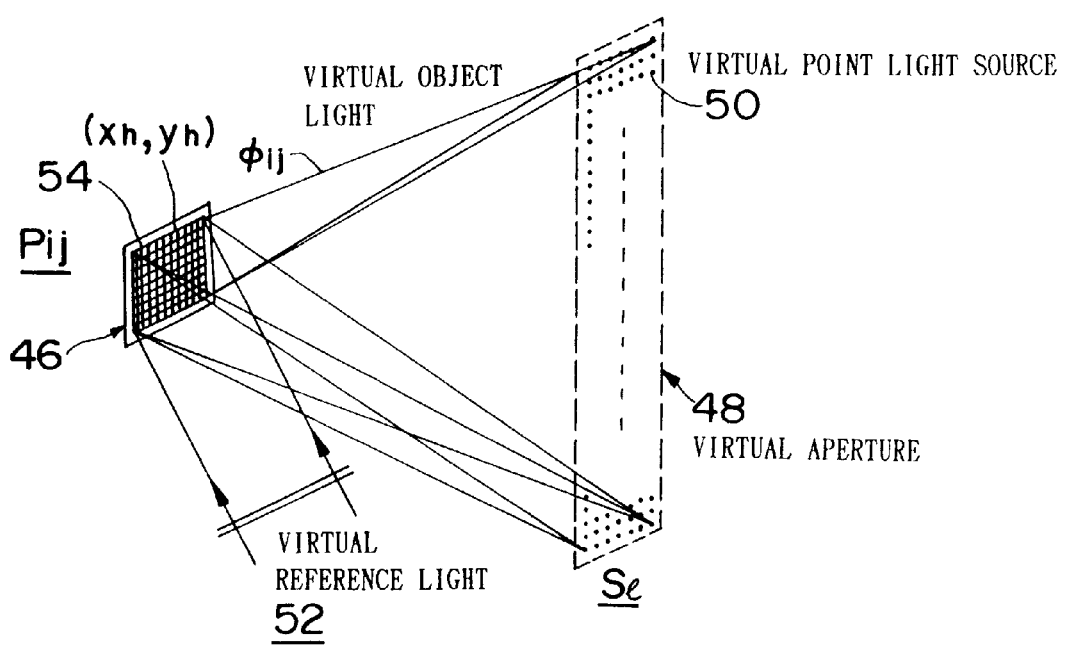
FIG. 51 is a descriptive diagram of a method for calculating a phase distribution which realizes a deflecting function of FIG. 50 in a device for stereoscopic display of the embodiment 21 of the present invention.

FIG. 51 indicates a method for calculating phase distribution which realizes a deflecting function shown in FIG. 50. and indicates the method for calculating phase distribution in the one picture element portion phase display unit 46 of the corresponding picture element $P_{ij}$ by taking the relation between one virtual aperture 48 and the region $S_1$ for instance.

First of all, also in case of FIG. 50, a plurality of virtual point light sources 50 should be arranged on the virtual aperture 48 in the horizontal and the vertical direction. The virtual reference light 52 should be set up at the same time. The phase distribution should be calculated per picture element for phase display 54 which organizes the one picture element portion phase display unit 46 by the above-mentioned formula (3) and (4) among the all virtual point light sources 50 in this state.

Hereupon, as shown in FIG. 53, a plurality of two-dimensional picture data $G_1$–$G_n$ which regard the virtual aperture regions $S_1$–$S_n$ as visual points are prepared to display the data in time division. For this reason, the virtual aperture shown in FIG. 50 changes temporally following the switching of the two-dimensional picture data $G_1$–$G_n$ in the horizontal direction. Accordingly, in the calculation of the phase distribution of FIG. 47, the virtual aperture region whose position changes temporally following the two-dimensional pictures $G_{1-Gn}$ is calculated.

Accordingly, the phase distribution $\Phi_{ij}$–$\Phi_{ij,\,mn}$ will be calculated in connection with the optional corresponding picture element $P_{ij}$, in order to deflect the light beamed from the picture element to the virtual apertures 48 of $S_1$–$S_{mn}$ which vary corresponding to the two-dimensional picture display by the time division.

For this reason, the phase distribution data used by the time division display per corresponding picture element will be stored in the phase distribution table of the present invention which has a horizontal parallax as shown in FIG. 52.

(D) Phase Calculation of Image Holograph when Picture is Divided

Figure 54:
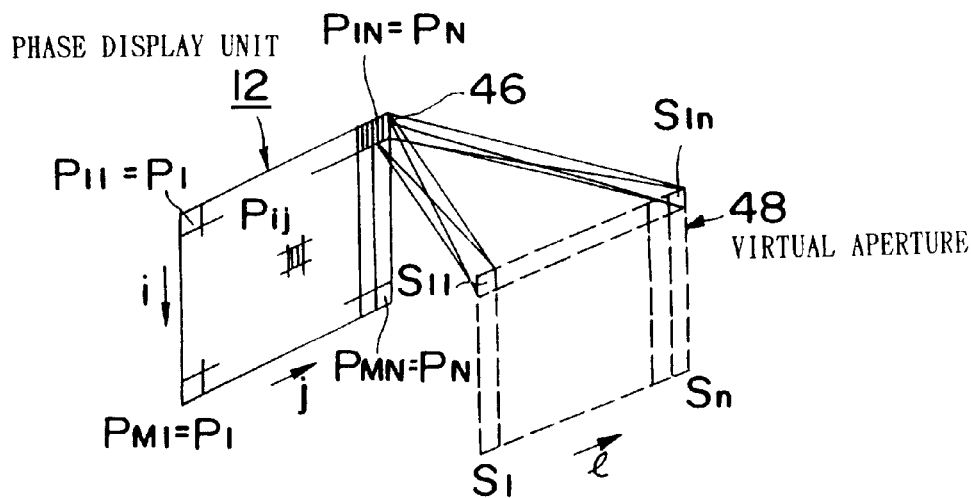
FIG. 54 is a descriptive diagram indicating a deflecting function of an apparatus for deflecting light when the picture is divided in a device for stereoscopic display of the embodiment 21 of the present invention.

FIG. 54 is a descriptive diagram indicating a deflecting function of an apparatus for deflecting light 8 of the present invention which executes the stereoscopic display which has a horizontal parallax using the divided pictures.

In FIG. 54, the apparatus for deflecting light 8 arranges the picture elements which are lengthy in the vertical direction. On the other hand, the virtual aperture 48 arranges n pieces in the horizontal direction as a stripe region which is lengthy in the vertical direction. Hereupon, the optional virtual aperture region will be represented in $S_1$, if the horizontal direction is represented in 1.

Hereupon, the two-dimensional pictures are divided in the vertical direction to be converted into the horizontal stripe pictures. For this reason, the one picture element portion phase display unit 46 on the right upper corner on the apparatus for deflecting light 8 indicates that the light beamed from the corresponding picture element $P_{1N}$ is deflected to the regions $S_{11}$–$S_{1n}$ of the uppermost line of the virtual aperture on the basis of the picture division. Similarly, the light is deflected to the regions of the second line of the virtual aperture 48 in connection with the second line of the apparatus for deflecting light 8. As a result, the one picture element portion phase display unit 46 arranged in the vertical direction of the apparatus for deflecting light 8 will be deflected to the same direction wholly, and will own the same phase distribution.

Accordingly, the corresponding picture elements will be represented in $P_1$–$O_N$ making them into one in the vertical direction, since a plurality of phase distributions of one picture element portion phase display units 46 arranged in the vertical direction of the apparatus for deflecting light 8 can be treated as one phase distribution.

Figure 55:
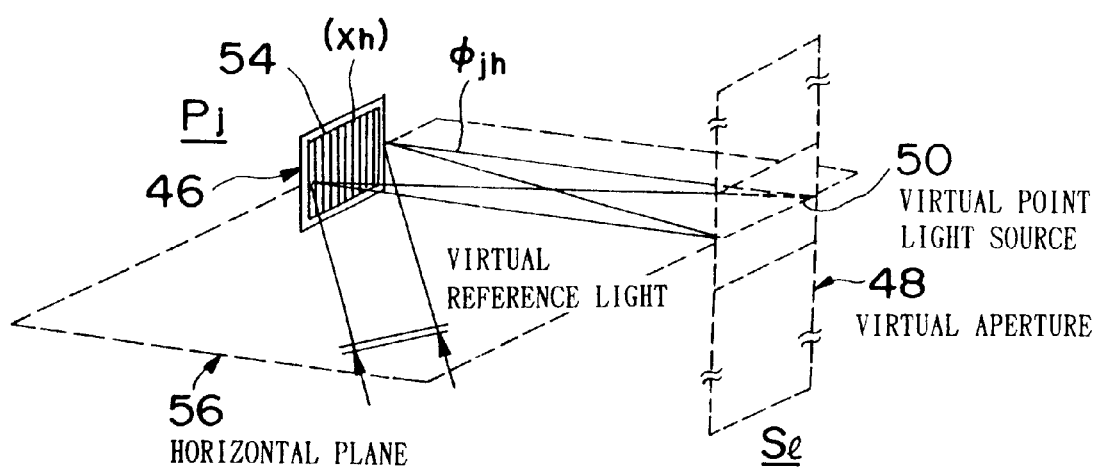
FIG. 55 is a descriptive diagram of a method for calculating a phase distribution which realizes a deflecting function of FIG. 54 in a device for stereoscopic display of the embodiment 21 of the present invention.

FIG. 55 indicates a method for calculating a phase distribution which realizes a deflecting function shown in FIG. 54, and indicates the method for calculating the phase distribution in the one picture element portion phase display unit 46 of the corresponding picture element $P_j$ by taking the relation between one virtual aperture 48 and the region $S_1$ for instance.

In case of FIG. 55, the vertical horizontal plane 56 should be set on the one picture element portion display unit 46 and the virtual aperture 48, and a plurality of virtual point light sources 50 should be arranged on the virtual aperture 48 along the horizontal plane 56 in the horizontal direction. The virtual reference light should be set up at the same time. The phase distribution should be calculated per picture element for phase display 54 which organizes the one picture element portion phase display unit 46 by the above-mentioned formula (3) and (4) among the all virtual point light sources 50 in this state.

Hereupon, the two-dimensional picture data is the same as FIG. 54 and a plurality of two-dimensional picture data $G_1$–$G_n$ which regard the virtual aperture regions $S_1$–$S_n$ as visual points are prepared to display the data in time division. For this reason, the virtual aperture 48 shown in FIG. 54 changes temporally following the switching of the two-dimensional picture data $G_1$–$G_n$ in the horizontal direction. Accordingly, in the calculation of the phase distribution of FIG. 47, the virtual aperture region whose position changes temporally following the two-dimensional pictures $G_{11}$–$G_{mn}$ is calculated.

Accordingly, the phase distribution $\Phi_{ij}$–$\Phi_{ij,\ mn}$ will be calculated in connection with the optional corresponding picture element $P_{ij}$, in order to deflect the light beamed from the picture element to the virtual apertures 48 of $S_1$–$S_n$ which vary corresponding to the two-dimensional picture display by time division.

For this reason, the phase distribution data used by the time division display per corresponding picture element will be stored in the phase distribution table of the present invention which has a horizontal parallax as shown in FIG. 56.

In the stereoscopic display of the present invention using the phase distribution of the division two-dimensional increase, as shown in FIG. 54, the deflecting direction in the vertical direction will not be changed at all, even if the two-dimensional pictures which vary in the visual directions are, and the deflecting direction in the horizontal direction will be changed per two-dimensional picture. For this reason, the light is not scattered to the vertical direction and should be further enlarged optically to the vertical direction when the stereoscopic image is replayed.

Accordingly, as shown in FIG. 57, for instance, the lenticular lens 112 should be provided as an optical element which has a vertical visible region enlargement function following the apparatus for deflecting light 8 and should be scattered to the vertical direction to create a visible region 45. This procedure is mentioned above.

EMBODIMENT 22

Device for Stereoscopic Display

Figure 58:
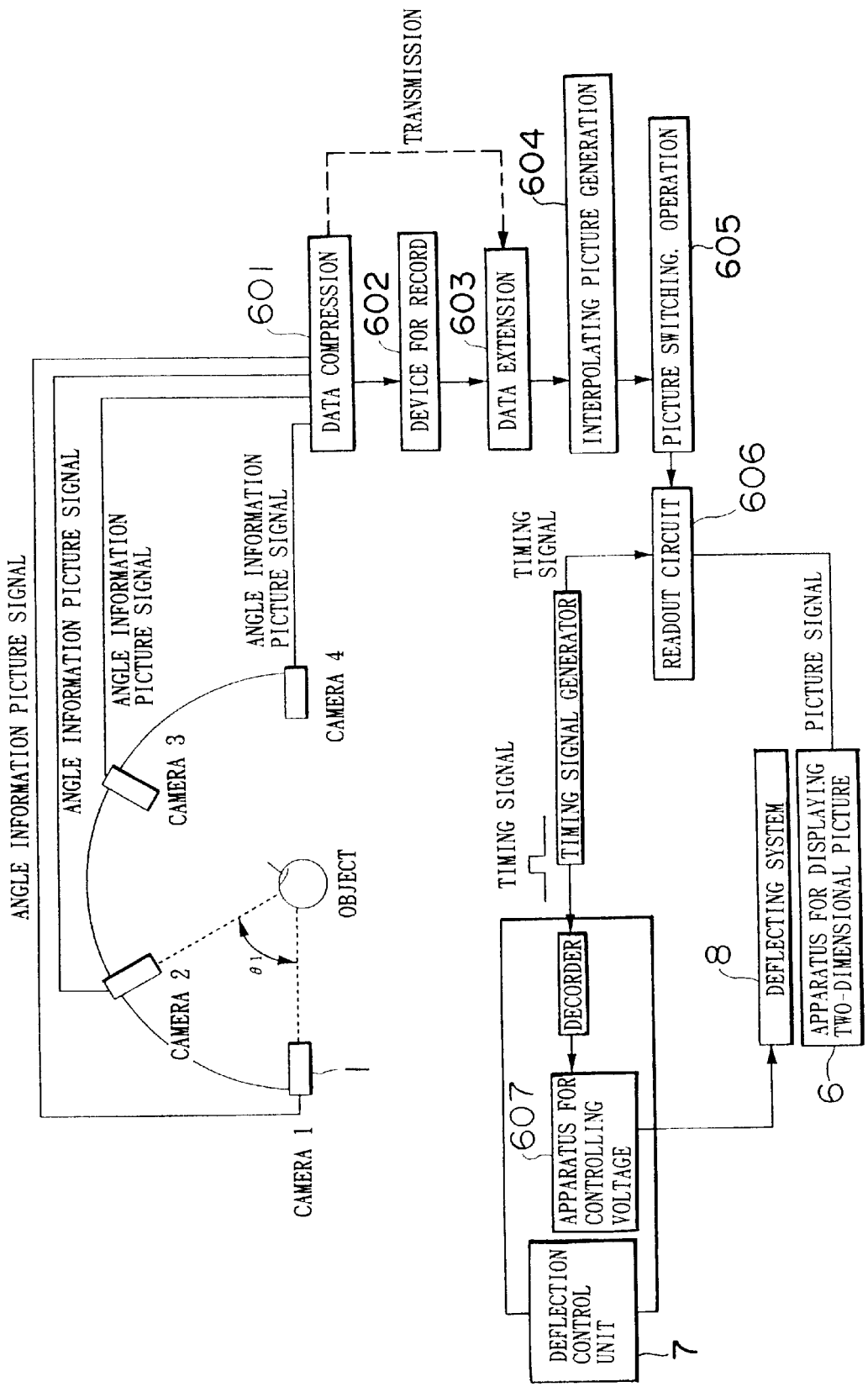
FIG. 58 is a schematic diagram of a stereoscopic display record/replay system in a device for stereoscopic display of the embodiment 22 of the present invention.

FIG. 58 is a schematic diagram of a record and replay system for realizing the present invention. The two-dimensional pictures photographed by a plurality of cameras are compressed by the data compression unit 601 with the angle information according to the position of the camera to be recorded in the recorder 602 or to be transmitted by the transmitter. The two-dimensional picture is recorded in such record media as a magnetic tape, when it is recorded. The two-dimensional picture is transmitted thorough such communication media as a communication network when it is transmitted.

The data which was replayed or transmitted is extended by the data extension unit 603 with the angle information to be inputted into the calculator. In the interpolated picture generating unit 604 of the calculator, the parallax pictures of the number to be displayed on the basis of the angle information of each picture are calculated interpolating and such operations as enlargement, reduction, replacement of lines are added by the editing unit 605 as occasion demands to be written into the frame buffer with the numbers corresponding to the angle information. The deflection control unit 7 controls the apparatus for deflecting light so that the wished-for deflection will be executed by the apparatus for controlling voltage 607. The readout circuit 606 reads the two-dimensional picture data corresponding to the deflection angle by the frame buffer and outputs it to the apparatus for display.

As mentioned hereinbefore, the stereoscopic display should be executed by displaying the two-dimensional pictures corresponding to the angle in the predetermined field of range respectively.

The Effect of Device for Stereoscopic Display of the Present Invention

In the present invention, the device for stereoscopic display can do without mechanically movable parts, the device is not influenced by the mechanical resonance, the accuracy of the stereoscopic display is improved and the maintenance is easily executed, since an apparatus for deflecting light in which the liquid crystal whose anisotropy ($\Delta\epsilon$)of permittivity is less than 0 are caught among the pair of electrodes facing one another is used as beam deflection means.

Besides, the device for stereoscopic display comprises a line division unit which divides the pictures photographed by the cameras into the number of visual points, a time series rearrangement unit which rearranges the two-dimensional pictures divided by the line division unit in the time series, and a two-dimensional picture display control unit which replays and controls the two-dimensional pictures rearranged by the time series rearrangement unit in the time series order. The fatigue of the observer's eyes can be mitigated by the beam deflection means, since the beam deflection means displays the partial pictures by deflecting the two-dimensional pictures displayed in the two-dimensional picture display means to the virtual aperture corresponding to the camera visual point of the plurality of cameras.

The beam deflection means is capable of obtaining the horizontal and the vertical stereoscopic pictures by deflecting the pictures to the horizontal direction or by deflecting the pictures to the vertical direction.

The vertical pictures can be seen equally by installing the light diffusion means for the vertical direction when the beam deflection means deflects only to the horizontal direction.

Besides, it became possible to execute the stereoscopic display quickly, since the time necessary for calculating the phase distribution can be reduced when the deflection control unit which controls the beam deflection means refers to the phase distribution table in which the phase distribution data is stored to determine the deflection angle according to the beam deflection means.

The zero-order light can be shaded by arranging a pair of polarizing plates in which the deflecting directions are crossed in the angle of 90 degrees ±10 before and behind the beam deflection means.

The after image of the last display can be cut and the clear stereoscopic display can be executed, since the elimination time of the last display screen is provided before rewriting the screen in the deflection control unit and the deflection is stopped during the time, when the deflection is moved from one virtual aperture to the next virtual aperture by the beam deflection means.

At that time, the stereoscopic display can be clearer by darkening the intensity of the picture display according to the two-dimensional picture display means.

Then, the stereoscopic picture communication system which comprises a transmission side for transmitting a plurality of two-dimensional pictures which vary in visual directions through the communication network and a receiving side for receiving the transmitted two-dimensional pictures, displays the received two-dimensional pictures in the two-dimensional picture display means and displays the stereoscopic picture in a remote location by deflecting the light beamed from the picture element which organizes the pictures of the picture display means in the beam deflection means corresponding to the varied visual directions can be realized.

What is claimed is:

1. A device for reading information, comprising:
   (a) at least one apparatus for deflecting light having a pair of transference electrodes arranged facing one another, and a liquid crystal inserted between said transference electrodes, thereby forming, when a voltage is applied between said transference electrodes, parallel stripes which function as a diffraction grating at a pitch corresponding to a value of the voltage;
   (b) a drive circuit for applying a voltage between said transference electrodes of said apparatus for deflecting light, where a value of said voltage changes as time elapses;
   (c) a light source beaming a light to be incident onto said apparatus for deflecting light at an incident angle substantially equal to a diffraction angle of one of a plurality of beams of diffracted light emitted from said apparatus for deflecting light;
   (d) an apparatus for detecting light which detects a reflected light when scanning light diffracted by said apparatus for deflecting light is reflected in an information medium; and
   (e) shading means for cutting off a zero-dimensional diffracted light of the apparatus for deflecting light installed on the outgoing light side of said apparatus for deflecting light.

2. A device for reading information according to claim 1, wherein the information medium is a bar code.

3. A device for reading information, comprising:
   (a) at least one apparatus for deflecting light having a pair of transference electrodes arranged facing one another, and a liquid crystal inserted between said transference electrodes, thereby forming, when a voltage is applied between said transference electrodes, parallel stripes which function as a diffraction grating at a pitch corresponding to a value of the voltage;
   (b) a drive circuit for applying a voltage between said transference electrodes of said apparatus for deflecting light, where a value of said voltage changes as time elapses;
   (c) a light source beaming a light to be incident onto said apparatus for deflecting light at an incident angle substantially equal to a diffraction angle of one of a plurality of beams of diffracted light emitted from said apparatus for deflecting light;
   (d) a condensing optical element installed on one of an incident side and an emitting side of said apparatus for deflecting light;
   (e) changing means for changing a distance along a light axis from the light source to the condensing optical element; and
   (f) an apparatus for detecting light which detects a reflected light when scanning light diffracted by said apparatus for deflecting light is reflected in an information medium.

4. A device for reading information, comprising:
   (a) at least one apparatus for deflecting light having a pair of transference electrodes arranged facing one another, and a liquid crystal inserted between said transference electrodes, thereby forming, when a voltage is applied between said transference electrodes, parallel stripes which function as a diffraction grating at a pitch corresponding to a value of the voltage;
   (b) a drive circuit for applying a voltage between said transference electrodes of said apparatus for deflecting light, where a value of said voltage changes as time elapses;
   (c) a light source beaming a light to be incident onto said apparatus for deflecting light at an incident angle substantially equal to a diffraction angle of one of a plurality of beams of diffracted light emitted from said apparatus for deflecting light;
   (d) a condensing optical element installed on an incident side or an emitting side of said apparatus for deflecting light;
   (e) a half mirror which reflects light emitted from the condensing optical element in a direction away from the apparatus for deflecting light;

(f) a second condensing optical element which converges the light reflected by the half mirror;

(g) a reflecting member which reflects light emitted from the second condensing optical element to make it pass through the second condensing optical element and the half mirror and incident onto the apparatus for deflecting light;

(h) a variable mechanism which changes a distance along a light axis from the second condensing optical element to the reflecting member; and (i) an apparatus from detecting light which detects a reflected light when scanning light diffracted by said apparatus for deflecting light is reflected in an information medium.

5. A device for reading information, comprising:

(a) an apparatus for deflecting light having a pair of transference electrodes arranged facing one another, and a liquid crystal inserted between said transference electrodes, thereby forming, when a voltage is applied between said transference electrodes, parallel stripes which function as a diffraction grating at a pitch corresponding to a value of the voltage;

(b) a condensing optical element installed on an incident side or an emitting side of the said apparatus for deflecting light;

(c) a drive circuit for applying a voltage between said transference electrodes of said apparatus for deflecting light, where a value of said voltage changes as time elapses;

(d) a light source for beaming a light to be incident on said apparatus for deflecting light;

(e) changing means for changing a distance along a light axis from the light source to the condensing optical element;

(f) a polarizer which is arranged so that the polarizing direction is substantially orthogonal to a polarizing direction of the incident light of said apparatus for deflecting light, and is installed on the outgoing light side apparatus for deflecting light; and (g) an apparatus for detecting light which detects a reflected light when scanning light diffracted by said apparatus for deflecting light is reflected in an information medium.

6. A device for reading information, comprising:

(a) an apparatus for deflecting light having a pair of transference electrodes arranged facing one another, and a liquid crystal inserted between said transference electrodes, thereby forming, when a voltage is applied between said transference electrodes, parallel stripes which function as a diffraction grating at a pitch corresponding to a value of the voltage;

(b) a condensing optical element installed on one of an incident side and an emitting side of the said apparatus for deflecting light;

(c) a half mirror which reflects light emitted from the condensing optical element in a direction away from the apparatus for deflecting light;

(d) a second condensing optical element which converges the light reflected by the half mirror;

(e) a reflecting member which reflects light emitted from the second condensing optical element to make it pass through the second condensing optical element and the half mirror and incident onto the apparatus for deflecting light;

(f) a variable mechanism which changes a distance along a light axis from the second condensing optical element to the reflecting member;

(g) a drive circuit for applying a voltage between said transference electrodes of said apparatus for deflecting light, where a value of said voltage changes as time elapses;

(h) a light source for beaming a light to be incident on said apparatus for deflecting light;

(i) a polarizer which is arranged so that the polarizing direction is substantially orthogonal to a polarizing direction of the incident light of said apparatus for deflecting light, and is installed on the outgoing light side apparatus for deflecting light; and (j) an apparatus for detecting light which detects a reflected light when scanning light diffracted by said apparatus for deflecting light is reflected in an information medium.

* * * * *